(12) United States Patent
Massacci et al.

(10) Patent No.: US 11,170,439 B2
(45) Date of Patent: Nov. 9, 2021

(54) METHOD AND APPARATUS FOR DISTRIBUTED, PRIVACY-PRESERVING AND INTEGRITY-PRESERVING EXCHANGE, INVENTORY AND ORDER BOOK

(71) Applicant: UNIVERSITA' DEGLI STUDI DI TRENTO, Trento (IT)

(72) Inventors: Fabio Massacci, Trento (IT); Chan Nam Ngo, Trento (IT); Jing Nie, Trento (IT); Daniele Venturi, Trento (IT); Julian Mark Williams, Trento (IT)

(73) Assignee: UNIVERSITA' DEGLI STUDI DI TRENTO, Trento (IT)

( * ) Notice: Subject to any disclaimer, the term of this patent is extended or adjusted under 35 U.S.C. 154(b) by 256 days.

(21) Appl. No.: 16/265,130

(22) Filed: Feb. 1, 2019

(65) Prior Publication Data

US 2019/0244290 A1 Aug. 8, 2019

Related U.S. Application Data

(60) Provisional application No. 62/625,428, filed on Feb. 2, 2018.

(51) Int. Cl.
*G06Q 40/04* (2012.01)
*G06F 21/64* (2013.01)

(52) U.S. Cl.
CPC ............ *G06Q 40/04* (2013.01); *G06F 21/64* (2013.01)

(58) Field of Classification Search
None
See application file for complete search history.

(56) References Cited

U.S. PATENT DOCUMENTS

| 2007/0136165 A1* | 6/2007 | Cha | G06Q 40/04 705/35 |
| 2009/0177591 A1* | 7/2009 | Thorpe | G06Q 40/04 705/36 R |

(Continued)

OTHER PUBLICATIONS

Gideon Greenspan, "Understanding zero knowledge blockchains", Nov. 2016 (Year: 2016).*

(Continued)

*Primary Examiner* — Jacob C. Coppola
*Assistant Examiner* — Timothy Paul Sax
(74) *Attorney, Agent, or Firm* — Arent Fox LLP; Michael Fainberg

(57) ABSTRACT

A method and apparatus for the distributed, privacy preserving and integrity preserving technical implementation of an order book where a group of computing devices belonging to agents (traders, brokers, or groups thereof) wishing to engage in distributed double auctions and markets can (1) keep private the information about the solvency of the individual agent owing the trader's computer; (2) publicly register the values of buy and sell orders while (a) maintaining confidential the information about the owner of the buy (resp. sell) order and (b) still having the possibility to accrue matched buy/sell transactions to the accounts of the computing devices of the individual agents owing those orders; (3) maintain the financial integrity of the market as implemented by a distributed systems of computing devices; and (4) keep private the possible exit from the market by computing devices operated by agents who could no longer meet their contractual obligations.

14 Claims, 19 Drawing Sheets

(56) References Cited

U.S. PATENT DOCUMENTS

2018/0122006 A1* 5/2018 Kraemer ............ H04L 63/0407
2018/0197241 A1* 7/2018 Chapman ............... G06Q 40/04

OTHER PUBLICATIONS

George Samman, "The Trend Towards Blockchain Privacy: Zero Knowledge Proofs", Sep. 11, 2016 (Year: 2016).*

* cited by examiner

| $f[\text{bad}][i]$ | Flag marking inventory of trader device $P_i$ as "bad" |
| $f[\text{del}][i]$ | Flag marking inventory of trader device $P_i$ as "canceled" |
| $f[\text{out}][i]$ | Flag marking inventory of trader device $P_i$ as "netted" |

| | |
|---|---|
| $m[i]$ | Actual Currency amount available to trader device $P_i$ |
| $v[i]$ | Volumes of bought or sold orders held by trader device $P_i$. |
| $\tilde{m}[i]$ | Memoized value of speculative currency amount available if all pending orders are liquidated |
| $\tilde{v}[i]$ | Memoized value of speculative volume of orders held by trader device corresponding to pending orders |
| $c[i]$ | Counter for the number of pending orders |
| $\tau[i]$ | The TRADER STATUS CRYPTO TOKEN linking the overall status of the trader device $P_i$ in the PRIVATE TRADER STATUS BOOK, PRIVATE INVENTORY BOOK, PUBLIC TRADER COMMITMENT BOOK |
| $r[i]$ | The random value used in the construction of the token $\tau[i]$ |

FIG.7

| | | | |
|---|---|---|---|
| $t'''$ | $t''$ | $t'$ | Time $t' \leq t$ where the order has been posted |
| $l'''$ | $l''$ | $l'$ | Desired price level $p_{l'}$ |
| $v'''$ | $v''$ | $v'$ | Desired volume $v'$ |
| $P_{i'''}$ | $P_{i''}$ | $P_{i'}$ | Trader posting the order |

FIG.8

Futures Exchange Ideal Functionality $\mathcal{F}_{\text{CFM}}$ runs in phases with a set of traders $(P_1, \ldots, P_N)$ and a list of prices $(p_1, \ldots, p_L)$.

Initialization: Upon (init, $P_i, m[i]$) from all traders, accept the input iff $m[i] \geq 0$. Hence, store $(m[i], v[i] := 0)$ as the inventory of $P_i$. Finally, initialize $t := 0$ and $O := \emptyset$.

Post/Cancel Order: If $t < T$, upon receiving (post.order, $P_i, \ell, v$) (resp. (cancel.order, $P_i, \ell')$) from $P_i$, let $t := t + 1$.

1. Check $\ell \geq \ell_{buy}$ for $v < 0$ ($\ell \leq \ell_{sell}$ for $v > 0$). In case of Cancel Order, retrieve $(i', \ell', j, v')$ from $O$ and check $j := i$.

2. Let $\mathcal{I}'_i$ be an identical copy of $\mathcal{I}_i$, check $\overline{m}[i] \geq 0$ w.r.t. to $\mathcal{I}'_i$ and the order book $O^* := O \cup (t, \ell, i, v)$ (resp. $O^* := O \setminus (t', \ell', j, v')$).

3. If any check fails, send (post.order, $t, \ell, v$) (resp. (invalid.post, $\ell'$)) (resp. (invalid.cancel, $\ell'$)) to every trader, else send (post.order, $t, \ell, v$) (resp. (cancel.order, $\ell'$)) to every trader and proceed to Margin Settlement with input $\mathcal{I}'_i$ and $O^*$ (c.f. Fig. 16) ; if "succeed", let $\mathcal{I}_i := \mathcal{I}'_i, O := O^*$, otherwise proceed to Mark to Market.

4. In case of Post Order, fulfill the order starting from the earliest opposite order of the same price already in the order book, until the new order is filled or there is no past order to match it with. (c.f. Fig. 16).

Mark To Market: at $t = T$, offset all positions, i.e. $\forall P_i : m[i] := m[i] + v[i] \cdot p_i$ and $v[i] := 0$.

FIG.15

Margin Settlement is run with a candidate order book $O^*$ and a candidate inventory $\mathcal{I}^*$ starting with a set of new broke traders $B := \emptyset$.

1. Repeat the following steps until $\eta[i]^* \geq 0$ for all good traders $P_i$:

(a) Compute the new instant net position $\eta[i]^*$ of all good traders $P_i$; if $\eta[i]^* < 0$ let $B := B \cup \{P_i\}$.

(b) For each $P_i \in B$, remove all limit orders $o_i := (t', l', i, v')$ from both $O^*$ and $O$, send (remove, $(t', l', v')$) to each trader.

2. If $B = \emptyset$, return "succeed"; else let $O^* := O$ and $\mathcal{I}^* := \mathcal{I}$ and repeat the following steps for each $P_i \in B$, until $B := \emptyset$:

(a) Net out $P_i$ by repeatedly running Order Fulfillment with fixed input $(t, l_{sell}, i, v[i])$ for short position (or $(t, l_{buy}, i, v[i])$ for long position), until $v[i] = 0$. If the market cannot supply the margin settlement of $P_i$, i.e. there is no order to match, return "fail".

(b) Let $B := B \setminus \{P_i\}$.

3. Return "succeed".

Order Fulfillment for $o_i = (t, l, i, v)$ starts with $t' = 1$, repeat the following for each entry $o_j = (t', l, j, v') \in O$ such that $v \cdot v' < 0$:

- Send (match, $t', l, v'$) to each trader;
- Compute the matched volume $\delta := \min(|v|, |v'|)$, then remove $\delta$ from $o_i$ and $o_j$, i.e. in case $v > 0$, $o_i^* := (t, l, i, v - \delta)$ and $o_j^* := (t', l, j, v' + \delta)$ (otherwise swap $i$ and $j$).
- Let $O^*$ be an identical copy of $O$, where the orders $o_i$ and $o_j$ are replaced, respectively, with $o_i^*$ and $o_j^*$.
- In case $v > 0$, update the inventories as follows (in case $v < 0$, swap $i$ and $j$ in the equations below):

$$m[i]^* := m[i] - p_l\delta \quad v[i]^* := v[i] + \delta \quad m[j]^* := m[j] + p_l\delta \quad v[j]^* := v[j] - \delta;$$

- Let $\mathcal{I}^*$ be an identical copy of $\mathcal{I}$ where the inventories of $P_i$ and $P_j$ are replaced, respectively, with $(m[i]^*, v[i]^*)$ and $(m[j]^*, v[j]^*)$.
- Run Margin Settlement with input $O^*$ and $\mathcal{I}^*$.
- If Margin Settlement returns "fail", proceed to Mark to Market (Fig.15) otherwise, let $O := O^*$, $\mathcal{I} := \mathcal{I}^*$, and:

$$\text{if } v' = 0, \text{ let } O := O \setminus o_j; \quad \text{if } v = 0, \text{ let } O := O \setminus o_i$$

- Define $t' := t' + 1$, and repeat the above until $t' = t$ or $v = 0$.

FIG.16

Sub-protocol $\Pi_{valid}$ is run by $(P_1, \ldots, P_N)$ in order to let $P_i$ prove a valid Post Order or Cancel Order action w.r.t. $(\delta_c, l, v)$.

1. In case of Cancel Order, $P_i$ sends $(P_i, [\![i]\!], (i, r))$ to $\mathcal{F}^{oc}$, while $P_{j \neq i}$ sends $(P_j, [\![i]\!])$ for the ownership of the order.
2. All traders run $\Pi_{get}$ then $P_i$ proves that s/he can perform the action by decommitting the inventory flags to show:
   (a) $f[\text{bad}][\![i]\!] = 0$ in a normal post/cancel action;
   (b) $(f[\text{bad}][\![i]\!] = 1) \wedge (f[\text{del}][\![i]\!] = 0)$ for a cancel action during Margin Settlement;
   (c) $(f[\text{bad}][\![i]\!] = 1) \wedge (f[\text{del}][\![i]\!] = 1) \wedge (f[\text{out}][\![i]\!] = 0)$ for a post action during Margin Settlement.
3. $P_i$ proves it has a non-negative estimation for instant net position $\bar{\eta}[i]$ (only in a normal post/cancel action):
   (a) Broadcast $([\![p_{tb}]\!], [\![V_{tb}]\!], [\![p_{ob}]\!], [\![V_{ob}]\!])$ and send $(P_i, x_i^{ms}, w_i^{ms})$ to $\mathcal{F}^{ms}$, while $P_{j \neq i}$ sends $(P_j, x_j^{ms})$.
   (b) Broadcast $[\![\bar{\eta}[i]^*]\!]$ and send $(P_i, x_i^{net}, w_i^{net})$ to $\mathcal{F}^{net}$, while $P_{j \neq i}$ sends $(P_j, x_j^{net})$.
   (c) Send $(P_i, [\![\bar{\eta}[i]^*]\!], \bar{\eta}[i]^*)$ to $\mathcal{F}^{zero^+}$, while $P_{j \neq i}$ sends $(P_j, [\![\bar{\eta}[i]^*]\!])$.
4. All traders run $\Pi_{put}$.

Sub-protocol $\Pi_{net}$ is run for checking new broke traders.

1. Repeat the following for each trader $P_i$ to retrieve the inventory then update and check their new inventory flags.
   (a) All traders run $\Pi_{get}$.
   (b) Broadcast $([\![p_{tb}]\!], [\![V_{tb}]\!], [\![p_{ob}]\!], [\![V_{ob}]\!])$ and send $(P_i, x_i^{ms}, w_i^{ms})$ to $\mathcal{F}^{ms}$, while $P_{j \neq i}$ sends $(P_j, x_j^{ms})$.
   (c) Broadcast $[\![\eta[i]^*]\!]$ and send $(P_i, x_i^{net}, w_i^{net})$ to $\mathcal{F}^{net}$, while $P_{j \neq i}$ sends $(P_j, x_j^{net})$.
   (d) Broadcast $[\![f[\text{bad}][\![i]\!]^*]\!], [\![f[\text{del}][\![i]\!]^*]\!], [\![f[\text{out}][\![i]\!]^*]\!]$ and send $(P_i, x_i^{flags}, w_i^{flags})$ to $\mathcal{F}^{flags}$, while $P_{j \neq i}$ sends $(P_j, x_j^{flags})$.
   (e) Forward $f[\text{bad}][\![i]\!]$ and $f[\text{bad}][\![i]\!]^*$ to $\mathcal{F}_{compare}$.
2. If $\mathcal{F}_{compare}$ returns 1, all traders run $\Pi_{put}$ (with $\mathcal{T}^*$) then run $\Pi_{backup}$.
3. Otherwise, the traders discard $\mathcal{T}^*$ and, for each trader $P_i$, all traders run $\Pi_{put}$ (with $\mathcal{T}$).

Sub-protocol $\Pi_{match}$ for updating the inventories upon a match of orders $(t, l, [\![i]\!], v)$ of $P_i$ and $(t', l, [\![i']\!], v')$ of $P_{i'}$ ($v \cdot v' < 0$).

1. $P_i$ sends $(P_i, [\![i]\!], (i, r))$ to $\mathcal{F}^{oc}$, while $P_{j \neq i}$ sends $(P_j, [\![i]\!])$, then all traders run $\Pi_{get}$.
2. In case $v > 0$, and for $\delta = \min(|v|, |v'|)$, $P_i$ computes $m[i]^* = m[i] - p_t \cdot \delta$ and $c[i]^* = c[i] + \delta$.
3. (If $v < 0$, replace $\delta$ with $-\delta$. If $\delta = |v|$, let $c[i] = c[i] + \delta_c$ where $\delta_c = -1$.)
4. $P_i$ broadcasts $[\![m[i]^*]\!], [\![c[i]^*]\!], [\![\bar{m}[i]^*]\!], [\![\bar{c}[i]^*]\!]$, and $[\![c[i]^*]\!]$, and sends $(P_i, x_i^{match}, w_i^{match})$ to $\mathcal{F}^{match}$, while $P_{j \neq i}$ sends $(P_j, x_j^{match})$.
5. All traders run $\Pi_{put}$.
6. $P_{i'}$ performs steps 1–5 (where $\delta := -\delta$, $i := i'$, and $\delta_c = -1$ if $\delta = |v'|$).

Sub-protocol $\Pi_{backup}$ is run to fork a backup tree. Additionally, the common inputs include $[\![\eta[i]^*]\!]$, and $P_i$ also holds $\eta[i]^*$.

1. $P_i$ forwards $\eta[i]^*$ to $\mathcal{F}_{pcheck}$.
2. If $\mathcal{F}_{pcheck}$ returns 1, all traders run $\Pi_{put}$ to obtain $\mathcal{T}_U^*$.

FIG.18

Sub-protocol $\Pi_{put}$: The protocol is run by $(P_1, \ldots, P_N)$ in order to let $P_i$ commit to a new inventory by adding the commitment of the inventory token to a Merkle Tree $\mathcal{T}$ (resulting in a new root $\rho^*$).

1. $P_i$ picks $r[i] \leftarrow \$ \{0,1\}^*$, computes $\tau[i] := \text{Com}(m[i]\|u[i]\|n[i]\|\ell[i]\|c[i]\|f\text{bad}[i]\|f\text{del}[i]\|f\text{out}[i]; r[i])$, and broadcasts $f\tau[i] \leftarrow \text{Com}(\tau[i])$.
2. $P_i$ sends $(P_i, x_i^{token}, x_i^{token})$ and each other $P_{j \neq i}$ sends $(P_j, x_j^{token})$ to $\mathcal{F}^{token}$.
3. $P_i$ runs $\rho^* := \text{Add}(\mathcal{T}, f\tau[i])$ and broadcasts $\rho^*$. The other traders accept $\rho^*$ iff the token has been correctly added to the tree.

Sub-protocol $\Pi_{get}$: The protocol is used when a trader either to post a new order ($\delta_c = 1, \ell, v$), or cancel a pending order ($\delta_c = -1, \ell, v$), or simply retrieve an unspent inventory that was committed at round $t' \leq t$ into a Merkle Tree $\mathcal{T}_t$; any spent token is rejected.

1. $P_i$ recovers $path_t := \text{path}(\mathcal{T}_t, f\tau[i|t])$ and broadcasts $\tau[i]^{t'}$.
2. $P_i$ sends $(P_i, x_i^{inv}, w_i^{inv})$ and each other $P_{j \neq i}$ sends $(P_j, x_j^{inv})$ to $\mathcal{F}^{inv}$. The token $\tau[i]^{t'}$ is now marked as spent by all traders.
3. If $(\delta_c, \ell, v) \neq (0, 0, 0)$, additionally $P_i$ sends $(P_i, x_i^{inv}, w_i^{inv})$ and each other $P_{j \neq i}$ sends $(P_j, x_j^{inv}, w_j^{inv})$ to $\mathcal{F}^{inv}$.

METHOD AND APPARATUS FOR DISTRIBUTED, PRIVACY-PRESERVING AND INTEGRITY-PRESERVING EXCHANGE, INVENTORY AND ORDER BOOK

CROSS-REFERENCE TO RELATED APPLICATIONS

This application claims the benefit of US. Provisional Patent Application Ser. No. 62/625,428 filed Feb. 2, 2018 entitled "A METHOD AND APPARATUS FOR DISTRIBUTED, PRIVACY-PRESERVING AND INTEGRITY-PRESERVING EXCHANGE, INVENTORY AND ORDER BOOK", which is herein incorporated by reference in its entirety.

FIELD OF INVENTION

A futures contract is a standardized agreement between two parties to buy or sell an underlying asset, at a price agreed upon today with the settlement occurring at some future date [13], [29]. They are "promises" to buy or sell, and these "promises" can themselves be traded. Such trading is conducted in a double auction market operated by a centralized clearing house called Futures Exchange [13], such as the Chicago Mercantile Exchange (CME). On the CME, futures contracts range from bushels of corn to Euro/US$ exchange rates. Recently, CBOE and CME launched Bitcoin futures markets. These are 'cash-futures', that is as they are settled in cash. Eurodollars futures are the largest world market by notional volume: in quadrillions of dollars/year. See https://en.wikipedia.org/wiki/List for a list of futures exchanges. Traders can 'quote' a future by specifying a price and notional volume of assets at which they will buy or sell (a limit order) or initiate a trade by placing a market order for a "promise" of a quantity (purchase or sale) at the best price from the standing quotes.

General financial intermediation as embodied by a Futures Exchange is still centralized and more expensive than traditional payment networks which have been successfully challenged by Bitcoin [24], ZeroCash [1] amongst others.

As opposed to simple decentralized price discovery [9], making a full trading exchange distributed requires the designed to solve several security challenges, besides the typical security issues of distributed payments which can be solved by leveraging (and indeed we do so) on ZeroCash [1]: zero-knowledge succinct non-interactive arguments of knowledge, i.e. zk-SNARKs [3].

The first challenge is the interplay between security and economic viability [21]. Whereas integrity is obviously needed for payments (see the Ethereum DAO mishaps [10]), confidentiality seemed less critical for exchanges [9]; one can trace all transactions to a Bitcoin's ID by using public information in the blockchain, yet this hardly stopped Bitcoin from thriving (see [1] p. 459). Here, disclosing a trader's account allows attacks based on price discrimination and would inevitably lead to a market collapse (we illustrate this effect in § 3).

Another challenge w.r.t. other crypto applications such as auctions (e.g., [27]) is the simultaneous need to i) make publicly available all offers by all parties, ii) withhold the information on who actually made the quote and iii) trace the honest consequences of an anonymous public action to the responsible actor. The prototypical example is posting a public, anonymous buy order while personally accruing the revenues from the sale (without even the seller knowing the actual buyer and vice-versa). The Exchange must also guarantee that iv) actors do not offer beyond their means, which is an issue related to double spending [28], double voting [4], or groundless reputation rating [30]. E-voting provides traceability for one's own vote, not to the ensemble of agents. Applications of e-cash and privacy-preserving reputation systems guarantee anonymity for honest actions and traceability only in case of malfeasance, not for honest behavior.

Further, e-cash or voting protocols are essentially monotonic in terms of legitimacy of digital assets of honest parties when other honest parties join: valid security evidence (e.g. commitments, etc.) accrue over protocol steps performed by honest parties. Once's Alice proved she has money (or she casted a correct vote), the protocol can check Bob's assets. Alice's claims are never invalidated by Bob (if she stays honest and is not compromised). Monotonicity is clearly visible in the security proofs for cash fungibility in Zero-Cash [1], or vote's eligibility in E2E [15]. This allows for efficient optimization (e.g. [30]) as a multi-party computation (MPC) with n interacting parties may be replaced by n independent non-interactive proofs (i.e. zk-SNARK).

In contrast, financial intermediation is not monotonic: Alice's asset (e.g. a trader's inventory) might be proven (cryptographically) valid by Alice and later made (economically) invalid by the honest Bob who, by just offering to sell assets and thus changing the market price, can make Alice bankrupt without any action on her side. Hence, v) security evidence by honest parties must be potentially discarded, and vi) the protocol must account for Alice's "honest losses" and fix them because there is no centralized exchange covering them.

TABLE 1

Key Compositions and Characteristics of Futures Market

| Traders Characteristics: | |
| --- | --- |
| Possible Positions | Buy-side traders holding long positions. Sell-side traders holding short positions. |
| Possible Actions | Submit (Market/Limit Orders) and Cancel (Limit) Orders. |
| Exchanges Main Functions: | |
| Price discovery and order matching | Disseminating the real-time market data to market participants; Providing a central limited order book (cf. FIG. 1): an electronic list of all waiting buy and sell quotes organized by price levels and entry time. Matching engines use algorithms to match buy and sell quotes with a price and time priority principle. |
| Risk management and clearing of orders | Clearing house is responsible for having a daily/final settlement by the process of "mark-to-market", so that no pending promise (to buy or sell) and no debt remains unfulfilled. Traders need to deposit an initial margin and maintain a minimum funding |

TABLE 1-continued

Key Compositions and Characteristics of Futures Market

| | |
|---|---|
| | in the margin account above the maintenance margin; otherwise, they will receive a margin call for additional funding. Traders failing below the minimum are forced to liquidate their open positions and netted out. |
| Market fairness and absence of price discriminations | For fairness, traders are anonymous as exchanges hold all info about them and never reveal it to others. A trader only see the details of her own orders, and not even the ID of the counter party of an order matching her own order executed through the exchange, as this would allow for price discrimination. |
| Major Players | |
| Chicago Mercantile Exch. | The largest derivatives market with 3.53 billion of contracts traded in 2015 [26]. |
| Eurex Exchange (Eurex) | The largest European derivatives market with 2.27 billion of contracts traded in 2015 [26]. |
| Regulatory Bodies | Futures markets are regulated by independent government agencies to protect market participants and prevent fraud and manipulation activities, such as the CFTC [57] and the SEC [58]. |

TABLE 2

Samples of Market Activity

The table shows the maximum number of active traders (#T), number of posted orders (#PO), and matching orders (#MO) for some futures contracts (Eurodollar being world's largest). Cancelled orders' number is close to that of posted orders, Data is obtained from the CME tapes via the Thomson Reuters Tick History database.

| Contract | Lean Hog LHZ7 | | | Eurodollar GEH0 | | |
|---|---|---|---|---|---|---|
| Trading Day | #T | #PO | #MO | #T | #PO | #MO |
| Low | 15 | 1067 | 46 | 14 | 23469 | 85 |
| Normal | 17 | 3580 | 146 | 109 | 267089 | 7907 |
| High | 33 | 6709 | 536 | 520 | 376075 | 8402 |

To illustrate how markets work, we explain the key trading mechanisms and discuss some aspects of the market microstructure of futures contracts [13], [29]. Fundamental participants in a futures market include traders, exchanges and regulatory bodies as summarized in Table 1.

Traders post buy (bid) or sell (ask) orders for a specific futures contract in the market. The trading position characterizes a trader as a buyer or a seller: sellers take short positions by selling an amount of futures contracts; buyers take long positions by buying futures. Obviously, buyers prefer to purchase contracts at lower prices and sellers prefer to sell contracts at higher prices. Traders can also cancel orders immediately after having posted them to adapt to fast changing markets (a heavily used feature).

The Exchange acts as centralized intermediary between buyers and sellers and guarantees price discovery, matching and clearing. It manages risks and guarantees the fairness of the market (See Table 1 for a short summary of key requirements from an economic perspective).

The first important functionality is to made available to all traders an aggregated list of all waiting buy and sell (anonymized) orders: the central limited order book. It includes the volume of contracts being bid or offered at each price point. It is illustrated in FIG. 1.

Buy and sell orders at the same prices are matched by the Exchange until the required volume of contracts is reached. Matched orders will go through a clearing and settlement process to complete a transaction [26]. The exchange usually operates its own clearing house which is responsible for having a daily settlement for each futures contract by the process of "mark-to-market", which is valuing the assets covered in future contracts at the end of each trading day. Then profit and loss are settled between long positions and short positions.

Table 2 illustrates the variability of the markets by comparing some days for the Eurodollar, the largest market in the world, together with Lean Hog, a less frequently traded futures.

INFORMAL PROPERTIES (§ 2) From a security perspective an exchange is an instance of a multiparty reactive security functionality [7]: every agent must satisfy individual constraints (monotonic) and the system as a whole must satisfy global constraint (possibly non-monotonic). The economic requirements in Table 1 can be directly transformed into the security requirements below.

Availability of Order Book with Confidentiality of Trader Inventory. Acting as counter party for each trader, the exchange must hold all trading information including prices, volumes, margins, and traders ownership of orders, etc. It has to protect a trader's own inventory without leaking it to other traders.

Market Integrity and Loss Avoidance. The exchange implements trading (execute matching orders), and guarantee final settlements (traders' margin meet posted orders) after each event to ensure the integrity of the marketplace. More constraints such as limiting a trader's largest position are added in practice (we omit them due to lack of space).

Trader's Anonymity. The exchange must prevent the linkage of orders by the same trader. This is done by managing an anonymous central limit order book where only bid and ask prices are publicly available. In this way, traders will not be able to identify and forecast others' trading strategies.

Trader's Precedence Traceability. The exchange must allow the linking of limit orders to the individual traders so that matching orders can be accrued to the traders who made them in the exact order in which they where posted.

In traditional applications of MPC, such as auctions and e-voting, there is no difference between the parties: everybody submits one bid or casts one vote. This is not true for general financial intermediation: retail and institutional investors are 71% of traders in the TSX market, but only make 18% of the orders [19]. Traders responsible for the bulk of the over 300K orders per day were "algorithmic traders" who, in 99% of the cases, only submitted limit orders (i.e., never to be matched in an actual trade). Such a difference must be accounted for by any protocol, an efficiency constraint that we state below.

Proportional Burden: Each computation should be mainly a burden for the trader benefiting from it (e.g. posting an order or proving one's solvency). Other traders should join the protocol only to avoid risks (of failed solvency).

TABLE 3

Forcing Alice out of the market
Alice accumulates 90 selling contracts currently at the price of 10 and have a cash margin of 1400. As the price fluctuates by $\delta_P$ her inventory liquidation price is $X_{Alice} = -90 \times (10 + \delta_P)$, and her net position is $N_{Alice} = 1400 + X_{Alice} = 500 - 90 \times \delta_P$. When $\delta_P = 0$, she holds a small margin (at \$500). When $\delta_P = 6$, her net position drops to -\$40 and she has to be netted out from the market.

| | Price = \$10 | | | Price = \$16 |
|---|---|---|---|---|
| Trader | Cash | Contracts | Position | Position |
| Alice | 1400 | -90 | 500 | -40 |
| Bob | 1200 | 30 | 1500 | 1680 |
| Carol | 1200 | 30 | 1500 | 1680 |
| Eve | 1200 | 30 | 1500 | 1680 |

THE PRICE DISCRIMINATION ATTACK (§ 3)

If confidentiality and anonymity fail, some traders can act strategically by posting orders that they do not intend to honor so that other traders will be maliciously forced out of the market (see the Risk Management entry from Table 1 in § 1). This attack has been first reported by [21]. Assume Alice, Bob, Carol, and Eve are in a market. Alice accumulates a large short position of 90 contracts selling at \$10 each, each other trader buys 30 contracts from Alice at this price. In English, her inventory holds 90 promises to sell. To estimate a trader's exposure, the Exchange assumes that all contracts are bought and sold instantaneously at the current mid price of \$10 (See FIG. 1 in § 1). So, to fulfill her promise to sell 90 contracts Alice would have to buy them first from the current mid price and reduce her cash availability to 1400−90·10=500. We have the situation shown in Table 3 (left). If Alice could wait, she could post a buy order of \$9.50. If somebody eventually matched her order later in the day she would obtain a modest profit (50c per contract). If Carol and Eve know that Alice is a small investor and needs cash, they can generate an instant profit by changing the liquidity profile of the market. They can post buy orders at slightly higher prices, this changes the mid prices and pushes the liquidation price of Alice's position higher. Alice could try to sell to those buy orders, but this pushes the contracts more deeply negative in a rising market exacerbating her problem of being close to the margin call. Eventually, the liquidation price is high enough, e.g. \$16, that Alice's net position is below the margin call threshold and Alice is cashed out, with a realized payout to the other traders, i.e. her \$500 is given to the other traders. The other traders can then cancel their orders and the price could then decrease back to \$10 or even lower (when Alice's trades would have been profitable), but Alice cannot benefit from this price as she has already been cashed out. The other traders have not actually traded anything and still forced Alice to a margin call just by adjusting their buy quotes strategically. Thus, Eve and Carol have price discriminated Alice: their pricing strategy could only work because they knew exactly how much was in Alice's pocket and therefore how much was needed to nudge her out. The opposite problem can be generated from a long position and the market then being artificially deflated.

TABLE 4

Market Indicators for the current round t of the Futures Market

| Indicator | Notation | Definition | Description |
|---|---|---|---|
| Best sell price index | $l_{sell}$ | $\min\{\ell' \mid (t', \ell', i', v' < 0) \in \mathcal{C}\}$ | Index of the lowest price of all sell orders in the order book |
| Best buy price index | $l_{buy}$ | $\max\{\ell' \mid (t', \ell', i', v' > 0) \in \mathcal{C}\}$ | Index of the highest price of all buy orders in the order book |
| Mid price | $\vec{p}$ | $(p_{l_{sell}} + p_{l_{buy}})/2$ | The average value of the best buy price $p_{l_{buy}}$ and best sell price $p_{l_{sell}}$ |
| Available volume at price $p_h$ | $V_h$ | $\Sigma_{(t' \leq t,\, h,\, i',\, v') \in \mathcal{C}} \lvert v' \rvert$ | The sum of volumes over all orders at price $p_h$ |
| Available sell volume up to $p_h$ | $V_h^{sell}$ | $\sum_{\ell = l_{sell}}^{h} V_\ell$ | Aggregation of all volumes available from the best sell price $l_{sell}$ to the final maximum acceptable price $p_l$ ($\ell \leq l_{sell}$) |
| Available buy volume down to $p_h$ | $V_h^{buy}$ | $\sum_{\ell = l_{buy}}^{h} V_\ell$ | Aggregation of all volumes available from the best buy price $l_{buy}$ to the final least acceptable price h ($\ell \leq l_{buy}$) |

TABLE 5

Value cash(v) to liquidate an inventory of volume v

| Cases | Definition | Description |
|---|---|---|
| $v > 0$ (long) and $V_1^{buy} \geq v$ | $\sum_{h=l_{buy}}^{l+1} p_h \cdot V_h + p_\ell \cdot (v - V_{l+1}^{buy})$ | Cash a trader can get upon selling all volume v at the current buy quotes in the order book, where l is the least index s.t. $V_l^{buy} \geq v$. |
| $v > 0$ (long) and $V_1^{buy} < v$ | $\sum_{h=l_{buy}}^{1} p_h \cdot V_h + p_1 \cdot (v - V_1^{buy})$ | The order book does not have enough supply on the buy side. |
| $v < 0$ (short) and $V_L^{sell} \geq |v|$ | $-\sum_{h=l_{sell}}^{l-1} p_h \cdot V_h + p_l \cdot (|v| - V_{l-1}^{sell})$ | Cost a trader must pay to buy all volume v from the current sell quotes in the order book, where l is the least index s.t. $V_l^{sell} \geq |v|$ |
| $v < 0$ (short) and $V_L^{sell} \geq |v|$ | $-\sum_{h=l_{sell}}^{L} p_h \cdot V_h + p_L \cdot (|v| - V_L^{sell})$ | The order book does not have enough supply on the sell side. |

FORMAL FUTURES MARKET DESCRIPTION (§ 4)

Formally a futures market consists of N traders, each trader identified via an index i∈[N], and a sequence of L available prices (for the limit orders) in ascending order (i.e., $p_1 < p_\ell < p_L$ for $\ell \in [L]$). In the CME Globex, trading operations starts with an indicative opening price (IOP). Other prices are an integer number of upward or downward ticks from the IOP. A price is always non-zero and each underlying asset of a futures contract usually has a reasonable upper bound for the price. Hence we can map possible prices into a finite list of L available prices and refer to a price only with its index $\ell$. The market evolves in rounds, where T is the maximum (constant) number of rounds. At CME an open cry starts at 7:20 and ends at 13:59:00, the evolution of time is accounted for by with the number of rounds. The data stored (and updated) for the current round t∈[T] is a tuple (O, I).

The set O is the limit order book, and consists of a sequence of tuples o'=(t', $\ell$', i', v'), where o' represents a limit order posted at round t'≤t by a trader $P_{i'}$ for a desired volume v'≠0 of price $p_{\ell'}$. A limit order is a "sell" order if v'<0, and a "buy" order otherwise.

$I_i$=(m[i], v[i]) is the Inventory of a trader i∈[N] where:
 The value v[i] is the number of contracts held by the trader (for long positions v[i]>0, for short ones v[i]<0);
 The value m[i] is the cash available to the trader. Initially, every trader starts with no contract in the inventory as well as a non-negative deposit (i.e., ∀i∈[N]:v[i]=0, m[i]≥0), and the market is an empty order book (i.e., O=∅).

To express the constraints that a trader can meet her obligations and make orders within her means we introduce some auxiliary functions. The instant net position n[i] is the cash she can get (or must pay) upon liquidating all her contracts:

$$\eta[i] = m[i] + cash(v[i]) \quad (1)$$

where cash(v[i]) represents the liquid value of the inventory, i.e., the amount of cash a trader $P_i$ can get (or must pay) upon selling (or buying) all volume holding v[i] at the current buy (or sell) quotes in the order book.

The function ^. represents the estimated value of a trader's inventory variables if the market accepted her new order. Auxiliary definitions used in the calculation of market conditions are listed in Table 4 (mid price, best sell price, etc.) while cash(v[i]) is defined in Table 5. For the estimated value of the inventory when a trader $P_i$ posts an order (t, $\ell$, i, v) at price $p_\ell$ for a volume v in round t, we have:

$$\hat{m}[i] = m[i] - p_\ell \cdot v, \hat{v}[i] = v[i] + v, \hat{\eta}[i] = \hat{m}[i] + cash(\hat{v}[i]) \quad (2)$$

We can now formalize the properties, which must hold at every round, corresponding to the security/economic requirements informally introduced in § 2.

Definition 1 (Market Integrity). The amount of cash available by all traders is constant, i.e.

$$\sum_{i=1}^{N} m[i] = \sum_{i=1}^{N} m[i]'$$

where m[i]' is the margin at time t'≥t), the total volume holding is zero, i.e.

$$\sum_{i=1}^{N} v[i] = 0$$

and the best buy price is less than the best sell price ($1 \leq \ell_{buy} < \ell_{sell} \leq L$).

Definition 2 (Traders Solvency). All traders have a positive instant net position (η[i]≥0) and can afford the new limit order at posting time ($\hat{\eta}[i] \geq 0$).

Definition 3 (Availability of Orders with Anonymity of Trader). For any order (t, $\ell$, i, v) posted at time t, the order information (t, $\ell$, v) must be made public before time t+1, whilst information about i is only known to $P_i$.

Definition 4 (Confidentiality of Trader Inventory). Only $P_i$ knows the values of $I_i$=(m[i], v[i]) as well as η[i] with the exception of time T after mark-to-market when v[i]=0.

The two previous requirements imply that $\hat{m}[i]$ and $\hat{v}[i]$, as well as $\hat{\eta}[i]$ must also be confidential (otherwise one could recover the inventory by reversing the computation from orders).

Definition 5 (Trader's Precedence Traceability). Let O be the current order book, (t, $\ell$, i, v) be an order, and t' be the smallest round t'<t such that (t', $\ell$, i', -v')∈O then the order book O* at time t+1 respects traders precedence given order (t, $\ell$, i, v) and order book O iff
 1. if no such t' exists for O, then O*=O ∪ {(t, $\ell$, i, v)},
 2. if |v|<|v'|, then O*=O ∪ {(t', $\ell$, i', v-v')}\{(t', $\ell$, i',-v')}
 3. else O* respects traders precedence given order (t, $\ell$, i, v-v') and order book O\{(t',$\ell$,i',-v')}

TERMINOLOGY AND TECHNICAL PROBLEM ADDRESSED BY INVENTION (§ 5)

As an example of an asset bought and sold by means of an order book in a double auction market facilitated by a limit order book, a futures contract is a standardized agreement between two parties to buy or sell an underlying asset, at a price agreed upon today with the settlement occurring at some future date [29]. They are "promises" to buy or sell, and these "promises" can themselves be traded as new information updates the future price. Such trading is typically conducted in a double auction market operated by a centralized clearing house called Futures Exchange [13], such as the CBOE, the CME Chicago Mercantile Exchange (CME), Eurex Exchange (Eurex) and others. For sake of illustration only but not limiting the scope in any way we use the CME to illustrate the practical relevance of our technical solution. Traders can 'quote' a future by specifying a price and notional volume of assets at which they will buy or sell (a limit order), or initiate a trade by placing a market order for a "promise" of a quantity (purchase or sale) at the best price from the standing quotes.

An order book is used by N traders that participate in the market, each trader identified via an index $i \in [N]$. It also includes a (possibly finite) list of L available prices at which buy and sell orders can be made for the desired volume. A price is always non-zero and each underlying asset of the order usually has a reasonable upper bound for the price. We refer to the price only with index $\ell$ (for the limit orders) in ascending order (i.e., $p_1 < p\ell < p_L$ for $\ell \in [L]$). The market evolves in round, where T is the maximum number of rounds. FIG. 2 illustrates the main states of a Market as they could be implemented by any mean, including a Centralized Server Exchange as the CME, a state-of-the-art distributed implementation based on multi-party computation or by suing the technical solution proposed by the inventors. For illustrative purpose we use a Centralized Exchange in FIG. 2 and we ignore the possibility of making a margin call for a broke trader as its addition would be immediate to anybody familiar in the state of the art (See § 4, Table 4 and Table 5 for additional definitions). A typical evolution of the market includes processing orders (Post/Cancel Order phases), netting out broke traders (Margin Settlement phase), and finally offset all positions (Mark to Market phase). The first important functionality is to made available to all traders an aggregated list of all waiting buy and sell (anonymized) orders: the order book. It includes the volume of contracts being bid or offered at each price point. It is illustrated in FIG. 1 in § 1. The particular security and financial integrity properties that must be guaranteed by a Centralized or Distributed Exchange are described in § 4 and the detailed steps to execute them in § 15 of the detailed description of some embodiments of the invention.

STATE OF THE ART (§ 6)

It is possible for anybody expert in the state of the art to implement the above Exchange transition in FIG. 2 in a secure, private way by using secure distributed Multi Party Computation (MPC) [11]. A designer skilled in the state of the art has available secure channels between the traders (which in turn can be obtained using standard cryptographic tools), an anonymous network (such as Tor), and a distributed ledger (such as HyperLedger). These assumptions already appeared in several prior works, most notably [1]. He can also use traditional security services linked to distributed payments. In this respect we leverage on some functionalities for anonymous payments, such as as those provided by ZeroCash [1]: zero-knowledge succinct non-interactive arguments of knowledge, a.k.a. zk-SNARKs [3]. For example, for a proof of concept implementation we used zk-SNARKs for the managing the evidence about trader's commitment in zero knowledge, and the SPDZ protocol [11] for the multi-party computation. The above works have been used as purely illustrative examples. Any equivalent functionality will obtain the same security guarantees. Anyone skilled in the above state of the art can implement the diagram in FIG. 2 by using MPC. To do so that for every state in the figure one can use the detailed flow of instructions, expressed in linear form in FIG. 15 and FIG. 16 in § 18 (which would be familiar to anyone skilled in Futures Markets) by having all traders in the market perform at once the same computations so that no trader learns anything except the overall final result of the computation as it would have been made it possible by running the computation through a centralized Exchange.

The object of the present invention is to provide a method and an apparatus for a distributed exchange and order book by using a novel specially designed combination of Non-Interactive Zero-Knowledge (NZK) proofs and MPC functionalities so that the burden of computation to execute the functionality in a distributed way a set of agents owing each one or more trader devices is mostly on the trader's device responsible for posting or cancelling an order.

In traditional applications of MPC, such as auctions and e-voting, such benefit would not be material: everybody submits one bid or casts one vote. For a future exchange this is important: for example retail and institutional investors are 71% of traders in the TSX market, but only make 18% of the orders [19]. Traders responsible for the bulk of the over 300K orders per day were "algorithmic traders" who, in 99% of the cases, only submitted limit orders (i.e., never to be matched in an actual trade).

The proposed technical invention is beneficial to the development of distributed, secure privacy-preserving and integrity-preserving exchange and order book that allows for a fair computation share by those traders who infrequently place bids.

SUMMARY OF THE INVENTION (§ 7)

Disclosed is a computer implemented method for implementing a distributed exchange with a distributed, privacy-preserving and integrity-preserving order book among traders wishing to engage in distributed double auctions and markets, wherein each trader has his own computing device. An exemplary method comprises i) generating and broadcasting, by a trader's computing device of a trader wishing to post or cancel an order, a cryptographic commitment to a valid initial inventory;

ii) generating and broadcasting, by said trader's computing device, a Non Interactive Zero-Knowledge proof that said initial inventory is valid;

iii) generating, by all the other trader's computing devices, a Non Interactive Zero-Knowledge verifier configured to verify said proof;

iv) performing, by all the trader's computing devices, a Multi Party Computation (MPC) to check if there are new broke trader's computing devices;

v) if there is no new broke devices:

vi) go back to step i) for a new round, or vii) fulfilling the order by at least one of the other trader's computing devices matching the posted order, or viii) at the last round, generating, by all the trader's computing devices, a Non Interactive Zero-Knowledge function performing a marking to market procedure;
ix) if there is at least one broke device:
x) net out each broke device, and
xi) go to step v).

In one example, the order book comprises a Private Order Book, a Public Pending Transaction Book, and a Public Trader Commitment Book, the Public Trader Commitment Book being implemented by means of a Merkle Hash Tree.

According to an embodiment, information about the traders are stored into an Inventory Book comprising a Private Trader Status Book, a Private Inventory Book, for each trader, a Trader Status Crypto Token linking the entries of the Private Trader Status Book and of the Private Inventory Book, a Public Trader Commitment Book and a Public Trader Commitment Book Backup.

According to an embodiment, the method comprises a submission protocol, "Π-put", comprising:
a trader device using a commitment module to generate a token commitment corresponding to the current trader device inventory;
said trader device using a network module to broadcast the generated token commitment;
said trader device using a token proof generation module (F-token-gen) to generate a zero-knowledge proof to prove that the token is correctly constructed;
said trader device using the network module to broadcast the generated zero-knowledge proof;
each receiving trader device using a token proof verification module (F-token-ver) to verify the received zero-knowledge proof;
upon the verification module accepting the zero knowledge proof, the receiving trader device adding the new token as a leaf to the current Merle Tree and computing the new Merkle Tree root.

In one example, the Public Trader Commitment Book is implemented by means of a Merkle Hash Tree. In such an example, the method includes a receiving protocol, "Π-get", comprising:
the trader device broadcasts the pre-image of a leaf in the current Merkle Tree;
all other trader devices check that the pre-image has not appeared before;
the trader device uses a merkle proof generation module (F-merkle-gen) to generate and broadcast a zero-knowledge proof to prove that the said pre-image is of a leaf in the current Merkle Tree;
all other trader devices use a merkle proof verification module (F-merkle-ver) to verify the zero-knowledge proof;
the trader device uses a commitment module to generate and broadcast a commitment to a first token corresponding to the current trader device inventory;
the trader device uses an inventory proof generation module (F-inv-gen) to generate and broadcast a zero-knowledge proof to prove that the first token is correctly constructed from the said pre-image;
the trader device broadcasts the new order or the wish to cancel a pending order;
the trader device locally updates the trader device inventory with respect to the new order or the newly cancelled order;
the trader device uses the commitment module to generate and broadcast a commitment to a second token corresponding to the new trader device inventory;
the trader device uses an inventory-update proof generation module (F-invupdate-gen) to generate and broadcast a zero-knowledge proof to prove that the second token is correctly constructed from the new trader device inventory;
all other trader devices use an inventory-update proof verification module (F-invupdate-ver) to verify the zero knowledge proof;
all the trader devices add the new token as a leaf to the current Merle Tree and compute the new Merkle Tree root.

In one example, the trader device inventory comprises binary flags, including:
a broke device flag, "f-bad", representing the information on whether the trader owning the corresponding device is broke;
a pending orders flag, "f-cancel", representing the status of a trader's device pending orders;
a contracts flag, "f-out", representing the status of a trader's device holding contracts;
wherein all flags are 0 initially (f-bad=0, f-cancel=0 and f-out=0) to represent that a trader device inventory is in good standing.

If the trader device is broke, "f-bad" is switched to 1, while "f-cancel" and "f-out" both stay at 0;
in margin settlement, "f-cancel" is switched to 1 if all pending orders of the broke trader device have been cancelled and "f-out" is switched to 1 if all holding contracts of the broke trader device have been bought or sold,
the method comprising a validation protocol, "Π-valid", comprising:
all trader devices run the receiving protocol, "Π-get" protocol;
the trader device broadcasts the pre-image of the trader device inventory flags;
all other trader devices check:
in case of a posting/cancelling an order, if the broke device flag "f-bad"=0;
in case of cancelling all pending orders in margin settlement, if the broke device flag "f-bad"=1 and "f-cancel"=0;
in case of posting a new order to liquidate current trader device holding contracts, if the flags "f-bad"=1, "f-cancel"=1 and "f-out"=0;
if the trader device wishes to cancel a pending order:
the trader device broadcasts the commitment coupled with the to-be-cancelled order;
the trader device uses the ownership proof generation module (F-own-gen) to generate and broadcast the zero-knowledge proof to prove that it owns the pre-image of the said commitment;
all other trader devices use the ownership proof verification module (F-own-ver) to verify the zero-knowledge proof;
the trader device locally computes the new net position of the trader device inventory with respect to the new order or newly cancelled order;
the trader device uses the commitment module to generate and broadcast a commitment to the volume and price ranges used to compute the new net position corresponding to the new trader device inventory;
the trader device uses a range proof generation module (F-range-gen) to generate and broadcast a zero-knowledge proof to prove that the volume and price ranges used to compute the new net position is correctly computed from the new trader device inventory;
all other trader devices use a range verification module (F-range-ver) to verify the zero knowledge proof;
the trader device uses the commitment module to generate and broadcast a commitment to the new net position corresponding to the new trader device inventory;

the trader device uses a net position proof generation module (F-netpos-gen) to generate and broadcast a zero-knowledge proof to prove that the new net position is correctly computed from the new trader device inventory;

all other trader devices use a net position verification module (F-netpos-ver) to verify the zero knowledge proof;

the trader device uses the commitment module to generate and broadcast a commitment to the new flags corresponding to the new trader device inventory and new position;

the trader device uses a flag proof generation module (F-flags-gen) to generate and broadcast a zero-knowledge proof to prove that the new flags is correctly computed from the new trader device inventory and new position;

all other trader devices use a flag proof verification module (F-flags-ver) to verify the zero knowledge proof;

the trader device uses a margin proof generation module (F-nonneg-gen) to generate and broadcast a zero-knowledge proof to prove that the new position is above the margin requirement;

all other trader devices use a margin verification module (F-nonneg-ver) to verify the zero knowledge proof;

all trader devices run the submission protocol, "Π-put".

In one example, a matching protocol, "Π-match", is provided, comprising: all trader devices run the receiving protocol, "Π-get" for the first trader device; all trader devices run the submission protocol, "Π-put", for the first trader device;

the steps above are repeated for the second trader device.

According to one embodiment, the method further includes a check protocol, "F-check", comprising:

each trader device uses the MPC module to generate the input encoding of the private parameters, said private parameters including its own net position in the current round, and the private random numbers from a random generator module;

each trader device broadcasts the input encoding so computed to the other trader devices using the network module;

each receiving trader device uses the MPC module to compute an encoded output based on the public input and the received encoded inputs;

each receiving trader device uses the network module to send the encoded output to the network module of other trader devices;

each trader device receiving the encoded output uses the MPC module to:

check whether all other traders devices' respective private input, i.e. net position in the current round, correspond to the public input commitments of net position in the current round, and return 0 if at least one check fails;

compare the net position of all trader devices with 0 and return 0 if any net position is less than 0;

return 1 if no value has been already returned.

In one example, a backup protocol, "Π-backup", is provided, comprising:

repeating, for all trader devices:

all trader devices run the receiving protocol, "Π-get";

all trader devices run the submission protocol, "Π-put";

all trader devices run the check function, "F-check";

if the check function, "F-check" is successful, all trader devices run the submission protocol, "Π-put".

In one example, the comparing function, "F-compare", comprises:

each trader device uses the MPC module to generate the input encoding of private parameters including its own old inventory flags in the previous round, its own new inventory flags in the current round, and the private random numbers from the random generator module;

each trader device broadcasts the input encoding so computed to the other trader devices using the network module;

each receiving trader device uses the MPC module to compute an encoded output based on the public input and the received encoded inputs;

each receiving trader device uses the network module to send the encoded output to the network module of other trader devices;

each receiving trader device uses the MPC module to:

check whether all other traders devices' respective private old inventory flags in the previous round, new inventory flags in the current round, correspond the public input commitments of old inventory flags in the previous round and new inventory flags in the current round, and return 0 if at least one check fails;

compute the sum across all trader devices of all mentioned private new flags and the sum across all trader devices of all mentioned private old flags and returning 0 if the two sums are different;

return 1 if no value has been already returned.

According to one embodiment, the method includes an optimized comparing function, comprising:

each trader device uses the MPC module to generate the input encoding of the private parameters including its own old inventory flags in the previous round, its own new inventory flags in the current round, and the private random numbers from the random generator module, where necessary;

each trader device broadcasts the input encoding so computed to the other trader devices using the network module;

each receiving trader device uses the MPC module to compute an encoded output based on the public input and the received encoded inputs;

each receiving trader device uses the network module to send the encoded output to the network module of other trader devices;

each receiving trader device uses the MPC module to compute the sum across all trader devices of all mentioned private new flags and the sum across all trader devices of all mentioned private old flags and return 1 if the two sums are equal;

if the sums are equal, each trader device uses a status proof generation module (F-equal-gen) to prove in zero-knowledge that the status unchanged;

each other trader device use a status verification module (F-equal-ver) to verify the zero knowledge proof;

otherwise return 0 and, each trader device uses the MPC module to compute a random trader device that changes status;

the random trader device uses the proof generation module (F-nequal-gen) to prove in zero-knowledge the status changes;

each other trader device use the verification module (F-nequal-ver) to verify the zero knowledge proof.

In one example, the three binary flags (f-bad, f-cancel and f-out) are replaced by a single integer; and/or the merkle generation module and verification module and the inventory update generation module and verification module are combined into optimized generation module (F-minv-gen) and verification module (F-minv-ver), so that the receiving protocol, "Π-get", is replaced by an optimized receiving protocol, "Π-get-opt", in which:

the trader device broadcasts the pre-image of a leaf in the current Merkle Tree;

all other trader devices check that the pre-image has not appeared before;

the trader device broadcasts the new order or the wish to cancel a pending order;

the trader device uses the commitment module to generate and broadcast a commitment to the token corresponding to the current trader device inventory updated with respect to the new order or the newly cancelled order;

the trader device uses the optimized proof generation module (F-minv-gen) to generate and broadcast a zero-knowledge proof to prove that the first token is correctly constructed from the said pre-image and updated with respect to the new order or the newly cancelled order;

all other trader devices use the optimized proof verification module (F-minv-ver) to verify the zero knowledge proof;

and/or the range generation and verification modules and the net position generation and verification modules are combined into optimized net position proof generation module (F-rnetpos-gen) and optimized net position verification modules (F-rnetpos-ver), so that:

the trader device uses the commitment module to generate and broadcast a commitment to the new net position corresponding to the new trader device inventory;

the trader device uses the proof generation module (F-rnetpos-gen) to generate and broadcast a zero-knowledge proof to prove that the new net position is correctly computed from the new trader device inventory;

all other trader devices use the proof verification module (F-rnetpos-ver) to verify the zero knowledge proof;

and/or parallelization of the proof generation module, in which all the proof generation modules (F-merkle-gen, F-inv-gen, F-invupdate-gen, F-own-gen, F-range-gen, F-netpos-gen, F-flags-gen, F-nonneg-gen, F-equal-gen, F-nequal-gen, F-minv-gen, F-rnetpos-gen, F-neg-gen) are executed in parallel.

According to one embodiment, the method further includes an optimized check function comprising:

each trader device uses the MPC module to generate the input encoding of private parameters including its own net position in the current round, and the private random numbers from a random generator module, where necessary;

each trader device broadcasts the input encoding so computed to the other trader devices using the network module;

each receiving trader device uses the MPC module to compute an encoded output based on the public input and the received encoded inputs;

each receiving trader device uses the network module to send the encoded output to the network module of other trader devices;

each receiving trader device uses the MPC module to:

compare the net position of all trader devices with 0 and returns 1 if no net position is less than 0, and each trader device uses the proof generation module F-nonneg-gen to prove in zero-knowledge the status unchanged;

each of the other trader devices uses the verification module F-nonneg-ver to verify the zero knowledge proof;

each trader device returns 1 if no value has been already returned;

otherwise each trader device uses the MPC module to compute a random trader device that has negative net position;

the random trader device uses the proof generation module, "F-neg-gen", to prove in zero-knowledge the negative position;

all other trader devices use the verification module, "F-neg-ver", to verify the zero knowledge proof.

According to one embodiment, the cryptographic commitment includes an arithmetic/boolean formula for determining whether the trader outstanding position is still acceptable for the other traders, based on the memoized variable of previous positions and the value of current positions.

An exemplary distributed apparatus for implementing a distributed exchange with a distributed, privacy-preserving and integrity-preserving order book among traders wishing to engage in distributed double auctions and markets, comprises hardware and software means configured to implement one or more of the above disclosed methods.

In one embodiment, the distributed apparatus comprises:

a distributed order book, wherein confidential information about a trader's position (margin, posted orders, etc.) is stored privately at a trader's own computing device, the distributed order book comprising a ledger accessible to all trader's devices or individually by each of the traders, a commitment of the above information being stored publicly in said ledger;

a network module in each trader's computing device to send a certified piece of data representing a non-interactive proof;

a processing module coupled to the network module in the trader's device, said processing module being configured to execute the above described methods of claims 1-16;

a storage module coupled with the processing module to store private confidential information about the ledger, such as the cash available in the trader account, the volume of holding contracts, the pending orders and other information where necessary;

a random generator module to generate cryptographically strong random numbers;

an encryption and proof generation module that use the random generator module to generate the certified piece of data representing a non-interactive zero-knowledge (NZK) proof;

a commitment module that uses the random generator module to augment the piece of data so that the resulting generation of the module is a piece of data representing the commitment to trader's private information while being disassociated from the actual content of the piece of data to be used in the non-interactive proof;

a verifier module to check the received piece of data corresponding to the non-interactive proof from other trader devices;

an MPC module that uses the random generator module to privately compute a global function's output with other trader's devices regarding the trader device's secret input;

wherein the network module is adapted to broadcast the non interactive proof of a piece of data to the other network modules, wherein the network module is adapted to broadcast anonymously an order and the non-interactive proof of a piece of data to the other network modules;

wherein the processing module has access to a possibly different storage module either directly or indirectly through the network module to retrieve or store information about the public part of the distributed order book.

BRIEF DESCRIPTION OF THE DRAWINGS (§ 8)

The accompanying drawings, which are incorporated into and constitute a part of this specification, illustrate one or more example aspects of the present invention and, together with the detailed description, serve to explain their principles and implementations.

FIG. 1 is an example of an Order Book with limit orders; the dashed line is the average mid-price which is calculated by the CME as the (un-weighted) average of all price levels. Traders' holdings are evaluated against the mid-price.

FIG. 2 is a simplified Market State Transition Diagram of a Centralized Exchange. This diagram describes the possible states in which a Market, for example managed by a centralized exchange can be in. For simplicity we exclude the possibility of performing a margin call to broke traders to add more funds instead of being netted out. Such possibility is immediate to anyone familiar with the state of the art.

FIG. 3 is a Distributed network according to a possible embodiment.

FIG. 4 is a diagram of the protocols and method according to the invention to implement the general state diagram of FIG. 2 with a fair computational load for traders infrequently making bids. The functionalities $F^{inv}$, $F^{uinv}$, $F^{token}$ are not shown as they are always needed to interact with the trader's inventory. The protocols $\Pi_{valid}$, $\Pi_{net}$, $\Pi_{match}$ are part of the method and are reported in details in FIG. 18. The detailed steps of the method for each node are reported also in FIG. 22.

FIG. 7 represents the Fields of the Private Inventory Book.

FIG. 8 is a Virtual Private Order Book at time t.

FIG. 15 shows the operations of the ideal functionality FCFM for posting, cancelling and marking to market.

FIG. 16 shows the operations of the ideal functionality FCFM for margin settlement and order fulfillment.

Figure 17:
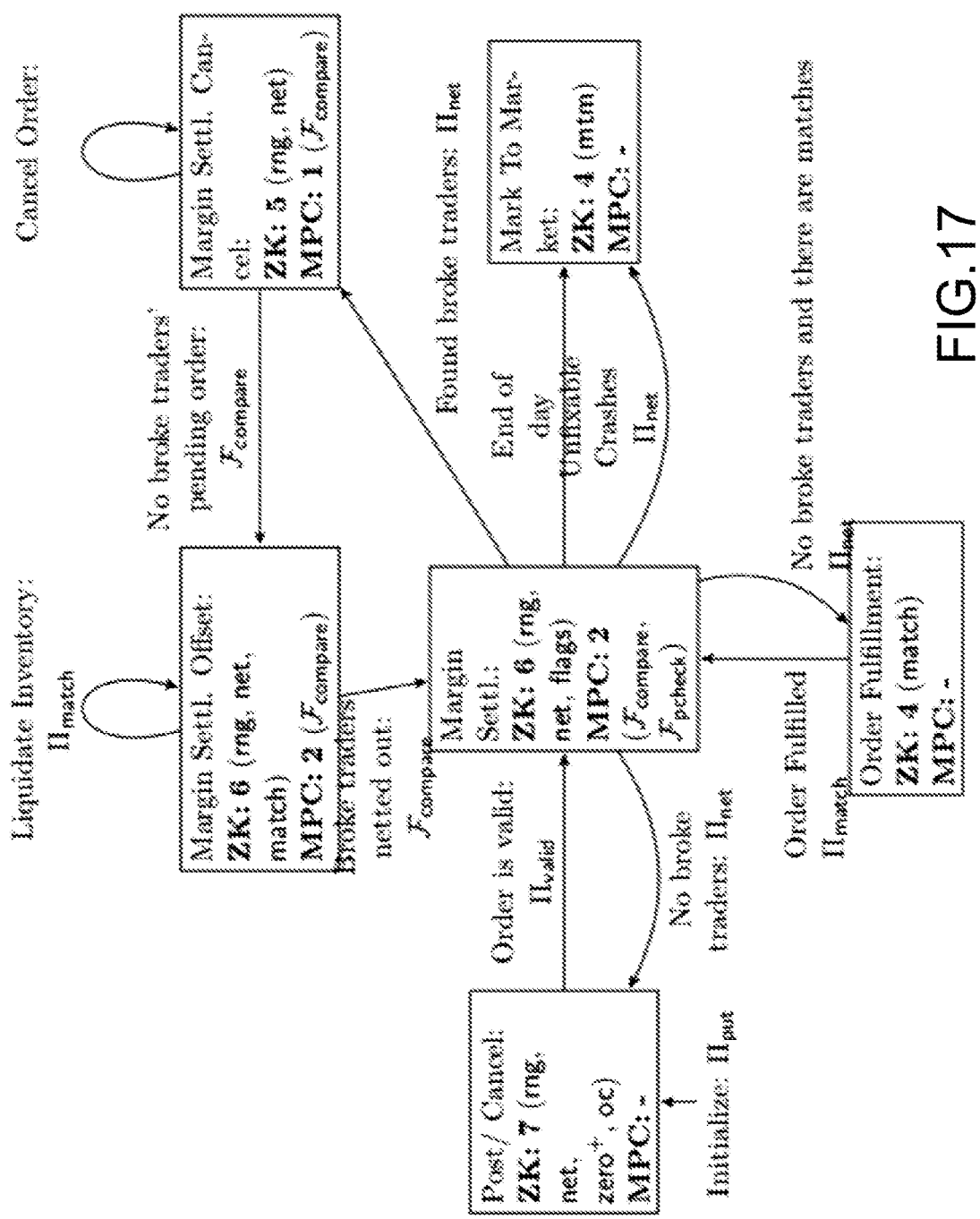

FIG. 17 is a Hybrid Implementation of the Ideal Functionality. The stateful functionality traverses several states. For every state, the required NI-ZK proof steps are shown, as well as the MPC steps. The sub-protocols $\Pi_{get}$, $\Pi_{put}$ and their functionalities inv, uinv, token may be required to interact with the trader's inventory.

FIG. 18 shows sub-protocols $\Pi_{valid}$, $\Pi_{net}$, $\Pi_{match}$ and $\Pi_{backup}$.

Figure 19:
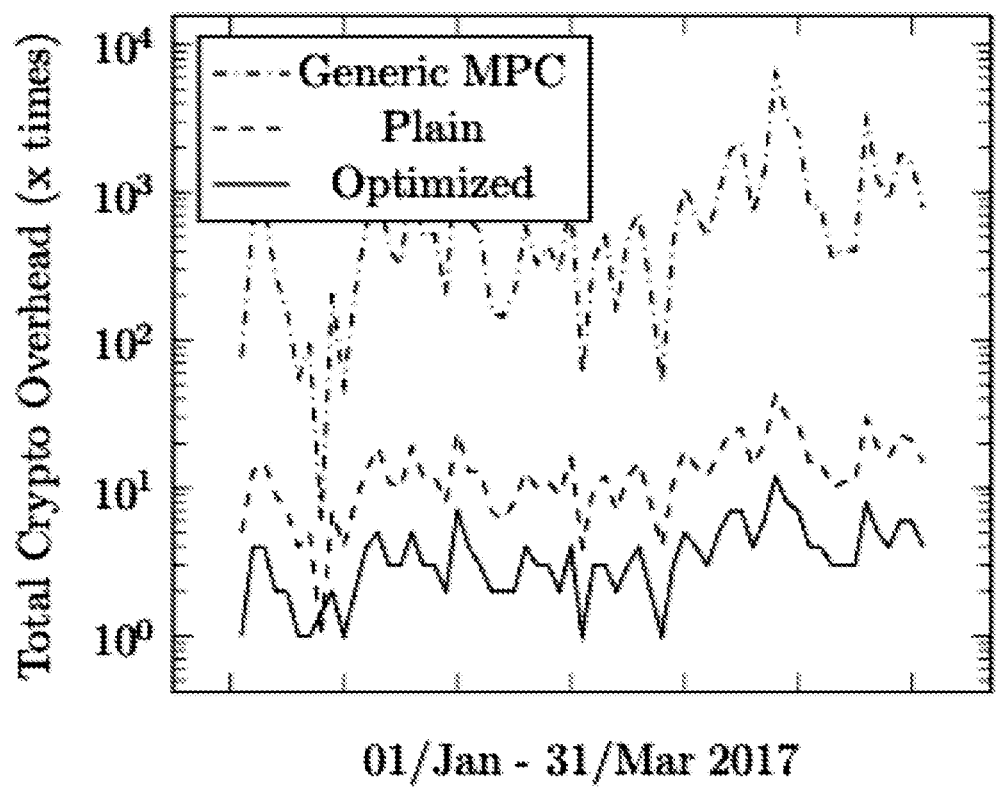

FIG. 19 is a diagram of Crypto Protocol Evaluation on Q1 of Lean-Hog. Performance in terms of execution overhead to the expected processing time (1 day). For the optimized version, only one day of trading exhibits overheads greater than 10× and only ten days greater than 5×. These overheads could be already offset by parallelizing the traders ZK-proofs (each trader has to do several of them) which would yield an improvement factor of 6×.

Figure 20:
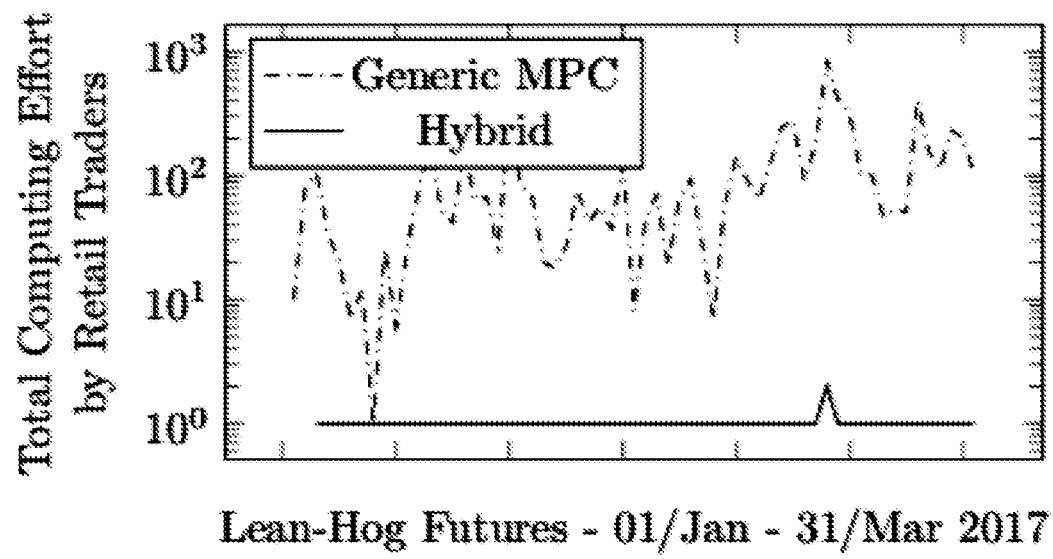

FIG. 20 is a diagram of the total burden of computation by retail traders. With MPC retail traders have to always participate whether they make an order or not (and they overwhelmingly don't [19]). They would be supplying to algorithmic traders some orders of magnitude of costly computing resources. With our approach the burden on retail traders is significantly smaller.

FIG. 21 shows sub-protocols $\Pi_{put}$ and $\Pi_{get}$.

Figure 22:
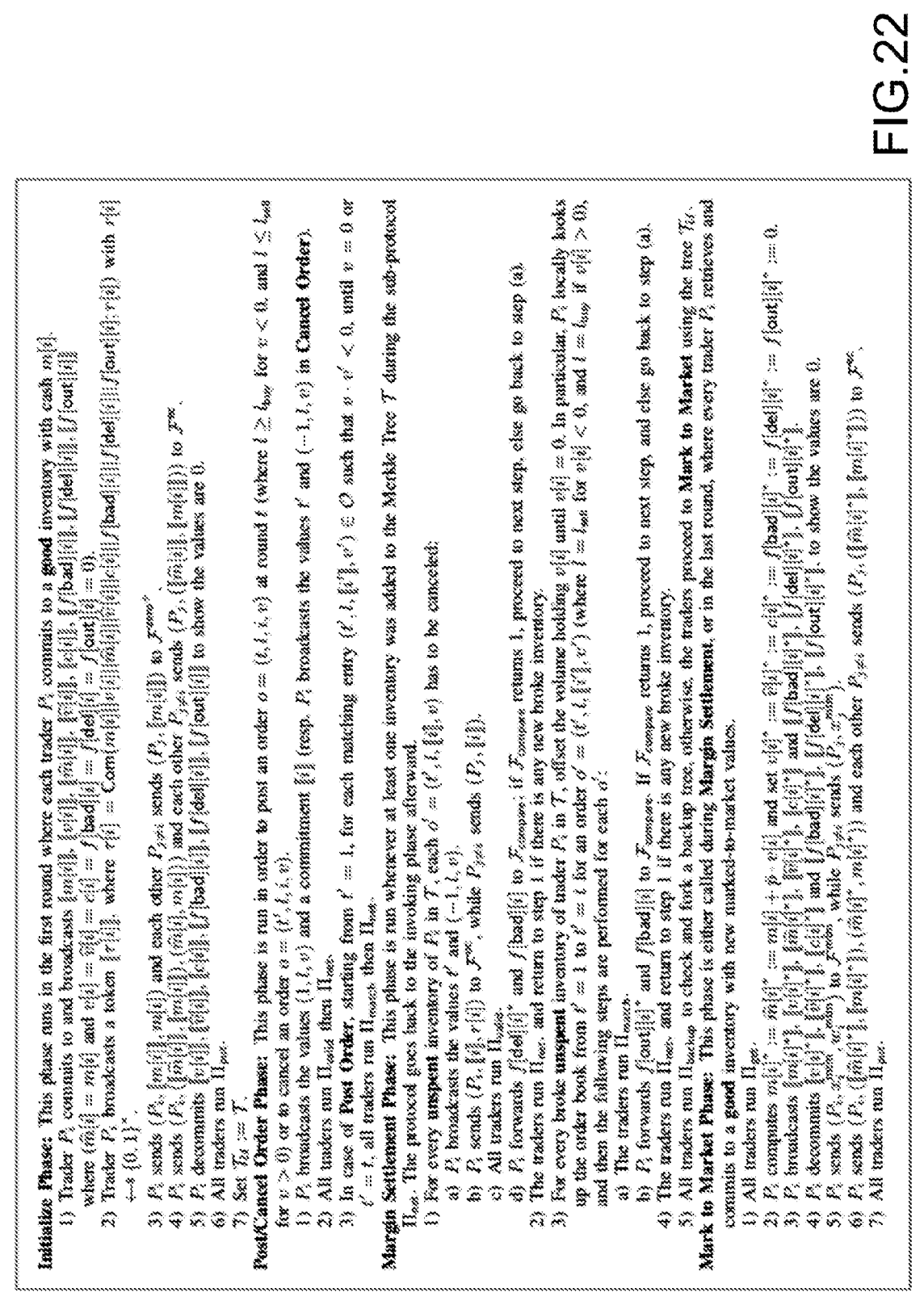

FIG. 22 shows protocol $\Pi_{DFM}$.

DESCRIPTION OF PREFERRED EMBODIMENTS (§ 9)

The following reviews the key features of the embodiments and provides a summary of the individual components, their interoperation and the rationale. We consider:

A distributed order book where confidential information about a trader's position (margin, posted orders, etc.) is stored privately at a trader's own device commitment of the above information is stored publicly which might be on a ledger accessible to all trader's devices or individually by each of the traders A network of trader devices possibly represented as a network module in a trader device to send a certified piece of data representing a non-interactive proof as explained in the method and a processing module coupled to the network module in the trader's device, to execute the said method, a storage module coupled with the processing module to store the private confidential information about the distributed ledger a random generator module to generate cryptographically strong random numbers, an encryption and proof generation module that use the random generator module to generate the certified piece of data representing a non-interactive zero-knowledge NZK proof, a commitment module that uses the random generator module to augment the piece of data so that the resulting generation of the module is a piece of data representing the commitment to trader's private information while being disassociated from the actual content of the piece of data to be used in the non-interactive proof which could be implemented but not limited to by a hash function, a verifier module to check the received piece of data corresponding to the non-interactive proof from other trader devices.

an MPC module that uses the random generator module to privately compute a global function's output with other trader devices regarding the trader device's secret input.

wherein the network adapter can broadcast the non interactive proof of a piece of data to the other node possibly by writing to a distributed ledger, for example by adding a ledger module to each trader device, wherein the network adapter can also broadcast anonymously an order and the non-interactive proof of a piece of data to the other node possibly by using an anonymous network.

wherein the processing module has access to a possibly different storage module either directly or indirectly through the network interface to retrieve or store information about the public part of the distributed distributed order book.

Figure 1:
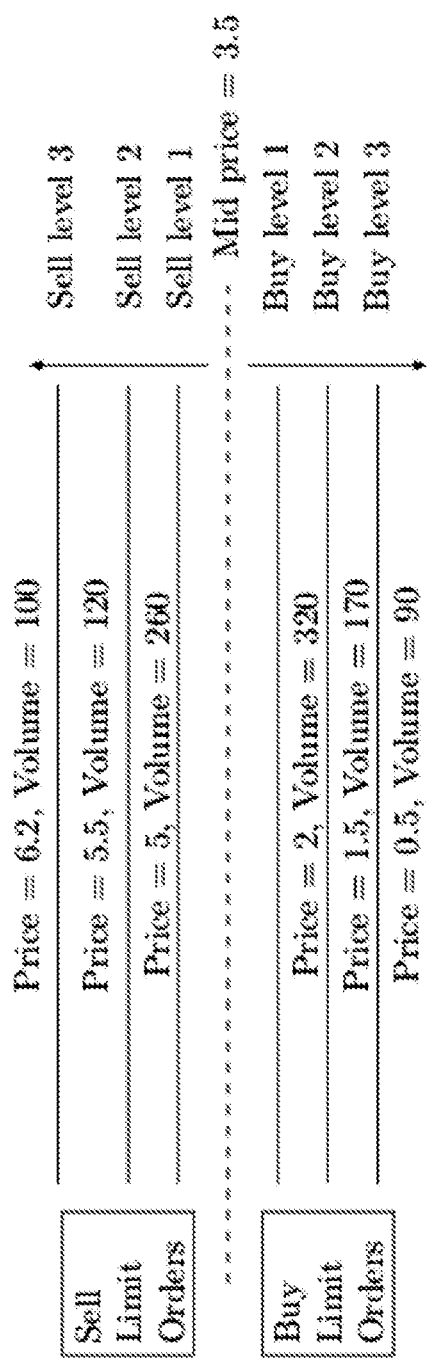
Figure 2:
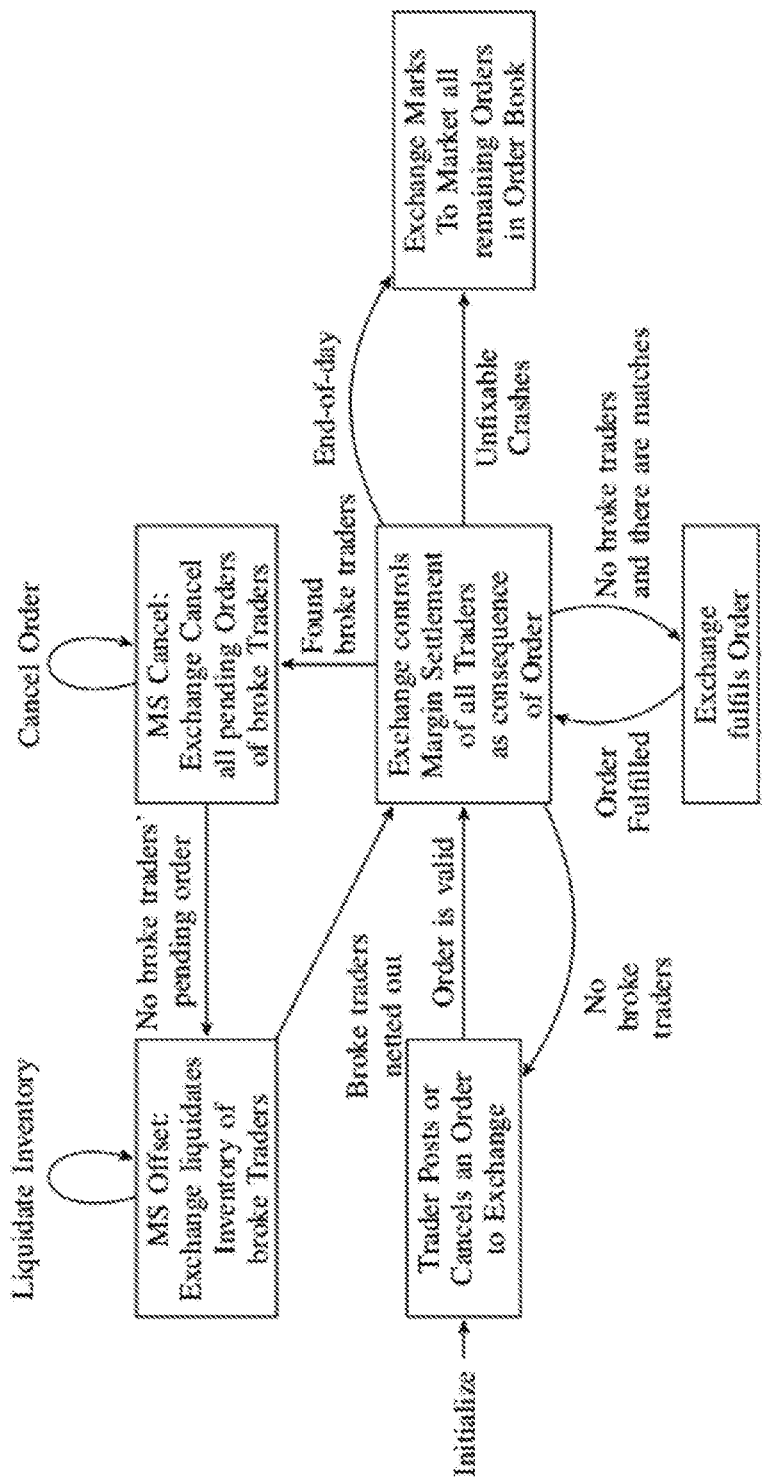
Figure 4:
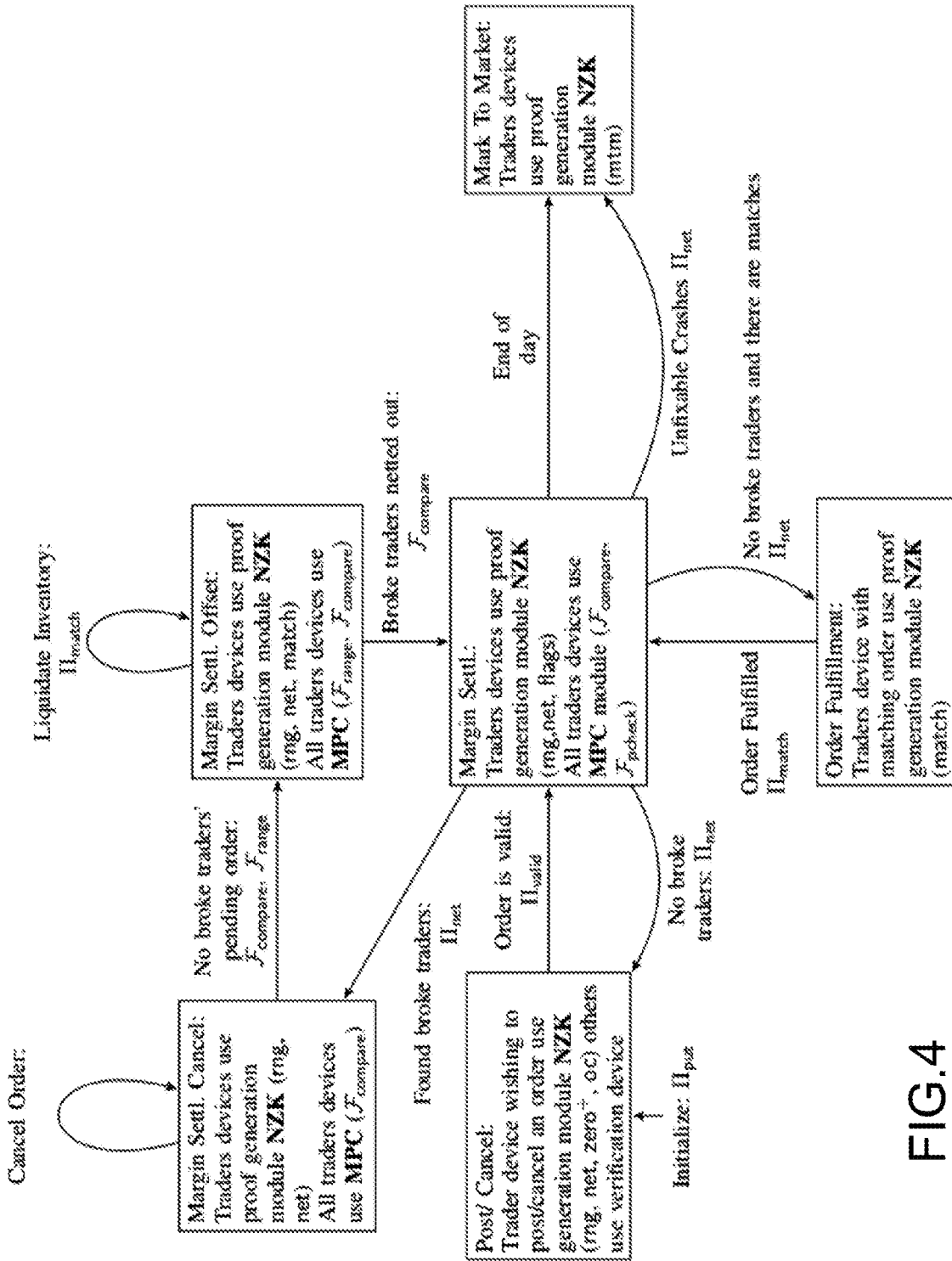

A method to operate such distributed apparatus whereas each state of FIG. 2 in § 5 is specifically implemented by using a suitable combination of NZK and MPC as summarized in FIG. 4. Such a method includes a technique to identify a trader's inventory and post/cancel orders via so-called tokens which can be spent/unspent in a publicly verifiable manner, while preserving the anonymity of the trader and the privacy of the trader's inventory, as detailed in FIG. 21. It also includes a process, described in FIG. 22, based on memoization which allows to fairly distribute the computation in situations where the trading activity might have large variance, by shifting the majority of the burden to the agent owning the trader device responsible for posting/canceling an order.

A method to optimize the above construction so that it scales to a larger number of trader devices to make it suitable for practical futures exchanges. Such a method relies on parallelizing the generation of the NZK proofs output by the proof generator module, by streamlining the validation on the outputs of the commitment module, and by simplifying some of the global functions that need to be computed through the MPC module. The details can be found in § 23 of the detailed description of some embodiments of the invention.

A method to extend the mechanism so that trader devices which fail for arbitrary reasons can be penalized. Such a method relies on the random generator module to call the proof generator module and the MPC module, as detailed in § 22 of the detailed description of some embodiments of the invention.

Figure 3:
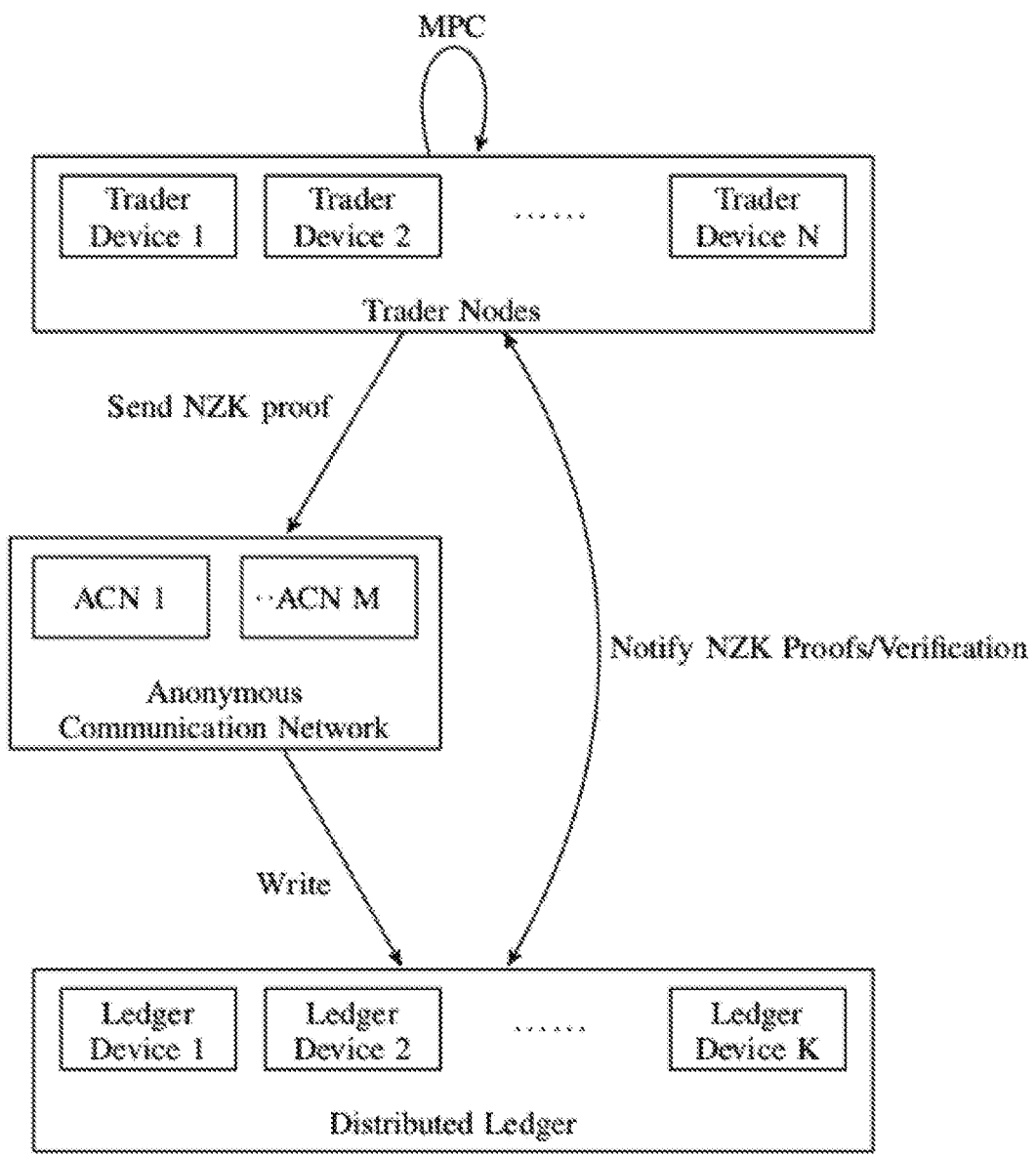

For notational convention we write $[\![ v ]\!]$ as the result of Commitment module Com(v; r) for a commitment to value v using random value $r \in \{0, 1\}^*$. Both v and r are input to the commitment module. FIG. 3 illustrate the particular, but not limiting to, embodiment of the network configuration in which a ledger is used as secure broadcast channel and an anonymous network is used for anonymous communication.

FIG. 4 maps the overall modules and protocols of the method to operate the apparatus into the overall Exchange State Diagram from FIG. 2. They are further detailed in the remainder of the patent proposal and in the detailed description of some embodiments of the invention.

THE DISTRIBUTED INVENTORY BOOK (§ 10)

Figures 5, 6:
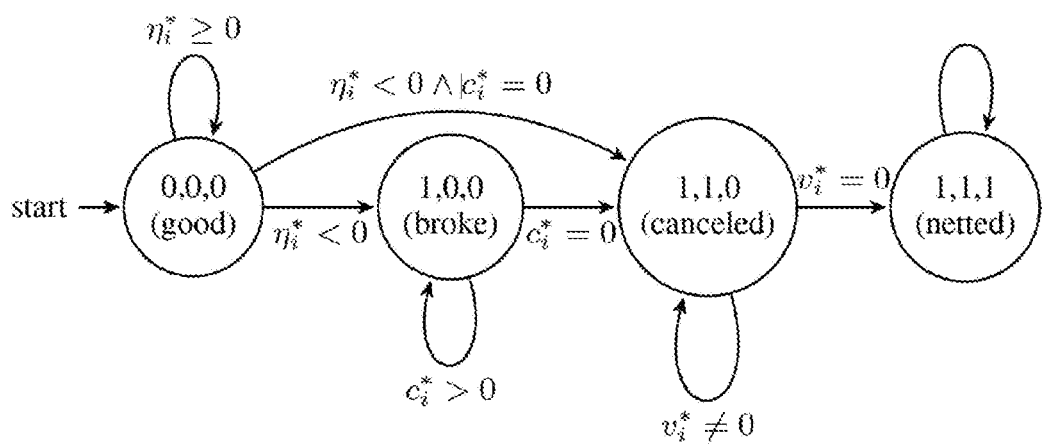
FIG. 5 represents Fields of the Private Trader Status Book.
FIG. 6 is an Authorized Inventory flags state transition diagram. The figure shows the required conditions to change flags value: good (0, 0, 0), broke (1, 0, 0), canceled (1, 1, 0) and netted (1, 1, 1).

The first part of the embodiments is a separation of the information about traders stored into an Inventory Book in three components:
1. The Private Trader Status Book,
2. The Private Inventory Book,
3. For each trader $P_i$, a Trader Status Crypto Token linking the entries of the two books.
4. The Public Trader Commitment Book and the Public Trader Commitment Book Backup, The Private Trader Status Book It summarizes the status of each trader device's inventory at each trading iteration t (FIG. 5).

Storage: Each trader device $P_i$ is responsible to store its own line of the Table. No other trader device has a knowledge of the values contained in the table.

Initialization: all trader devices are enabled in the Private Trader Status Book, i.e. f[bad][i]=f[del][i]=f[out][i]=0.

Authorized Operations: "Good" trader devices are allowed to post a limit order in the current round; in contrast, "broke" trader devices (e.g., a trader device netted out during margin settlement) cannot post new limit orders. Such constraint is enforced by the distributed protocol as no other trader has knowledge of these values. The authorized operation will follow the Diagram in FIG. 6.

The Private Inventory Book

It contains the fields described in FIG. 7. Such trader inventory is updated at each trading iteration t. Memorized values are used for the following benefits
1. improve the efficiency of the implementation with respect to the same process as executed by standard multi-party-computation
2. prevent the linking of limit orders during the verification procedure, while allowing the instantaneous computation of $\hat{\eta}[i]$.

We call an order a "sell" order if v[i]<0, otherwise, if v[i]>0, it is a "buy" order.

Storage: Each trader device $P_i$ is responsible to store its own line of the Table. No other trader device has a knowledge of the values contained in the table.

Initialization: no contract in the inventory as well as a non-negative deposit for every trader device (i.e., $\forall i \in [N]$: v[i]=0, m[i]≥0, c[i]=0);

Update: Each time a trader device $P_i$ posts an order $(\ell, v)$, the memoized values are updated as $\hat{m}[i]=m[i]-p^\ell \cdot v$, $\hat{v}[i]=$v[i]+v, and c[i]=c[i]+$\delta_c$ where $\delta_c$=1. For order cancellations, or complete matches of pending orders, the reverse computation is performed ($\delta_c$=−1).

Multiple Type of Orders: For sake of exposition we illustrate the case where a trader device can either hold long position v[i]>0 or short position v[i]<0 for a single type of order. If multiple type of orders are considered one should replace the single value v[i] with a vector of values as obvious.

Trader Status Crypto Token is calculated as the commitment of the concatenation of the fields of the Virtual Traders Inventory Table for the trader device $P_i$ as follows:

$$\tau[i] = \text{Com}(m[i]\|v[i]\|\hat{m}[i]\|\hat{v}[i]\|c[i]\|f[\text{bad}][i]\|f[\text{del}][i]\|f[\text{out}][i]; r[i])$$

The Public Trader Commitment Book

It contains a list of cryptographic tokens $\tau[i]$ for every instant t and trader device $P_i$. The Public Trader Commitment Book Backup is a backup of the Public Trader Commitment Book to be used to move to mark to market in unfixable state of the market.

Storage: Every trader device $P_i$ can store a copy of the table. Such table might also be stored globally through a distributed ledger.

THE DISTRIBUTED ORDER BOOK (§ 11)

A part of the embodiments is a separation of the traditional Order Book into the following components.
1. The Private Order Book,
2. The Public Pending Transaction Book,
3. The Public Trader Commitment Book which is implemented by means of a Merkle Hash Tree, as detailed in § 19 of the detailed description of some embodiments of the invention, by running the protocols $\Pi_{put}$ and $\Pi_{get}$ in FIG. 21 from § 25.

The Private Order Book

The limit order book O for $P_i$ is a sequence of tuples o' whose field are specified as in FIG. 8.

Storage: Each trader device $P_i$ is responsible to store its own line of the Table i.e. when $P'_i = P_i$. No other trader device has a knowledge of the values contained in the table. To avoid that trader devices lie about their past order the other trader devices uses the Public Pending Transaction Book with the given security protocols as they have no knowledge of these private values.

The Public Pending Transaction Book

Public Pending Transaction Book replaces the $P_i$ field of the Private Order Book with a cryptographic commitment ⟦$P_i$⟧ and the corresponding information.

GENERATION OF THE CRYPTOGRAPHIC COMMITMENTS (§ 12)

Figure 9:
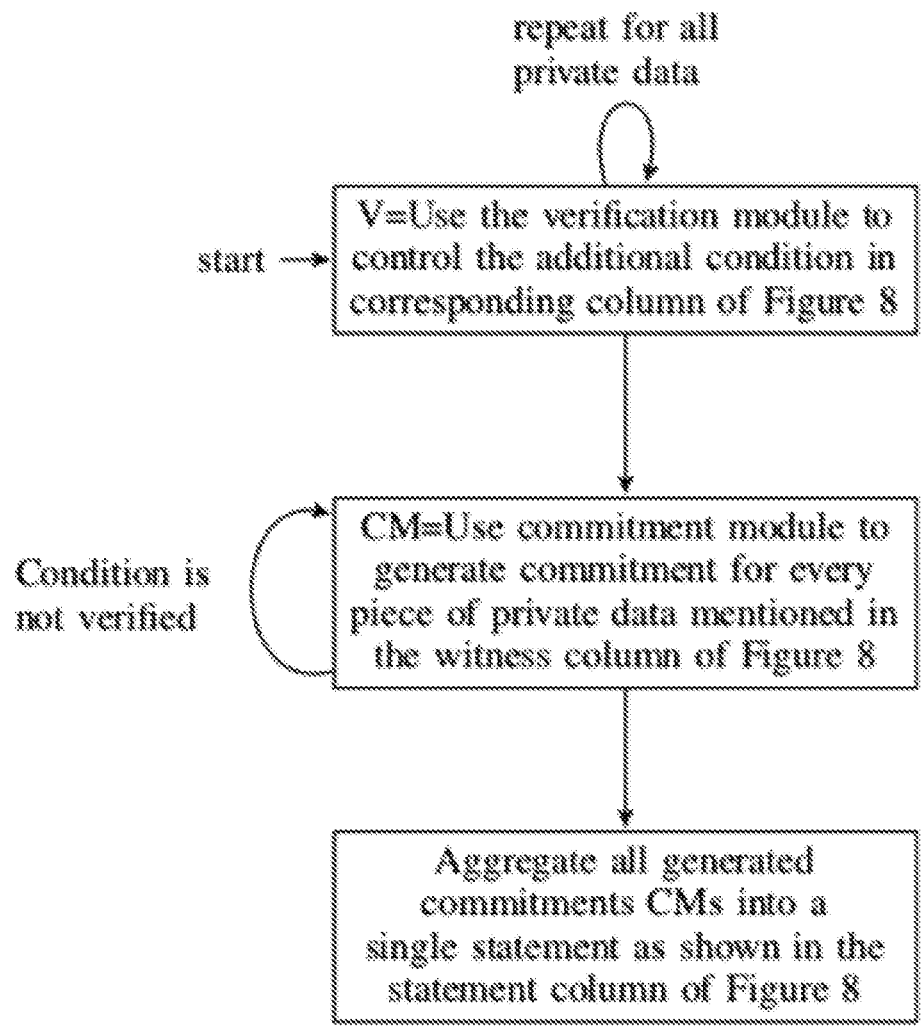
FIG. 9 is a diagram showing the construction of commitment relations from FIG. 8.

The cryptographic commitments generated by the Commitment Module will follow the method described in FIG. 9 for every necessary commitment as summarized in Table 6 in § 18. Additional commitments are also described in § 23 of the detailed description of some embodiments of the invention.

GENERATION OF THE NON INTERACTIVE ZERO-KNOWLEDGE PROOFS (§ 13)

The method includes the computation of a number of non-interactive zero knowledge proofs by using the module above that have been specifically designed for the application.

The particular NP relations necessary for the proofs used by the invention are summarized in Table 6 in § 18. Some additional notation is defined in Table 7 in § 19. These relations directly test the requirements of Def. 1, 2 and 5, whereas other relations are used to validate intermediate results in our protocol construction.

Figure 10:
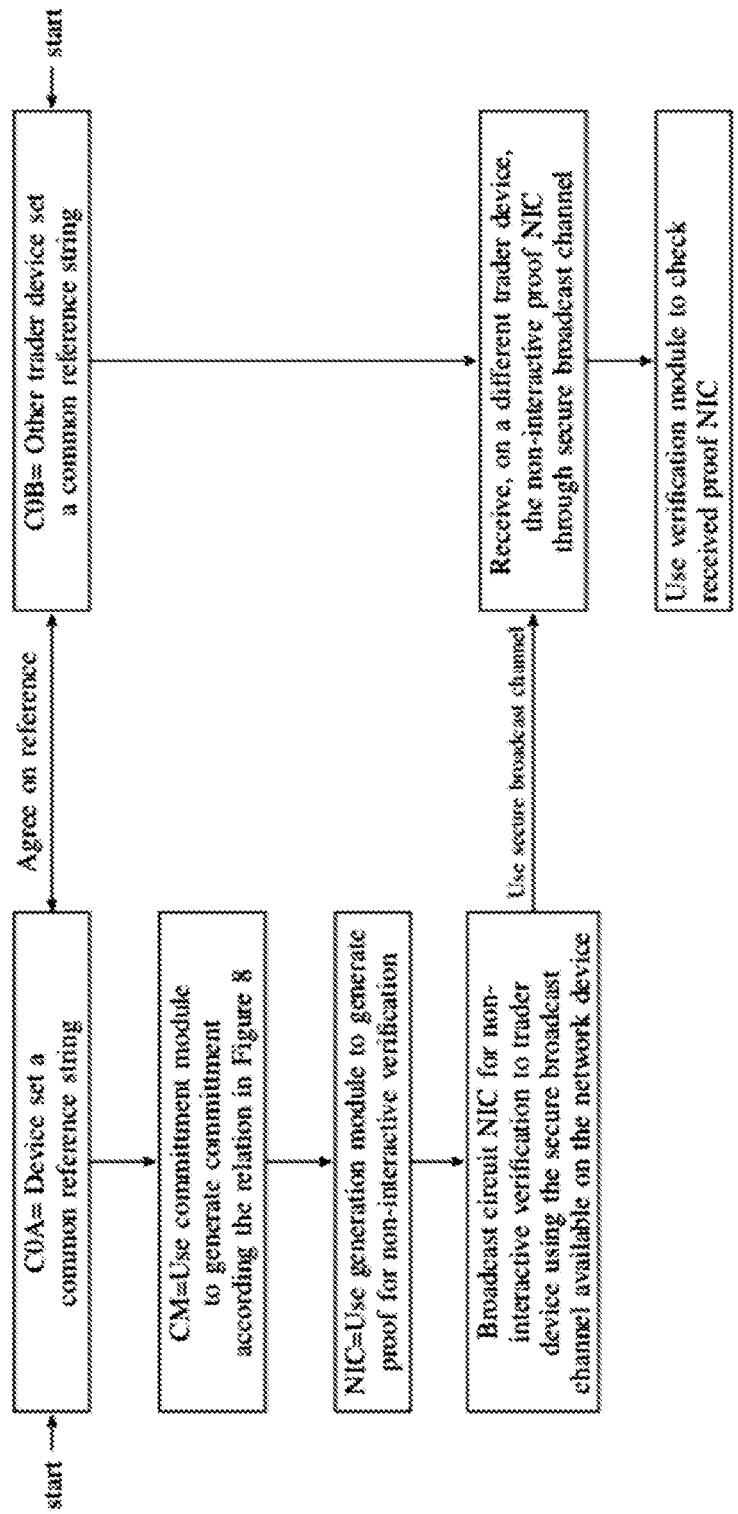
FIG. 10 is a diagram showing a Non-interactive Zero Knowledge Computation Steps ZK Across Trader Devices.
Figure 11:
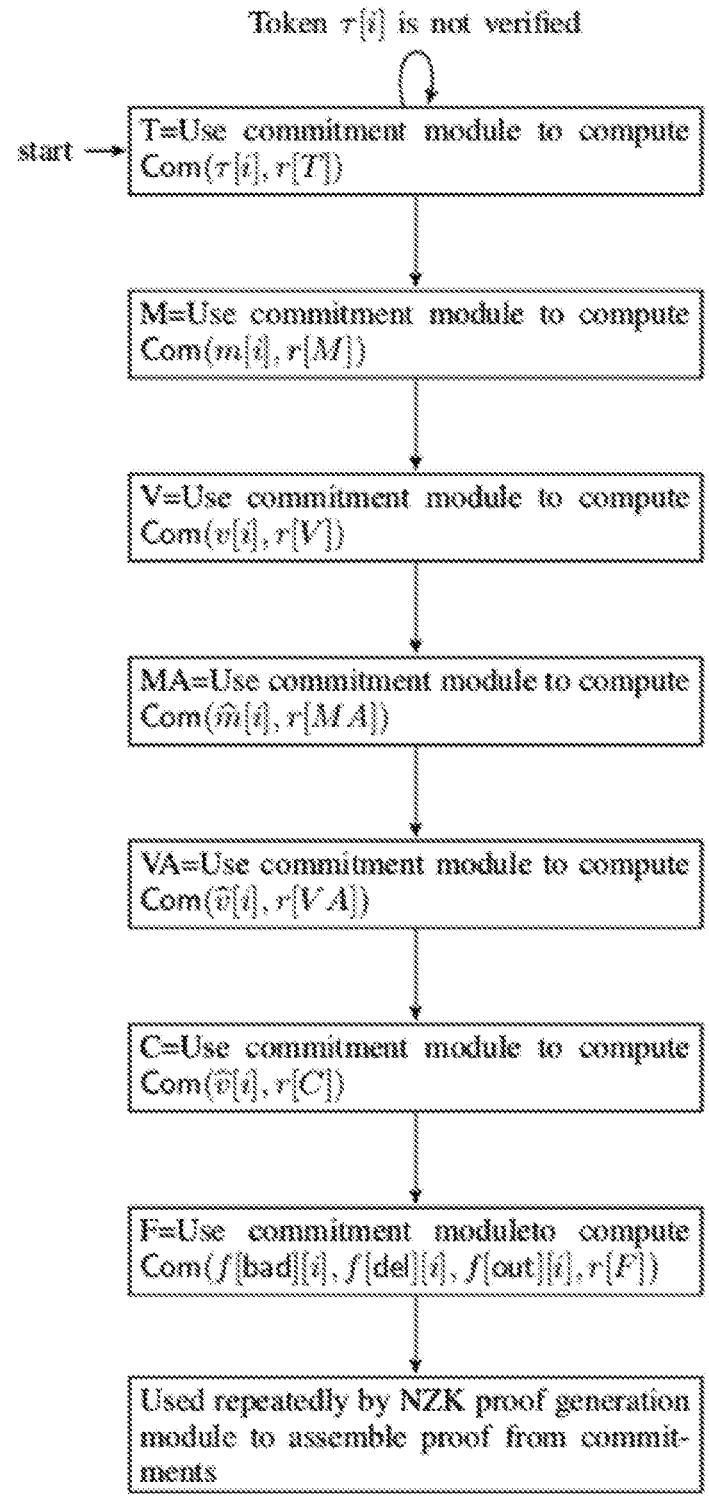
FIG. 11 is a flow-chart of a method for a Trader Device Computation for $\tau[i]$ piece of data.

According to the general scheme of FIG. 10 a trader device $P_i$ use the proof generation device in the role of a prover and proof generator, while all other trader devices $P_j (j \neq i)$ play the role of verifiers.

A proof is a vector of elements which could be, as illustrative but not limiting embodiments, from a bilinear group (e.g. Groth-Sahai) or from a field as a result of the evaluation of polynomial in the field (e.g. SNARKs).

INITIALIZATION OF THE PUBLIC BOOKS (§ 14)

For the Public Trader Commitment Book, each trader device i:
1. Use commitment module to generate and broadcast ⟦m[i]⟧, ⟦τ[i]⟧, ⟦ττ[i]⟧
2. Use proof generation module to generate and broadcast the proof NIC for m[i]≥0 with $F^{zero+}$
3. Use proof generation module to generate and broadcast the proof NIC τ[i]=Com(m[i]∥v[i]∥m̂[i]∥v̂[i]∥c[i]∥f[bad][i]∥f[del][i]∥f[out][i]; r[i]) where:
   m[i]=m̂[i]
   v[i]=v̂[i]=c[i]=0
   f[bad][i]=f[del][i]=f[out][i]=0
   with $F^{token}$.
4. Use proof generation module to generate and broadcast the proof NIC for ττ[i] similarly.
5. All trader devices use proof verification module to verify all the proofs NZK above
6. All trader devices add ⟦τ[i]⟧ into the Merkle Tree in Public Trader Commitment Book.
7. All trader devices add ⟦ττ[i]⟧ into the Merkle Tree in Public Trader Commitment Book Backup.

The Public Pending Transaction Book is empty.

METHODS TO UPDATE THE BOOKS DURING OPERATIONS (§ 15)

The methods to update the Books during the trading operations are described in FIG. 4 and are further detailed in § 20 and § 25.

Update of the Private Trader Status Book (§ 15.1)

After any update of the Private Order Book (or Public Pending Transaction Book), the Private Trader Status Book is updated as follows. Each trader device i
1. Use commitment module to generate and broadcast ⟦m[i]⟧, ⟦m̂[i]⟧, ⟦v[i]⟧, ⟦v̂[i]⟧, ⟦c[i]⟧, ⟦f[bad][i]⟧, ⟦f[del][i]⟧, ⟦f[out][i]⟧
2. Use commitment module to generate τ[i].
3. Use proof generation module to generate and broadcast the proof NIC τ[i]=Com(m[i]∥v[i]∥m̂[i]∥v̂[i]∥c[i]∥f[bad][i]∥f[del][i]∥f[out][i]; r[i]) with $F^{token}$.
4. Use proof generation module to generate and broadcast the proof NIC for τ[i] is a leaf of the Merkle Tree in Public Trader Commitment Book.
5. Use commitment module to generate and broadcast ⟦η̂[i]⟧.
6. Use proof generation module to generate and broadcast the proof NIC for η[i]=m[i]+cash(v[i]) with $F^{net}$.
7. Use commitment module to generate and broadcast ⟦f[bad][i]*⟧, →f[del][i]*⟧, →f[out][i]*⟧
8. Use proof generation module to generate and broadcast the proof NIC for the above commitments are updated correctly as in FIG. 6 in § 10 with $F^{flags}$.
9. All trader devices use proof verification module to verify all the proofs NZK above
10. Check for new broke trader devices
    All trader devices use MPC module $F_{compare}$ with input (f[bad][i], f[bad][i]*) to get the global output.
    If $F_{compare}$ returns ⊥, move to next step otherwise skip it.
11. Net out new broke trader devices
    Remove all broke trader devices' pending orders
    Each broke trader device cancel her own pending order as in § 15.2 but de-commit to show f[del][i]=0 instead of f[bad][i]=0.
    Return to the first step to check for new broke traders and continue to cancel broke trader devices' pending orders until there is no new broke trader devices.
    All trader devices use MPC module $F_{compare}$ with input (f[bad][i], f[del][i]) to get the global output.
    If $F_{compare}$ returns ⊥, move to next step otherwise skip it.
    Liquidate all broker traders devices inventory
    Each broke trader device post order to offset her own inventory as in § 15.2 but de-commit to show f[out][i]=0 instead of f[bad][i]=0.
    Return to the first step to check for new broke trader devices and continue to cancel broke trader devices' pending orders until there is no new broke trader devices.
    All trader devices use MPC module $F_{compare}$ with input (f[bad][i], f[out][i]) to get the global output.
    If $F_{compare}$ returns ⊥, restart this step otherwise move to next step.

12. Check for unfixable state
    All trader devices use MPC module $F_{pcheck}$ with input $\eta[i]$ to get the global output.
    If $F_{pcheck}$ returns 1, move to next step. Otherwise move to Mark To Market with the Public Trader Commitment Book Backup.
13. Use proof generation module to generate and broadcast $[\![\tau[i]]\!]$ and the proof NIC for $\tau[i]^* = Com(m[i]\|v[i]\|\hat{m}[i]\|\hat{v}[i]\|c[i]\|f[bad][i]^*\|f[del][i]^*\|f[out][i]^*;\ r[i]^*)$ with $F^{token}$.
14. Use proof generation module to generate and broadcast the proof NIC for $[\![\tau\tau[i]^*]\!]$ similarly.
15. All trader devices use proof verification module to verify all the proofs NZK above
16. All trader devices add $[\![\tau[i]^*]\!]$ into the Merkle Tree in Public Trader Commitment Book.
17. All trader devices add $[\![\tau\tau[i]^*]\!]$ into the Merkle Tree in Public Trader Commitment Book Backup.

Update of the Books when Posting/Canceling an Order (§ 15.2)

A trader device can post/cancel an order by:
1. Use commitment module to generate and broadcast $[\![m[i]]\!]$, $[\![\hat{m}[i]]\!]$, $[\![v[i]]\!]$, $[\![\hat{v}[i]]\!]$, $[\![c[i]]\!]$, $[\![f[bad][i]]\!]$, $[\![f[del][i]]\!]$, $[\![f[out][i]]\!]$
2. Use commitment module to generate $\tau[i]$.
3. Use proof generation module to generate and broadcast the proof NIC $\tau[i] = Com(m[i]\|v[i]\|\hat{m}[i]\|\hat{v}[i]\|c[i]\|f[bad][i]\|f[del][i]\|f[out][i];\ r[i])$ with $F^{token}$.
4. Use proof generation module to generate and broadcast the proof NIC for $\tau[i]$ is a leaf of the Merkle Tree in Public Trader Commitment Book.
5. De-commit to show that $f[bad][i]=0$.
6. add $o=(t, \ell, i, v)$ into Private Order Book
7. broadcasts $(t, \ell, v)$
8. Use commitment module to generate and broadcast $[\![P_i]\!]$
9. in case of posting order use commitment module to generate and broadcast $[\![\hat{m}[i]^*]\!]$, $[\![\hat{v}[i]^*]\!]$, $[\![c[i]^*]\!]$, then Use proof generation module to generate and broadcast the proof NIC for:
    $\hat{m}[i]^* = \hat{m}[i] - v \cdot p\ell$
    $\hat{v}[i]^* = \hat{v}[i] + v$
    $c[i]^* = c[i] + 1$
    with $F^{uinv}$. Otherwise do the reverse.
10. Use commitment module to generate and broadcast $[\![\hat{\eta}[i]^*]\!]$.
11. Use proof generation module to generate and broadcast the proof NIC for $\hat{\eta}[i]^* = \hat{m}[i]^* + cash(\hat{v}[i]^*)$ with $F^{net}$.
12. Use proof generation module to generate and broadcast the proof NIC for $\hat{\eta}[i]^* \geq 0$ with $F^{zero+}$
13. All trader devices use proof verification module to verify all the proofs NZK above
14. All trader devices add $(t, \ell, [\![P_i]\!])$ into Public Pending Transaction Book.
15. Use proof generation module to generate and broadcast $[\![\tau[i]^*]\!]$ and the proof NIC for $\tau[i]^* = Com(m[i]\|v[i]^*\|\hat{m}[i]^*\|\hat{v}[i]\|c[i]^*\|f[bad][i]\|f[del][i]\|f[out][i];r[i]^*)$ with $F^{token}$.
16. All trader devices use proof verification module to verify all the proofs NZK above
17. All trader devices add $[\![\tau[i]^*]\!]$ into the Merkle Tree in Public Trader Commitment Book.

Update of the Books when Matching an Order (§ 15.3)

A match of two opposite orders in the Public Pending Transaction Book, for a buying trader device (resp. selling trader device) at matching price $\ell$ and volume $v$:

1. Use commitment module to generate and broadcast $[\![m[i]]\!]$, $[\![\hat{m}[i]]\!]$, $[\![v[i]]\!]$, $[\![\hat{v}[i]]\!]$, $[\![c[i]]\!]$, $[\![f[bad][i]]\!]$, $[\![f[del][i]]\!]$, $[\![f[out][i]]\!]$
2. Use commitment module to generate $\tau[i]$.
3. Use proof generation module to generate and broadcast the proof NIC $\tau[i] = Com(m[i]\|v[i]\|\hat{m}[i]\|\hat{v}[i]\|c[i]\|f[bad][i]\|f[del][i]\|f[out][i];\ r[i])$ with $F^{token}$.
4. Use proof generation module to generate and broadcast the proof NIC for $\tau[i]$ is a leaf of the Merkle Tree in Public Trader Commitment Book.
5. Use commitment module to generate and broadcast $[\![m[i]^*]\!]$, $[\![v[i]^*]\!]$
6. Use proof generation module to generate and broadcast the proof NIC for:
    $m[i]^* = m[i] - v \cdot p_\ell$ (resp. $m[i]^* = m[i] + v \cdot p_\ell$)
    $v[i]^* = v[i] + v$ (resp. $v[i]^* = v[i] - v$)
    and additionally in case of a complete match Use commitment module to generate and broadcast $[\![ [i]^*]\!]$ and Use proof generation module to generate and broadcast the proof NIC for $c[i]^* = c[i] - 1$ with $F^{match}$.
7. Use proof generation module to generate and broadcast $[\![\tau[i]^*]\!]$ and the proof NIC for $\tau[i]^* = Com(m[i]\|v[i]\|\hat{m}[i]^*\|\hat{v}[i]\|c[i]^*\|f[bad][i]\|f[del][i]\|f[out][i];r[i]^*)$ with $F^{token}$.
8. All trader devices use proof verification module to verify all the proofs NZK above
9. All trader devices add $[\![\tau[i]^*]\!]$ into the Merkle Tree in Public Trader Commitment Book.

Update of the Books when Marking to Market (§ 15.4)

For each trader:
1. Use commitment module to generate and broadcast $[\![m[i]]\!]$, $[\![\hat{m}[i]]\!]$, $[\![v[i]]\!]$, $[\![\hat{v}[i]]\!]$, $[\![c[i]]\!]$, $[\![f[bad][i]]\!]$, $[\![f[del][i]]\!]$, $[\![f[out][i]]\!]$
2. Use commitment module to generate $\tau[i]$.
3. Use proof generation module to generate and broadcast the proof NIC $\tau[i] = Com(m[i]\|v[i]\|\hat{m}[i]\|\hat{v}[i]\|c[i]\|f[bad][i]\|f[del][i]\|f[out][i];\ r[i])$ with $F^{token}$.
4. Use proof generation module to generate and broadcast the proof NIC for $\tau[i]$ is a leaf of the
Merkle Tree in Public Trader Commitment Book.
5. Use commitment module to generate and broadcast $[\![m[i]^*]\!]$
6. Use proof generation module to generate and broadcast the proof NIC for $m[i]^* = m[i] + v[i] \cdot \bar{p}$.
7. Use proof generation module to generate and broadcast $[\![\tau[i]^*]\!]$ and the proof NIC for $\tau[i]^* = Com(m[i]\|v[i]\|\hat{m}[i]^*\|\hat{v}[i]\|c[i]^*\|f[bad][i]\|f[del][i]\|f[out][i];r[i]^*)$ with $F^{token}$.
8. additionally de-commit to show that
    $\hat{m}[i]^* = 0$
    $v[i]^* = \hat{v}[i]^* = c[i]^* = 0$
    $f[bad][i]^* = f[del][i]^* = f[out][i]^* = 0$
9. All trader devices use proof verification module to verify all the proofs NZK above
10. All trader devices add $[\![\tau[i]^*]\!]$ into the Merkle Tree in Public Trader Commitment Book.

METHODS TO OPTIMIZE THE COMPUTATION FOR LARGER NUMBER OF TRADERS (§ 16)

The methods to optimize the operation by replacing suitable components of the invention with more efficient ones to increase the number of trader devices that can participate to the protocol at once are described in § 23 of the detailed description of some embodiments of the invention. Below we summarize the methods.

Compression of Private Trader Status Book

Figure 13:
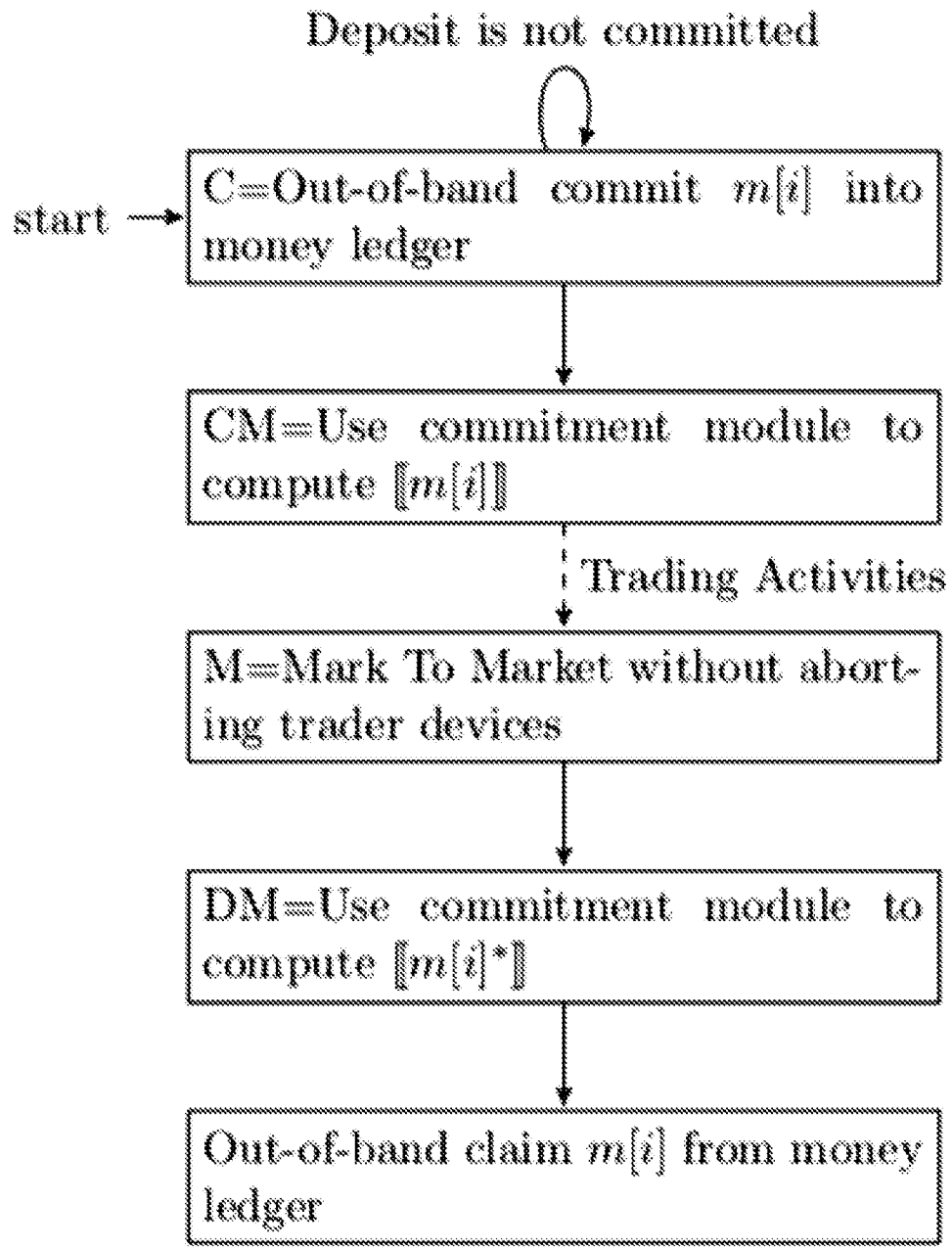
FIG. 13 is a flow-chart of a trader device computation for committing deposit into money ledger.
Figure 14:
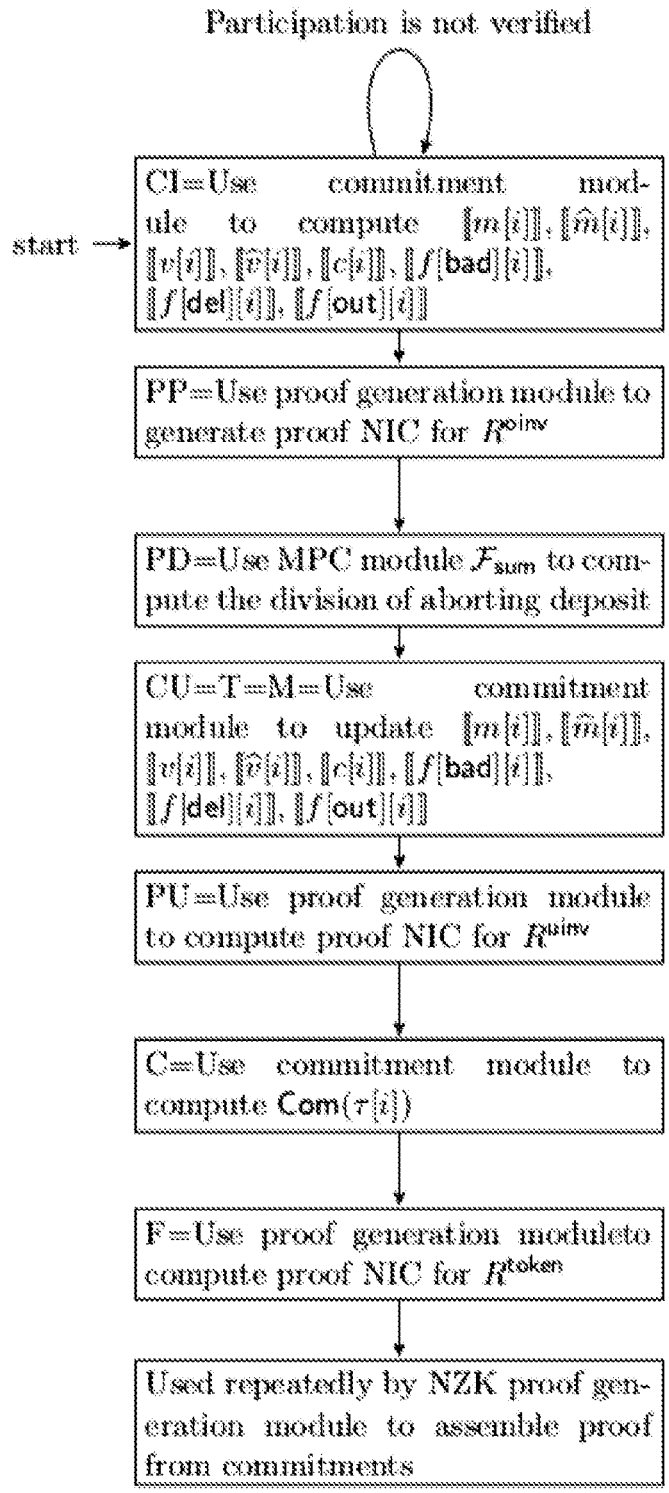
FIG. 14 is a flow-chart of a trader device computation to penalize aborting device.

By packing the three binary fields f[bad][i], f[del][i] and f[out][i] of the Private Trader Status Book into one single integer. We can reduce the number of commitments by commitment module (one instead of three) and reduce the proof generation time of proof generation module in the related relations, i.e. $F^{token}$, $F^{invt}$, and $F^{flags}$ (by about 30%).

are required on their side are penalized are described in § 22. To summarize, first all trader devices must out-of-band commit the deposit into a money ledger, upon finding abort, all the trader devices can perform Mark To Market without the aborting device and claim the money deposited in the money ledger as shown in FIG. 13. FIG. 14 describes the steps to mark to market in such scenario using additional proof generation module $F^{oinv}$ and MPC device $F^{sum}$.

TABLE 6

Relations for Non-Interactive Proofs

| Relation | Additional Condition | Statement | Witness |
|---|---|---|---|
| $R^{token}$ | Token τ[i] is correctly constructed from the inventory values, i.e. τ[i] = Com(m[i]‖v[i]‖m̂[i]‖v̂[i]‖c[i]‖ f[bad][i]‖f[del][i]‖f[out][i]; r[i]) | ⟦τ[i]⟧,⟦m[i]⟧,⟦v[i]⟧, ⟦m̂[i]⟧, ⟦v̂[i]⟧,⟦c[i]⟧,⟦f[bad][i]⟧, ⟦f[del][i]⟧,⟦f[out][i]⟧ | m[i], v[i], m̂[i], v̂[i], c[i] f[bad][i], f[del][i], f[out][i], r[i] |
| $R^{inv}$ | The new inventory values m[i], v[i], m̂[i], v̂[i] c[i], f[bad][i], f[del][i], f[out] [i] are correctly constructed from an old inventory (with token τ[i]'), i.e. Auth(ρ, path$_i$,⟦τ[i]'⟧) = 1; τ[i]' = Com(m[i]‖v[i]‖m[i]‖v[i]‖c[i] ‖f[bad][i]‖f[del][i]‖f[out][i]; r[i]) | ρ, τ[i]',⟦m[i]⟧,⟦v[i]⟧,⟦m̂[i]⟧, ⟦v̂[i]⟧,⟦c[i]⟧,⟦f[bad][i]⟧, ⟦f[del][i]⟧,⟦f[out][i]⟧ | path, ⟦r[i]⟧, m[i], v[i], m̂[i] v̂[i], c[i], f[bad][i], f[del][i], f[out][i], r[i]' |
| $R^{uinv}$ | The new inventory values m̂[i]*, v̂[i]·, c[i]*· are correctly updated from an old inventory (w.r.t. δ$_c$, l, v). i.e. m̂[i]* = m̂[i] − δ$_c$ · p$_l$ · v: v̂[i]* = v̂[i] + δ$_c$ · v; c[i]* = c[i] + δ$_c$. | ⟦m̂[i]*⟧,⟦v̂[i]*⟧⟦c[i]*,⟧, ⟦m̂[i]⟧,⟦v̂[i]⟧,⟦c[i]⟧, δ$_c$, l, v | m̂[i]*, m̂[i], v̂[i]*, v̂[i],c[i]*, c[i] |
| $R^{rng}$ | The upper and lower bounds of cumulative volumes and prices p$_{lb}$, V$_{lb}$, p$_{ub}$, V$_{ub}$ are correctly selected from the $\mathcal{C}_{buy}$ or $\mathcal{C}_{sell}$ i.e. V$_{lb}$ ≤ \|v[]\| ≤ V$_{ub}$ and one of the following holds: v[ ] > 0 ∧ ((p$_{lb}$, V$_{lb}$), (p$_{ub}$, V$_{ub}$)) ∈ $\mathcal{C}_{buy}$ or v[ ] < 0 ∧ ((p$_{lb}$, V$_{lb}$), (p$_{ub}$, V+)) ∈ $\mathcal{C}_{sell}$ or v[ ] = 0 ∧ (p$_{lb}$, V$_{lb}$) = (p$_{ub}$, V$_{ub}$) = (0, 0) | ⟦v[ ]⟧,⟦p$_{lb}$⟧,⟦V$_{lb}$⟧, ⟦p$_{ub}$⟧,⟦V$_{ub}$⟧, $\mathcal{C}_{buy}$, $\mathcal{C}_{sell}$ | v[ ], p$_{lb}$, V$_{lb}$, p$_{ub}$, V$_{ub}$ |
| $R^{net}$ | (Estimation) of an instant net position η[i] (resp. η[i]) are correctly computed, i.e. η[i] = m[i] + p$_{lb}$ · V$_{lb}$ + p$_{ub}$ · (\|v[i]\| − V$_{lb}$) | ⟦m[i]⟧,⟦v[i]⟧,⟦η[i]⟧, ⟦p$_{lb}$⟧,⟦V$_{lb}$⟧,⟦p$_{ub}$⟧ | m[i], v[i], η[i], p$_{lb}$, V$_{lb}$, p$_{ub}$ |
| $R^{match}$ | The order fulfillment is correctly done, i.e. m[i]* = m[i] p$_l$ · v; v[i]* = v[i] + v; c[i]* = c[i] + δ$_c$. | ⟦m[i]*⟧,⟦v[i]*⟧,⟦c[i]*⟧, ⟦m[i]⟧,⟦v[i]⟧⟦, c[i]⟧, δ$_c$, p$_l$, v | m[i]*, m[i], v[i]*, v[i], v̂[i], c[i]*, c[i] |
| $R^{flags}$ | The transition from the flags (f[bad][i], f[del][i], f[out][i]) to the flags (f[bad][i]*, f[del][i]*, f[out][i]*) is consistent with the values (η[i]*, v[i]*,c[i]*). as shown in the diagram in FIG. 6. | ⟦f[bad][i]⟧,⟦f[bad][i]*⟧, ⟦f[del][i]⟧,⟦f[del][i]*⟧, ⟦f[out][i]⟧,⟦f[out][i]*⟧, ⟦η[i]*⟧,⟦v[i]*⟧,⟦c[i]*⟧ | f[bad][i], f[bad][i]*, f[del][i], f[del][i]*, f[out][i], f[out][i]*, η[i]*, v[i]*, c[i]* |
| $R^{mtm}$ | A trader P$_i$ is correctly marked to market, i.e. m[i]* = m[i] + p̄ · v[i] | ⟦m[i]⟧,⟦v[i]⟧,⟦m[i]*⟧, p̄ | m[i], m[i]*, v[i] |

Combination of Relations

We can further combine the relations to remove intermediate commitments and proof generations. In particular, (1) $F^{invt}$ and $P^{uinv}$ can be combined to remove the intermediate result before updating the Private Inventory Book with a new order, and (2) $F^{rng}$ and $F^{net}$ when combined can remove the intermediate result in computing the public commitments of the instant net position η[i].

Parallelization of Proof Generation Module

Figure 12:
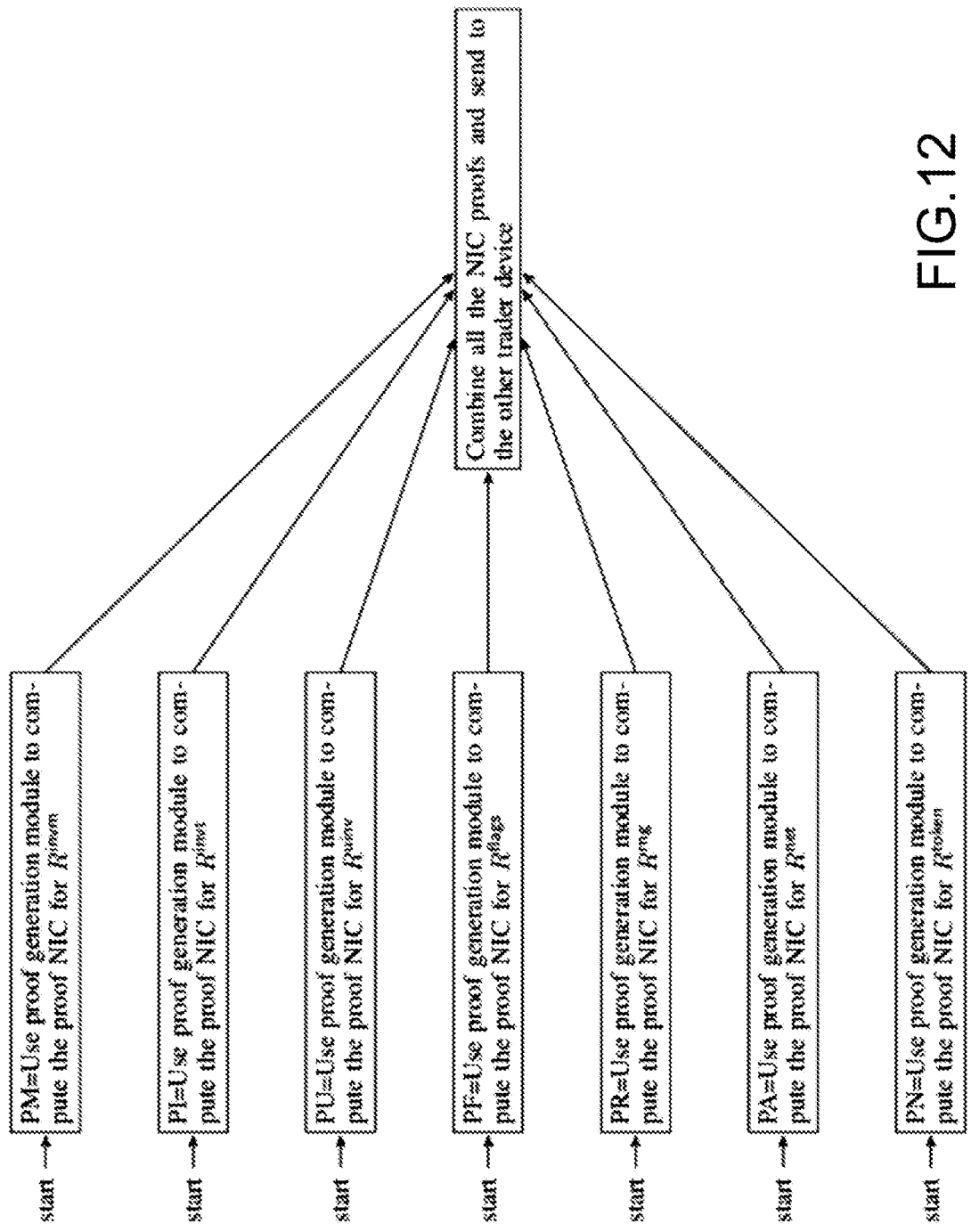
FIG. 12 is a diagram showing a parallelized trader device roof generation computation for posting/cancelling order.

In the methods above, the proof generations by proof generation module are independent for different NIC proofs. Hence we can parallelize the proof generation of different NIC proofs. FIG. 12 illustrates the parallelization of proof generation in updating the order book when posting/cancelling an order as in § 15.2.

METHODS TO PENALIZE TRADER DEVICES THAT DO NOT COMPLETE THEIR STEPS (§ 17)

The methods to optimize the operation by replacing suitable components of the invention with additional steps so that trader devices that fail to participate to the steps that

IDEAL FUNCTIONALITY (§ 18)

For expository purposes, both in the functionality's and in the protocol's description we allow an adversary to abort the computation after receiving its own intermediate outputs. This flavor of security is known as security with aborts [14]. In § 22 we change the protocol to avoid scot-free aborts.

The futures market evolution is captured by an ideal reactive functionality FCFM where all the traders send their private initial inventory to a trusted third party (during the so-called Initialize phase), which lets the market evolve on their behalf. A typical evolution of the market includes processing orders (Post/Cancel Order phases), netting out traders with insufficient funds to maintain their position, we refer to these traders hereon as "broke" traders (Margin Settlement phase), and finally offset all positions (Mark to Market phase). A formal description is in FIG. 15.

Intuitively, the matching process performed during the Post Order phase (c.f. FIG. 15). Takes the new order (t, f , i, v) and tries to match it with all previous limit orders of opposite side in the order book that have the same price. In other words, if the limit order is a buy order it will be matched with a sell order, and vice versa. The priority to match is given to the limit order with a smaller round index. When a match is found, the trade is reconciled, and the available cash, as well as the volume holding of the traders, is updated accordingly (i.e., on buy side: increase volume, decrease cash; on sell side: decrease volume, increase cash). The matching process stops either when the new order is fulfilled, or there is no past order that can fill the new one. In the latter case, the remaining volume is left in the order book as a new limit order.

An important feature of FCFM, is to guarantee payable losses by each trader (i.e., $\eta[i]0$). Hence, when the last round is reached, all traders must then offset their position, so that the data at round T will consist of all zero volumes, non-negative balances, and an empty order book. Since the net position might change (due to the updates of the order book) it is necessary to check the new instant net position $\eta[i]^*$ of each trader Pi after the update. In case of any negative net position, the last update cannot be committed until all broke traders Pi (i.e., $\eta[i]<0$) are netted out, which is done in the so-called Margin Settlement phase. (c.f. FIG. 16). This requires each new broke trader to cancel all pending orders (becomes canceled), and buy/sell all contracts in the inventory that the trader is short/long, at whatever price available at the moment (becomes netted). At the end of the Margin Settlement phase the order fulfillment is resumed, and the update will be committed.

For simplicity, after a trader $P_i$ is netted out, the trader cannot participate in the market in the subsequent rounds. In the worst-case scenario where: (i) the market cannot supply the margin settlement of broke traders (because, e.g., they hold too many contracts comparing to the current available volume in the order book), or (ii) even the margin settlement cannot bring a broke trader's position back to non-negative, the ideal functionality proceeds directly to Mark to Market.

Non-monotonicity. A challenging feature of the futures market's ideal functionality is its intrinsic non-monotonic behaviour, in a sense made precise below.

Remark 1. The properties of private values belonging to a honest trader $P_i$ executing the ideal functionality of FIG. 15-16 are non-monotonic in the actions of other honest traders: Let $P_i$ be a good trader (private value $\eta[i]>0$) at round t with order book O, and further assume that at round t+1 the order book gets updated to O* due to an offer posted by another good trader $P_j \neq P_i$. The new order book O* affects the value cash(v[i]) (Table 5), which might result in a negative instant net position $\eta[i]$ (Eq. (1)), thus making $P_i$ a bad trader at round t+1, even if it was inactive during that round.

Security properties. We briefly illustrate why FCFM fulfils the security requirements of the futures market in § 2 and in § 4. The Availability of Orders with Anonymity of Trader property is guaranteed by broadcasting only (post order, $\ell$, v) upon receiving a (post order, $P_i$, $\ell$, v) from $P_i$. The same reasoning applies for canceling orders. Confidentiality of Trader Inventory is guaranteed as FCFM keeps the trader's inventory secret, all broadcasts post order, cancel order, invalid post, invalid cancel, match and remove contains no inventory information (m[i], v[i], $\eta$[i], m̂[i] or v̂[i]). As all the computations of FCFM respect the conditions in Def. 1 and Def. 2, Market Integrity and Traders Solvency properties are preserved. The Trader's Precedence Traceability property is also maintained due to: (i) only the owner of an order can match/cancel that order and (ii) only a good trader can post/cancel in normal phase while only broke traders can cancel and canceled traders can post during margin settlement phase. The Proportional Burden is obviously satisfied because we have a centralized functionality. We return to its satisfaction on the actual distributed protocol.

ASSUMPTIONS AND CRYPTO BUILDING BLOCKS (§ 19)

We elected as much standard crypto blocks as possible for both protocol construction and reliability of security proofs.

Anonymous Communication Network and Secure Broadcast Channel Recall that the futures market ideal functionality guarantees full anonymity of the traders. To this end, we assume an underlying anonymous network that hides the traders' identifying information (e.g., their IP address). This assumption was already used in several prior works, most notably [1]. We also assume secure broadcast channels between the traders. Such channels could be implemented by utilizing a consensus protocol, e.g. PBFT [8].

Initial Bootstrap: As we employ several zero knowledge functionalities in our protocol, instantiated with zk-SNARK [3], an initial setup is required for global information such as proving keys and verifying keys, which can be achieved securely in practice with MPC as in [2].

Commitment Schemes. We rely on a non-interactive commitment scheme Com, with domain $\{0, 1\}^*$. We typically write $[\![v]\!]:=\mathrm{Com}(v;r[v])$ for a commitment to value v using randomness $r[v]\in\{0,1\}^*$. To open a given commitment $[\![v]\!]$, it suffices to reveal $(v, r[v])$, so that a verifier can check that $[\![v]\!]=\mathrm{Com}(v; r[v])$. For the proof of security we need that $[\![v]\!]$ statistically hides the committed value v, and after publishing $[\![v]\!]$ it is computationally infeasible to open the commitment in two different ways. We follow [12] for the formal definitions.

We use the following standard NP relations: (i) $R^{vc}$, for validity of commitments; (ii) $R^{oc}$, for ownership of an opening; (iii) $R^{zero-}$ (resp. $R^{zero+}$, $R^-$) for commitments to non-positive (resp. non-negative, negative) values; (iv) $R^{ec}$, for equality of two openings; (v) $R^{nec}$, for commitments to values different from a pre-defined constant.

Hybrid Ideal Functionalities. To implement FCFM we use hybrid ideal functionalities, with the usual simulation-based proofs relying on the composition theorem [7]. All our functionalities receive some values/randomnesses and the corresponding commitments, and must first check whether the commitment actually corresponds to the claimed value, returning ⊥ otherwise (as in $R^{vc}$). The remaining features outlined below are specific to our application. They are similar to range proofs [5], [6].

The Secure All Positive Check functionality $F_{pcheck}$ receives from every trader the net position $\eta[i]$ and guarantees solvency (i.e., $\forall i, \eta[i] \geq 0$).

The Secure Sum Comparison functionality $F_{compare}$ receives from every party a pair of old and new binary flags $\{f[i], f[i]^*\}$. It checks whether the total number of flags has not changed (i.e., $\forall i, f[i]=f[i]^*$).

Finally, the zero-knowledge functionality $F_{zk}^R$ is parameterized by an NP relation R and receive inputs from a trader $P_i$ in the role of a prover, while all other traders $\{P_j\}_{j \neq i}$ play the role of verifiers. As usual the prover sends the statement $x_i$ and the corresponding witness $w_i$ to the functionality, while each verifier sends its own statement $x_j$ to be checked. Each verifier gets the outcome of $R(x_j, w_i)$ if $x_i=x_j$, otherwise it gets ⊥. For simplicity we omit the zk subscript. MPC will be identified by subscripts and zk by superscripts.

The NP relations we use are summarized in Table 6. To describe them, we use some auxiliary values that are not needed in the ideal functionality FCFM (albeit they might well be present in an actual centralized exchange implementation). These additional values are defined in § 18 and Table 7 in § 19. Some of our relations directly test the requirements of Def. 1,2 and 5, whereas other relations are used to validate intermediate results in our protocol construction, and share similarities with the NP statement POUR in [1].

TABLE 7

Futures Market Notation

| Nota. | Description |
|---|---|
| $\rho$ | Root of a Merkle tree |
| path | Authentication path of a token $\tau[i]$ in a Merkle tree with root $\rho$ |
| $\mathcal{C}_{buy}$ | Current range choices for long position trader to use in net position calculation, defined as $\{((p_1, V_{max}), (p_1, V_1^{buy})), ((p_1, V_1^{buy}), (p_2, V_2^{buy})) \ldots, ((p_{l_{buy}}, V_{l_{buy}}^{buy}), (0, 0))\}$ |
| $\mathcal{C}_{sell}$ | Current range choices for short position trader to use in net position calculation, defined as $\{((0, 0), (p_{l_{sell}}, V_{l_{sell}}^{sell})), \ldots, ((p_{L-1}, V_{L-1}^{sell}), (p_L, V_L^{sell})), (p_L, V_L^{sell}), (p_L, V_{max}))\}$ |
| $p_{lb}$ | Lower bound price used for net position calculation |
| $V_{lb}$ | Lower bound cumulative volume used for net position calculation |
| $p_{ub}$ | Upper bound price used for net position calculation |
| $V_{ub}$ | Lower bound cumulative volume used for net position calculation |
| $\delta_c$ | Incremental value for the pending order counter |

The first challenging part of the protocol construction is to identify a suitable form for the state of the reactive security functionality implementing FCFM that would account for its non-monotonic behavior in the legitimacy of traders and assets. A simple (but wrong) solution would be to use just the private inventory values of the individual traders. Each trader could prove in ZK that it respects the constraints stated in Def. 1, 2 and 5. Unfortunately, the arrival of new valid orders could make the constraints of some other trader invalid, i.e. the protocol should no longer consider her ZK proof valid.

We must also store such a state in a way that after an order is accepted by the market (i.e. the ensemble of agents) it is not possible to link it to the next order by the same trader. This cannot just be the union of the individual (unopened) inventories. By looking at the unchanged inventories the traders could identify the trader who did the order. A global MPC step to update the entire state would be a solution but it would put an unnecessary burden on the other traders. A further challenge is that we must keep a fully ordered list (Matching orders must be executed according to arrival time).

First, we augment the private state of each trader with additional information besides the inventory $m[i]$ and $v[i]$. We memoize the value of the estimation $\hat{m}[i]$ and $\hat{v}[i]$, and a counter $c[i]$ to track the number of pending orders. Each time a trader $P_i$ posts an order $(\ell, v)$, the memorized values are updated as $\hat{m}[i]=m[i]-p^\ell \cdot v$, $\hat{v}[i]=v[i]+v$, and $c[i]=c[i]+\delta_c$ where $\delta_c=1$. For order cancellations, or complete matches of pending orders, the reverse computation is performed ($\delta_c=-1$). The use of memoized values is a quick calculation to do and to verify cryptographically. Yet, the foremost reason for such device is that the values $\hat{m}[i], \hat{v}[i]$ of a trader are needed to prevent the linking of limit orders during the verification procedure, while allowing the instantaneous computation of $\eta[i]$.

Memoization avoids the use of MPC when addressing the conflicting requirements of i) providing a public trail of events, ii) publicly verifying a constraint on a private subset of such events as well as iii) showing that such private events are all and only applicable events. To meet (iii) Alice would have had to show which orders belonged to her to add them to her estimated net position. Since the full order book is visible (i), her full trading strategy would then be visible to the other players. In contrast, if we make sure that an order is private to trader Bob (ii), this very property does not allow Alice to prove that the order in question does not belong to her (and does not make her over budget), so failing (iii). A full MPC protocol would be a solution but this would force other traders to participate to the posting of any order from a third party. As mentioned, such burden would be considered unacceptable.

Next we introduce three flags to represent the status as a potentially broke trader. A trader's inventory is marked with a state represented by the three flags f[bad][i], f[del][i], f[out][i]. We call an inventory with a non-negative instant net position a good inventory (f[bad][i]=0, f[del][i]=0, f[out][i]=0), otherwise it is a broke inventory (f[bad][i]=1, f[del][i]=0, f[out][i]=0). A good trader can do a normal post/cancel action, while a broke trader has to cancel a previous order in the Margin Settlement phase. Finally, we call an inventory canceled if it is a broke inventory with no pending order (after canceling all orders in the Margin Settlement phase) at the time of commitment (f[bad][i]=1, f[del][i]=1, f[out][i]=0); an inventory is, instead, netted if it has a zero volume holding (after matching to an offset position during Margin Settlement) at the time of commitment (f[bad][i]=1, f[del][i]=1, f[out][i]=1). The state transition diagram in FIG. 6 shows how the inventory switches from one state to another, as well as the condition causing the transition. This status will be key to capture the non-monotonic evolution of the validity of commitments and zk proofs once a valid order (of another trader) is accepted. The overall state is then captured by a token $\tau[i]$ that is a commitment of all values in the inventory (with fresh randomness $r[i]$); initially, such value is only known to the trader itself. Each trader keeps the token secret and broadcasts a commitment to it in order to commit to a new inventory; such an inventory is considered as unspent. At a later point, a trader can reveal the token and retrieve a previously committed inventory, in which case we say the inventory is spent, as the corresponding token cannot be used anymore.

TABLE 8

Merkle Tree's supported operations

| Definition | Description |
|---|---|
| $\rho = \text{Add}(\mathcal{T}, [\![v']\!])$ | Adds a new leaf (the hash of $[\![v']\!]$) to the tree and generates a new root $\rho$. |
| path = Path($\mathcal{T}$, $[\![v']\!]$) | Returns the authentication path from $[\![v']\!]$ to $\rho$. |
| $\{0, 1\} \leftarrow \text{Auth}(\rho, \text{path}, [\![v]\!])$ | Authenticates $[\![v]\!]$ in $\mathcal{T}$ w.r.t. the authentication path path (where output 1 means the authentication succeeded). |

The anonymity of the inventory is guaranteed by relying on Merkle trees [22] in conjunction with the zero-knowledge proofs (as in [28]). Throughout the execution of the protocol, a Merkle tree T based on a collision-resistant hash function $H:\{0, 1\}^* \to \{0, 1\}^*$, where the leafs are commitments, is maintained and updated. $\rho$ denotes the root of the tree, and path denotes the authentication path from a leaf $[\![v]\!]$ to the root $\rho$. As in [1] and [28], the number of leafs is not fixed a-priori, one can efficiently update a Merkle tree T by appending a new leaf, resulting in a new Merkle tree T with root $\rho$; this can be done in time and space proportional to just the tree depth. Table 8 summarizes the supported operations Add, Path and Auth of a Merkle tree T.

Preserving Traders' Anonymity. The commitment (the retrieval) of trader inventories to the Merkle Tree T is obtained by running a sub-protocols $\Pi_{put}$ (resp. $\Pi_{get}$) as follows:

Executing protocol $\Pi_{put}$, the trader broadcasts a commitment to the token corresponding to the current inventory: $\tau[i]=\text{Com}(m[i]||v[i]||\hat{m}[i]||\hat{v}[i]||c[i]||f[\text{bad}][i]||f[\text{del}][i]||f[\text{out}][i]; r[i])$ Thus, the trader proves that the token is correctly constructed (using $F^{token}$) and appended into the Merkle tree T (with operation Add), before broadcasting the new root of the tree. The other traders will check that the new root is correctly computed before accepting it.

In an execution of protocol $\Pi_{get}$, a trader can retrieve a previously committed inventory (say, at round t'<t), and spend it for posting or canceling an order ($\ell$, v), by revealing the secret unspent token $\tau[i]'$ and proving that the newly committed values are consistent updates of the values committed at round t'; this is done using $F^{inv}$ (to retrieve the inventory) and then $R^{uinv}$ (to update the inventory); in particular, $[\![\tau[i]']\!]$ is a leaf of the current tree and $m[i]=m[i]'$, $v[i]=v[i]'$, $\hat{m}[i]=\hat{m}[i]'-\delta_c \cdot p\ell \cdot v$, $\hat{v}[i]=\hat{v}[i]'+\delta_c \cdot v$, and $c[i]=c[i]'+\delta_c$, while all the flags f[bad][i], f[del][i], f[out][i] stay the same. Every time an inventory is retrieved, two sets of commitments are generated corresponding to the inventory values before and after the update. The token $\tau[i]'$ is now marked as spent and will not be usable for retrieving any inventory.

The main Merkle tree T can also be forked (via sub-protocol $\Pi_{backup}$, see below) into a backup tree TU to use during the Mark to Market phase in case there are still traders with a negative net position even after the Margin Settlement phase. We use this feature to challenge the non-monotonicity of security and go beyond security-with-abort.

PROTOCOL CONSTRUCTION (§ 20)

At this point an easy solution would be to just run the entire reactive functionality as a global MPC. As we mentioned, this would be unacceptable from the perspective of most traders: the burden of computation should be shifted to parties wishing to prove something (e.g. their good and bad standing). As such, only when global consistency of the market is at stake should all traders be involved. We illustrate this empirically in § 24. FIG. 17 summarizes how the various security functionalities and sub-protocols have been used to implement each step of the global ideal functionality.

First we present a few useful sub-protocols that are extensively used during different phases of our main protocol.

Common Sub-Protocols

The protocols in FIG. 18 are used extensively as sub-routines in our main protocol.

We denote by the superscript * the updated values, computed locally by $P_i$ after an update of the order book, e.g. m[i]*, which are used as common inputs for the sub-protocols. We use it in particular on the commitments of the inventory values, e.g. $[\![m[i]]\!]$, the related order information ($\delta_c$, $\ell$, v) and the the Merkle Tree T, where $P_i$ additionally holds the committed values and the corresponding randomnesses.

$\Pi_{valid}$: Every time a trader $P_i$ posts or cancels an order, say ($\delta_c$, $\ell$, v), the protocol has to check for its validity.

$\Pi_{net}$: Every time the order book is updated via (i) a post/cancel action of a trader $P_i$, or (ii) a match of two traders $P_i$ and $P_{i'}$, all the traders (including $P_i$ and $P_{i'}$), need to be checked for negative instant net position.

$\Pi_{match}$: for matching an order between $P_i$ and $P_{i'}$.

$\Pi_{backup}$: fork a backup tree TU* from the main tree T* to serve as a starting point during the Mark to Market phase in the case there are still traders with a negative net position even after Margin Settlement. The protocol runs with the commitments of the inventory values, as well as the new net position of all traders, as the common inputs.

Protocol Description

The overall protocol runs in 4 phases, which we describe on a high-level below. Formal description can be found in § 25.

Initialization Every trader participating in the futures market has to commit to a valid initial inventory. This is done during the first round, by each trader individually, as follows.

$P_i$ holds an initial non-negative secret amount of cash (i.e., m[i]≥0), zero volume holding (i.e., v[i]=0), an initial estimation of the cost to pay for pending orders (i.e., $\hat{m}$[i]=m[i]), and a zero estimation of the volume holding for pending orders (i.e., $\hat{v}$[i]=0) as well as all initial zero inventory flags.

$P_i$ commits to its initial inventory and proves in zero knowledge that such an inventory is valid (as defined above), using the functionalities $F^{zero+}$ for m[i] and $F^{ec}$ for $\hat{m}$[i]; while simply decommitting v[i], $\hat{v}$[i], c[i] and the flags is sufficient to prove that they are all zeros.

The traders run protocol $\Pi_{put}$ to commit the inventory of Pi; the backup tree TU is initially identical to T.

Post/Cancel Order A good trader can post a new order ($\delta$hd c=1, $\ell$, v) or cancel a previous order ($\delta_c$=−1, $\ell$', v').

The traders run $\Pi_{valid}$.

The traders run $\Pi_{net}$; this can lead to Mark to Market.

The traders run $\Pi_{match}$ for each match in the order book (only for Post Order).

After the match, all traders run $\Pi_{net}$ again.

Margin Settlement This phase is (re) started every time there is at least one new trader with a bad standing (i.e., f[bad][i]=0 and η[i]*<0). It proceeds as described below; afterwards the protocol goes back to the previous phase (whatever it was).

For each pending order (t', $\ell$, i, v) of a broke trader $P_i$:

The traders run $\Pi_{get}$ with parameters (−1, $\ell$, v), to retrieve $P_i$'s two inventories: one before the cancellation of the pending order and one after that.

The traders run $\Pi_{valid}$.

All traders forward the necessary flags f[del][i]* and f[bad][i] to $F_{compare}$ to check whether f[del][i]*=f[bad][i]. If the check is successful, move to next step.

The traders run $\Pi_{net}$ to check and restart this phase if there are new broke traders.

The broke traders offset their positions until all broke traders are netted out.

The traders run $\Pi_{get}$ to retrieve their inventory.

The traders find matches on the order book at the current best price, say between $P_i$ and $P_{i'}$; both traders locally update their inventory, commit to the new inventory, and prove in zero knowledge that the matching was done correctly (using $F_{match}$)

All traders forward the necessary flags f[out][i]* and f[bad][i] to $F_{compare}$ to check whether f[out][i]*=f[bad][i], if the check is successful, go to next step.

The traders run $\Pi_{net}$ to check and restart this phase if there is a new broke trader.

All traders run $\Pi_{backup}$ to check if a backup tree can be forked, if not, go to Mark to Market phase.

Mark to Market This phase is invoked at the last round t=T, or during Margin Settlement.

The traders run $\Pi_{get}$ to retrieve their inventory.

The traders locally update their inventory, commit to the new inventory, and prove in zero knowledge that the matching was done correctly (using $F_{mtm}$).

Finally the new inventory is added back to the Merkle tree T by running $\Pi_{put}$.

The Proportional Burden is fulfilled for what is technically possible as we require traders posting/canceling an order to prove the validity of their actions before other traders prove the validity of their inventories according to the new order book. The latter is necessary for distributed risk management. It could be optimized by having a trader proving the validity of an inventory for a range of price values rather than just the current price (e.g. up/downward ticks as appropriate).

SECURITY ANALYSIS (SKETCH) (§ 21)

The theorem below states the security of protocol $\Pi_{DFM}$.

Theorem 1. Let Com be a statistically hiding (and computationally binding) commitment scheme. Protocol $\Pi_{DFM}$ securely realizes the ideal functionality FCFM in the ($F_{zk}$, $F_{compare}$, $F_{pcheck}$)-hybrid model, where the zero-knowledge functionality $F_{zk}$ supports all NP relations defined in § 18. We assume the set I is fixed before the protocol execution starts.

We sketch here the key step of the security proof (See § 26 for details). As in standard simulation-based security proofs, we exhibit an efficient simulator interacting with the ideal functionality FCFM that is able to fake the view of any efficient adversaries corrupting a subset $I \subseteq [N]$ of the traders in an execution of protocol $\Pi_{DFM}$. Our protocol is designed in a "hybrid world" with several auxiliary ideal functionalities (mainly for zero-knowledge proofs and for running secure comparisons). Importantly, in such a world, there is no security issue when using these functionalities: the composition theorem ensures that our protocol is still secure when we replace the auxiliary ideal functionalities with sub-protocols securely realizing them. An advantage of working in the hybrid model is that the simulator gets to see the inputs that corrupted traders forward to the auxiliary ideal functionalities in the clear.

On a very high level, our simulator S works as follows. During the Initialize phase, it commits to zero values for each commitment forwarded by an honest trader in the real protocol; the commitments to the token of each inventory are added to a simulated Merkle Tree that is maintained internally by the simulator. During a Post/Cancel Order action, it relies on the ideal functionality FCFM to post/cancel the corresponding orders; afterwards, in the Margin Settlement phase, for each match notification received from the ideal functionality FCFM, the simulator commits to zero for each commitment forwarded by a honest trader in the real protocol execution. During the Mark to Market phase, it commits to zero values for each commitment forwarded by an honest trader in the real protocol.

The hiding property of the commitment scheme implies that the above simulation is indistinguishable to the view generated in a mental experiment where the simulator S is given the real inputs corresponding to each honest trader. The only difference between this mental experiment and a real protocol execution is that in the former experiment the market evolves using the inventories held at the beginning by each corrupted trader, whereas in the latter experiment the adversary can try to cheat and fake the inventory of a corrupted trader (e.g., by claiming an order pertaining to an honest trader). However, the binding property of the commitment scheme and the collision resistance of the Merkle Tree, ensure that such cheating attempts only succeed with a negligible probability.

This allows us to conclude that the view simulated in the ideal world (with the functionality FCFM) is computationally indistinguishable from the view in a real execution of the protocol, thus establishing the security of $\Pi_{DFM}$.

BEYOND SECURITY-WITH-ABORT (§ 22)

If every single party participates to the computation, the baseline protocol is secure. However, an adversary can refuse to join $F_{compare}$ or $F_{pcheck}$, or to match an order in $\Pi_{match}$, or refuse to cancel pending orders and liquidate her own inventory during the Margin Settlement phase. Therefore, if even a single party is byzantine and aborts, the base protocol cannot continue operating, leading to a clear scalability issue.

A preliminary observation is that in practice one cannot initialize a market with a self-claimed account. The cash that gets deposited into the market must be backed by a verifiable source where a debit is acknowledged by every market participant, for instance ZeroCash. Hence, such source must be able to publicly verify the validity of the transactions resulting from the market's operation at the end of the day to credit each the account with the corresponding amount. An approach is to penalize a faulty participant upon aborting in an MPC, hence make the adversary lose some digital cash in proportion to their actions. For instance, [18] require the adversary to make deposits and forfeit them upon dropping out. Unfortunately, those protocols are not usable in our scenario. Technically the parties have to move in a fixed order since order of revelation is important (the see-saw mechanism [18] on page 7]) for the aforementioned penalty mechanism to work. This fixed order conflicts with our protocol's anonymity requirement since this will reveal the identity of the trader who made a posting. Most importantly, those protocols are not economically viable as the baseline deposit would need to be the same for each party (and progressively staggered in a see-saw fashion) which is unachievable due to the anticipated heterogeneity in financial capability of traders. In a low-frequency market the trader going first would have to deposit assets 35× times the stake of the trader going last, and in large markets that increases to 500 times larger (See Table 2 in § 1, where a single Eurodollar contract has a notional value of 1 million dollars and margins are measured in basis points). Hence we opt towards the mechanism of Hawk (See [16] Appendix G, § B] in which private deposits are frozen and the identified aborting parties cannot claim the deposits back in the withdraw phase.

This fits precisely with our scenario as the deposit can be made to match the initial margin (which is the largest amount a trader can lose when being netted out). At first we must show that honest participants can eventually move by themselves to a Mark To Market phase at least to cash their own inventory. Let us denote by Adv the set of adversaries who abort between time t and time t+1 given a backup tree TU with a solvable inventory of all traders (m[i], v[i]) and the corresponding mid price $\bar{p}$. Since TU is a valid tree, it satisfies the constraints from Def. 1 & 2, and therefore $\eta[i] \geq 0$. Since $\eta[i] = m[i] + cash(v[i]) \leq m[i] + \bar{p} \cdot v[i]$, we have $$0 \le \sum_{i \notin Adv} (m[i] + \bar{p} \cdot v[i]) \le \sum_i m[i]$$

This implies that there will be no unexpected loss to cover ($0 \le \ldots$) nor additional money would be created ($\ldots \le \Sigma_i m[i]$). Then honest traders can proceed to the Mark To Market phase to split their own trade proceedings. If enough traders accept the move so that it ends into the public ledger this would be considered an acceptable solution. From an economics perspective, the adversary would be penalized with at least its initial cash margin which could be substantial.

Now we just need to extend our protocol to identify the aborting parties in various protocol steps and prevent them from claiming the deposit in Mark To Market phase by requiring each trader to present a proof of participation in the round where the abort happens. A further step can possibly be taken to divide the money of the adversary if at the end of the Initialize phase the total sum of money is computed (by an MPC protocol, i.e. $F_{sum}$ that receives m[i] from each trader and computes $\Sigma_i$ m[i]. In the Mark To Market phase, by computing the sum of money of the honest traders after the updates of the inventories we can find the difference corresponding to the money of the adversary and shares it by updating the inventories again adding the shares.

Formally, in an abort, every honest trader maintains a set of spent tokens τ[i]' of the participants. The Mark To Market phase now runs exactly the same as before except that a trader must prove in zk s/he knows the opening to a token τ[i]' that was present in the last step with the relation $R^{oinv}$ which takes as input the statement $x_j^{oinv}$=(τ[i]') and witness $w_j^{oinv}$=(r[i]', m[i], v[i], m̂[i], v̂[i], c[i], f[bad][i], f[del][i], f[out][i]). The output of $R^{oinv}$ is defined to be one if and only if τ[i]'=Com(m[i]∥v[i]∥m̂[i]∥v̂[i]∥c[i]∥f[bad][i]∥f[del][i]∥f[out][i]; r[i]').

In the simplest settings, as in a joint step, the set of tokens from participants can be easily constructed. We discuss the disqualification of an adversary in a more complex case, where s/he refuses to match an order o':

- All traders $P_i$ cancel all orders o with o≠o'.
- All traders $P_i$ prove they do not own o' by decommitting ⟦c[i]⟧ and showing that c[i]=0.
- Similarly, if the Margin Settlement phase is aborted,
- In cancellation phase, all traders retrieve their inventory with a token τ[i]', and prove that the inventory flags is not broke, i.e (f[bad][i], f[del][i], f[out][i])≠(1, 0, 0).
- In liquidation phase, all traders retrieve their inventory with a token τ[i]', and prove that the inventory flags is not canceled, i.e (f[bad][i], f[del][i], f[out][i])≠(1, 1, 0).

IMPLEMENTATION (§ 23)

All phases of our protocol have been implemented and optimized. For the anonymous network and the distributed consensus protocol, off-the-shelf implementations will do. We use a distributed ledger, e.g. HyperLedger in PBFT mode (https://www.hyperledger.org) as a byzantine fault tolerant storage for each protocol step, i.e. each broadcast is replaced with a write into the distributed ledger. To communicate anonymously, the traders hide behind a Tor network. While we mention Tor, zcash, and HyperLedger in our implementation, we can replace any sub-protocol with other protocols for the same task, without affecting security Implementation of Components. We use a digital cash network that supports a private payment scheme, e.g. zcash for bootstrapping the market's initial cash. We extend zcash's POUR transaction to accept one more input/output: the commitment ⟦m[i]⟧, to deposit and withdraw the market's digital cash from and back to the zcash network.

We follow [1] in the instantiation of our building blocks, at a security level of 128 bits. Let H(·) be a collision-resistant compression hash function that maps I bits input (I≥512) into 256 bits output (e.g. SHA256). We use H(·) to instantiate the commitment scheme Com and also the hash function for the binary Merkle Tree T. The zero-knowledge functionality $F^R$ for the relation R is instantiated with zk-SNARKs for arithmetic circuit satisfiability [3], while generic MPC is used for the hybrid ideal functionalities $F_{compare}$ and $F_{pcheck}$. While SNARKs are problematic in the setting of universal composability [17], they are still sufficient for sequential composition. Our zk implementation is based on the libsnark library. We split $F^{inv}$ into $F^{invm}$ to first check whether the token is one of the leaf of the Merkle Tree, and then $F^{invt}$ to check the consistency of the new commitments and the old token. Our MPC implementation exploits the SPDZ library, along the construction in [11], [25].

Our prototype supports 32 bits signed integers (See § 4), a Merkle Tree of depth 10 and the net position range choices (i.e. $O_{sell}$ and $O_{buy}$) used in $F_{mg}$ are up to 10. While libsnark is efficient and scalable, SPDZ hits the limit of 10 parties due to the complexity in implementing SHA256 with the library, i.e. right-shift is not natively supported for 32-bits word, and we had to implement it using left-shift and other bitwise operations.

Optimization

TABLE 9 zk-SNARK Simple and Opt. Circuits performance

| | Pre-processing | | | On-Line Trading | | |
|---|---|---|---|---|---|---|
| Circuit | KeyGen (ms) | \|PK\| (MB) | \|VK\| (KB) | Prove (ms) | \|Proof\| (B) | Verify (ms) |
| $F^{mg}$ | 8759 | 119 | 9 | 4752 | 287 | 31 |
| $F^{invm}$ | 16778 | 210 | 2 | 8447 | — | 29 |
| $F^{token}$ | 15925 | 189 | — | 7642 | — | 27 |
| $F^{flags}$ | 12943 | 171 | — | 6115 | — | — |
| $F^{invt}$ | 12954 | 171 | — | 6111 | — | — |
| $F^{uinv}$ | 9650 | 116 | — | 4748 | — | — |
| $F^{match}$ | 9644 | 116 | — | 4748 | — | — |
| $F^{net}$ | 9638 | 115 | — | 4691 | — | — |
| $F^{mim}$ | 5456 | 57 | — | 2365 | — | — |
| $F^{ec}$ | 3343 | 38 | — | 1429 | — | — |
| $F^{zero+}$ | 1639 | 19 | — | 739 | — | 26 |
| $F^{max}$ | 1635 | 19 | — | 739 | — | — |
| $F^{oc}$ | 1635 | 19 | — | 729 | — | — |
| Optimized | | | | | | |
| $F^{token}$ | — | 157 | — | 5691 | — | — |
| $F^{flags}$ | — | 97 | — | 3908 | — | — |
| $F^{invt} + F^{uinv}$ | — | 137 | — | 5193 | — | — |
| $F^{mg} + F^{net}$ | — | 84 | — | 3509 | — | — |

TABLE 10

MPC Performance

| MPC Funct | Bytecode Size | | | On-Line Time | | |
|---|---|---|---|---|---|---|
| #Traders | 3 | 5 | 10 | 3 | 5 | 10 |
| $F_{compare}$ | 425 MB | 709 MB | 1.4 GB | 14 s | 2.4 s | 67 s |
| $F_{pcheck}$ | 212 MB | 354 MB | 708 MB | 7 s | 13 s | 36 s |

We also experimented with an optimized version to reduce the cost to only 30% and overcome the limit of 10 traders for the MPC. To improve the performance of the protocol we first streamline the number of the validations of the commitments by packing f[bad][i], f[del][i], f[out][i] into a single integer f[i], this improves the circuit $F^{token}$, $F^{invt}$ as well as $F^{flags}$. Then we can combine the circuits $F^{invt}$ and $F^{uinv}$, $F^{rng}$ and $F^{net}$. Proof generations can also be parallelized in a protocol step, e.g. in $\Pi_{valid}$, $F^{invt}$, $F^{uinv}$, $F^{rng}$, $F^{net}$, $F^{zero+}$ and $F^{token}$ are independent of each other.

Further, functionalities $F_{compare}$ and $F_{pcheck}$ are used extensively throughout our protocol. As we see by comparing Table 9 and Table 10, the consistency check of the commitments slow down the whole protocol. We can replace $F_{compare}$ with a lighter functionality $F_{dtc}$ below to detect the flag in an unwanted state (without validating the consistency of the commitments) and randomly select a $P_y$ owning an unwanted state to open the flag to check. This is not a problem as $P_y$ cannot be traced to any traders from the previous steps or the subsequent ones due to the anonymity mechanism (Merkle Tree and ZK Functionalities). She is just an anonymous volunteer for this round. The functionality $F_{pcheck}$ can be similarly replaced.

The Secure Detection $F_{dtc}$ runs on common input (f) and interacts with a set of players ($P_1, \ldots, P_N$) and receive ($P_i$, f[i], r[i]) from each $P_i$. Upon receiving all inputs, let cf be the number of pairs (f[i]=f), if cf>0 output y=Σr[i] mod cf to all players and ⊥ otherwise.

In the protocol, first each trader samples a random r[i] and forwards $P_i$, f[i], r[i] to $F_{dtc}$ with common input f to obtain y or ⊥. In case of ⊥, each trader $P_i$ proves that her flag is different from the f (using $F_{nec}$). Otherwise trader $P_y$ proves that the inventory flag is the same as the common input (by decommitting the flags). Any trader not able to prove this is considered as aborting.

EVALUATION (§ 24)

TABLE 11

Runtime of Individual Market Operations
Each individual operations can be done in few seconds for a market of 10 traders. With simple optimizations, we boost the performance and reduce the role of other traders in the computation which is a critical "ecological" constraint.

| | Plain Prot. Rimtime | | Opt. Prot. Runtime | |
|---|---|---|---|---|
| Protocol | Trader | Others (%) | Trader | Others (%) |
| Initialize | 11 s | — | 9 s | — |
| Post Order | 39 s | 148 s (79%) | 24 s | 27 s (53%) |
| Cancel Order | 40 s | 148 s (79%) | 25 s | 27 s (52%) |
| Match Order | 29 s | 148 s (84%) | 26 s | 27 s (51%) |
| MarkToMarket | 28 s | — | 25 s | — |

We evaluate our protocol in 3 steps. First we evaluate the performance of the cryptographic primitives that we use in our protocol, i.e. the zk-SNARK circuits and the MPC functionalities, both in the offline and online phase on a concrete implementation. Then, we use the obtained values to estimate the performance of each phase of our protocol. Finally, we evaluate the full protocol's performance by matching the above estimates with the public data available from the order books. Whilst network latencies are critical for high speed trading, we ignore them here since this issue is well understood by traders by either using known optimizations [20], [23] or by even buying private fiber-optic lines to cut delays between exchanges (http://www.forbes.com/forbes/2010/0927/outfront-netscape-jim-barksdale-daniel-spivey-wall-street-speedwar.html).

All our experiments are run with an Amazon EC2 r4.4× large instance (Intel Xeon E5-2686 v4@ 2.3 Ghz, 16 cores, 122 GB RAM) so we exclude the communication cost (However, each operation requires less than 20 commitments and 10 zk-SNARKs proof, thus per operation the data is less than 4 KB. See Table 9.). The MPC protocol's off-line phase can also be pipelined with zk-SNARKs proof generation thus we exclude it as well.

zk-SNARK Circuits Performance In Table 9, we report the performance metrics for the pre-processing steps: the key generation time (Key Gen), the size of the proving keys (PK), and the size of the verifying (VK) keys. We also report the time to generate a proof (Proving Time) and to verify it (Verify time), as well as the size of the proof during the actual trading execution described above. As shown, proving key size and proof generation time scale linearly with the number of commitments part of the relation.

Performance of the MPC functionalities To gauge the effectiveness of our MPC components, we evaluate the performance for each functionality separately. Table 10 reports the size of the bytecode and the corresponding running times for 3, 5 and 10 traders. The memory requirement for the compilation of the MPC functionalities using SHA-256 commitments crashed after 10 traders by exceeding 120 GB. We found that the dynamic memory requirement is typically 100× the final bytecode size. This was not reported before (e.g. [11]), and it is an important insight on the limit of the technology.

Overall Evaluation In our experiment, we employ the futures trades in the first quarter of 2017 for the Lean Hog futures market (See Table 2 in § 1) from the mentioned Thomson Reuters Tick History database (https://tickhistory.thomsonreuters.com.). For each day, we have five level limit orders (buy and sell, which we also chose for the $F^{rng}$) and transaction data at ticks level with millisecond timestamps. At a low end, we must be able to support a minimum of 10 traders and this is the limit we chose for illustrating our prototype. From the dataset we cannot determine the status of each trader (trader anonymity!), so we assume they have a large margin and never enter a broke state (i.e. we exclude Margin Settlement). We can combine the number of post, cancel and matched orders from market data (e.g. Table 2 in § 1 and Table 11) to estimate the corresponding execution overhead throughout a day of trading. The final results are reported in FIG. 19. The actual timing of the protocol is still slow compared to the millisecond delay required by the CME but, if we compare the cost of our hardware (a $500 EC2 instance) to the "centralized competitors" (CME's cost for IT infrastructure is $30 millions per year), we believe that a 10³ delay (seconds vs milliseconds) with a 10⁷ cheaper kit is acceptable.

FIG. 19 shows the overall record for the plain and optimized version as well as an estimation of a naive MPC implementation of the ideal functionality. For most of the entire quarter our distributed protocol can be optimized to have no overhead and executes all trades in the very same day.

To estimate the cost of a naive MPC implementation, we use as building block the simplest of our stateless MPC functionalities $F_{dtc}$ which is used to detect negative inputs and open one index. It costs only 0.2 s for 10 traders. We then estimate the cost of a naive MPC implementation of our stateful ideal functionality by accumulating the steps in FIG. 15 in § 18 and FIG. 17 in § 19 under the favorable assumption (for MPC) that execution times accrue linearly with the number of steps. Pure MPC imposes a significant burden on retail traders (the overwhelming majority of the market) in particular during peak times when algorithmic traders frequently post and almost immediately cancel practically all orders (See [19]). Our hybrid approach shifts the burden of computation on algorithmic traders. As seen from FIG. 20, retail traders would devote significant computational resources in a pure MPC implementation for allowing speculators to indeed speculate. The optimized implementation can already break the barrier of ten traders and do the full 66 traders of the peak day. Parallelization can further reduce the runtime of the sub-protocol to just 8 s (comparing to 24 s of sequential proof generation). Furthermore, additional practical design decisions can further increase the protocol throughput, e.g. if traders can prove that their inventory is valid for a range of prices they would only need prove validity again when the price fluctuates out of that range, or by allowing multiple traders to post/cancel in one round, etc. We leave this for future investigation.

PROTOCOL CONSTRUCTION (§ 25)

FIG. 21 provides the formal description for $\Pi_{put}$ and $\Pi_{get}$ whereas FIG. 22 contains a formal description of our protocol.

SECURITY ANALYSIS (§ 26)

Theorem 1 in § 21 states the security of our protocol $\Pi_{DFM}$ from § 20. Below, we formalize security in the stand-alone setting with a malicious adversary. We refer to [12] for a more extensive discussion of the standard formal definitions.

Proof. It is clear that $\Pi_{DFM}$ computes FCFM. We proceed to prove the security of $\Pi_{DFM}$. Let A be a non-uniform deterministic PPT adversary. The simulator S is given access to the ideal functionality FCFM, and can also read the stored/updated values of the corrupted traders (that A controls) from FCFM; recall that, since we prove only static security, the set of corrupted traders I is fixed before the protocol execution starts.

Sub-routines. To simplify the simulator's description, we introduce sub-routines $S_{put}$, $S_{get}$ as well as $S_{valid}$, $S_{backup}$, $S_{net}$, $S_{match}$ that will call $S_{put}$, $S_{get}$ when it is related to commit and retrieve of inventories. The sub-routines will be later invoked by S; while reading them, think of the simulator's behaviour as a simulation strategy for the corresponding protocols $\Pi_{put}$, $\Pi_{get}$, $\Pi_{valid}$, $\Pi_{backup}$, $\Pi_{net}$, and $\Pi_{match}$. Each sub-routine invokes A and receives messages from it. The subroutines use $S_{get}$ and $S_{put}$ above. Note that, since we are working in the hybrid model, whenever A interacts with an ideal functionality the simulator receives A's inputs to the functionality in the clear, and thus it can perfectly emulate the output of the hybrid functionality.

$S_{put}$: When a trader $P_i$ commits to an inventory, it acts as a prover while the other traders act as verifiers. If $P_i$ is corrupted, S needs to simulate the views of both the prover $P_i$ and the corrupted verifiers $P_j$, by receiving the inputs from $P_i$ and forwarding them to each corrupted verifier $P_{j \neq i}$. Otherwise, S only needs to simulate the view of the corrupted verifiers $P_j$, by forwarding $[\![0]\!]$ and $\rho=\text{Add}(T, [\![0]\!])$ to each corrupted verifier $P_j$. In both case S simulates the output of $F_{token}$ for each corrupted players, abort the simulation if any check fails.

$S_{get}$: Similar to $S_{put}$ but using $F^{inv}$ and $F^{uinv}$.
$S_{valid}$: Similar to $S_{put}$ but using $F^{oc}$, $F^{rng}$, $F^{net}$, and $F^{zero+}$.
$S_{backup}$: Similar to $S_{put}$ but with $F^{rng}$, $F^{net}$ and $F_{pcheck}$.
$S_{net}$: When a trader $P_i$ needs to be checked for a non-negative instant net position, it acts as a prover while the other traders act as verifiers. The steps are also similar to $S_{put}$ but with $F^{rng}$, $F^{net}$, $F^{flags}$ and $F^{compare}$.

$S_{match}$: When a trader $P_i$ posts an order, it acts as a prover together with some other trader $P_{i'}$ with a matching order, while the other traders act as verifiers. We distinguish four cases for the honesty of $P_i$ and $P_{i'}$. The steps are also similar to $S_{put}$ but with $F^{oc}$ and $F_{match}$.

Simulator description. We are now ready to describe the simulator. In each round $t \leq T$, the simulator S runs as follows depending on the current phase the protocol.

Initialization: Let $P_i$ be the trader committing to a good inventory. If $P_i$ is corrupted:
1. Receive the commitments of inventory values and $[\![\tau[i]]\!]$ from $P_i$; obtain the inputs that A sends to $F^{zero+}$ and $F^{ec}$, and simulate the output of such ideal functionalities for each corrupted trader in I.
2. Forward (init, Pi,m[i]) to FCFM; if the ideal functionality returns 0 simulate an abort of the protocol.
3. Receive the decommitments corresponding to $[\![v[i]]\!]$, $[\![\hat{v}[i]]\!]$, $[\![c[i]]\!]$, $[\![f[bad][i]]\!]$, $[\![f[del][i]]\!]$, $[\![f[out][i]]\!]$, and simulate an abort of the protocol in case such values are not valid openings.
4. Run $S_{put}$ (for the case of corrupted $P_i$).

If Pi is honest we proceed as follows.
1. Forward commitments to zero for each of the values broadcast by $P_i$ in the first step of the initialize phase; obtain the inputs that A sends to $F^{zero+}$ and $F^{ec}$, and simulate the output of such ideal functionalities for each corrupted trader in I.
2. Open the commitments to zero corresponding to $[\![v[i]]\!]$, $[\![\hat{v}[i]]\!]$, $[\![v[i]]\!]$, $[\![f[bad][i]]\!]$, $[\![f[del][i]]\!]$, $[\![f[out][i]]\!]$.
3. Run $S_{put}$ (for the case of honest $P_i$).

Post/Cancel Order: Let $P_i$ be the trader posting an order or canceling a previous order. We distinguish two cases for Cancel Order and 4 cases for Post Order. If $P_i$ is corrupted:
1. In case of Post Order, receive the values (1, $\ell$, v) and $[\![i]\!]$ from $P_i$; forward (post order, $P_i$, t, $\ell$, v) to FCFM. Otherwise, receive the values t' and (-1, $\ell$, v) from $P_i$; forward (cancel order, $P_i$, t') to FCFM.
2. Run $S_{valid}$ and $S_{net}$ (for the case of corrupted $P_i$).
3. In case of Post Order, for each command (match, t', $\ell$, v') received from FCFM run $S_{match}$ and then $S_{net}$ (for the case of corrupted $P_i$).

If Pi is honest: we proceed as follows.
1. In case of Post Order, receive (post order, t, $\ell$, v) from FCFM. Otherwise receive (cancel order, t') from FCFM.
2. Run $S_{valid}$ and $S_{net}$ (for the case of honest $P_i$).
3. In case of Post Order, for each command (match, t', $\ell$, v') received from FCFM run $S_{match}$ and then $S_{net}$ (for the case of honest $P_i$).

If $P_i$ is honest and $P_{i'}$ is corrupted (or vice versa): proceed as above, depending on who is honest/corrupted.

Margin Settlement: Note that during this phase S always learns the list of pending orders that are canceled, as a public output of FCFM. If $P_i$ is corrupted we proceed as follows.
1. For each order to be canceled in an unspent inventory:
   a. Receive the values t' and (-1, $\ell$, v) from $P_i$; obtain the inputs that A sends to $F^{oc}$, and simulate the output of such ideal functionality for each corrupted trader in I.
   b. Run $S_{valid}$ and $S_{net}$ (for the case of corrupted $P_i$).

c. Obtain the inputs that A sends to $F_{compare}$, and simulate the output of such ideal functionality for each corrupted trader in I.
2. For each broke unspent inventory:
   a. Run $S_{match}$ and $S_{net}$ (for the case of corrupted $P_i$).
   b. Obtain the inputs that A sends to $F_{compare}$, and simulate the output of such ideal functionality for each corrupted trader in I.
   c. Run $S_{backup}$ (for the case of corrupted $P_i$).

If $P_i$ is honest: Same as above, except that the values (î, v') for each order to be canceled are obtained from FCFM.

Mark To Market: Let $P_i$ be the trader committing to a good inventory with marked-to-market values. If $P_i$ is corrupted:
1. Run $S_{get}$ (for the case of corrupted $P_i$).
2. Receive the commitments and obtain the inputs that A sends to $F^{mtm}$, and simulate the output of such ideal functionality for each corrupted trader in I.
3. Run $S_{put}$ (for the case of corrupted $P_i$).

If $P_i$ is honest: Proceed as follows.
1. Run $S_{get}$ (for the case of honest $P_i$).
2. Forward commitments to zero for each of the values broadcast by $P_i$ in the second step of the Mark to Market phase; obtain the inputs that A sends to $F^{mtm}$, and simulate the output of such ideal functionality for each corrupted trader in I.
3. Run $S_{put}$ (for the case of honest $P_i$).

Indistinguishability of the simulation. We need to show that for all PPT adversaries A, all $I \subseteq [N]$, and every auxiliary input $z \in \{0, 1\}^*$, the following holds:

$$REAL_{\Pi_{DFM},A(z),I} \approx_c IDEAL_{FCFM,S(z),I}$$

We start by considering a hybrid experiment HYBRID1 with a simulator S1 that runs exactly the same as S, except that S1 also plays the role of the ideal functionality FCFM on its own. This means that S1 directly receives the inputs of other honest traders that are not under control of A. Clearly, for all adversaries A, all subsets I, and every auxiliary in put $z \in \{0, 1\}^*$, we have that $$HYBRID1_{A(z),S1,I} = IDEAL_{FCFM,S(z),I},$$

as there is no difference in generating the view of A in the two experiments. Next, we consider another hybrid experiment HYBRID2 with a simulator S2 that runs exactly the same as S1, except that whenever S1 commits to zero values when dealing with dishonest verifiers, S2 commits to the real values received from the honest provers. The lemma below shows that the two experiments are statistically close.

Lemma 1. For all (unbounded) adversaries A, all $I \subseteq [N]$, and every $z \in \{0, 1\}^*$:

$$HYBRID1_{A(z),S1,I} \approx_s HYBRID2_{A(z),S2,I}$$

Proof. The proof is down to the statistical hiding property of the non-interactive commitment Com. We consider a variant of the statistical hiding property where a distinguisher D is given access to a left-or-right oracle $O_{lr}(b, \cdot)$, parametrized by a bit $b \in \{0, 1\}$, that upon input $v \in \{0, 1\}^*$ returns $[\![v]\!]$ (if b=0) or $[\![0]\!]$ (if b=1), where $|0|=|v|$; hence, we have Com is statistically hiding if for all computationally unbounded D, $$|Pr[D^{O_{lr}(0,\cdot)}(1^\lambda)=1] - Pr[D^{O_{lr}(1,\cdot)}(1^\lambda)=1]| \leq v(\lambda)$$

for a negligible function v: $N \to [0, 1]$. By a standard hybrid argument, as long as D makes a polynomial (in $\lambda$) number of oracle queries, the above flavor of statistical hiding is equivalent to that of Com.

Assume there exists a distinguisher D' and a polynomial $p(\lambda)$, such that, for some $I \subseteq [N]$ and $z \in \{0, 1\}^*$, and for infinitely many values of $\lambda \in N$, we have that $$|Pr[D'(HYBRID1_{A(z),S1,I}) = 1] - Pr[D'(HYBRID2_{A(z),S2,I}) = 1]| \geq \frac{1}{p(\lambda)}$$

We can construct a distinguisher D breaking the statistical hiding property of Com as follows. D runs A and simulates an execution of protocol rIDFM exactly as S1 does, except that whenever S1 forwards a commitment to zero, D asks a query to the left-or-right oracle and sends the output of the oracle to A; the value v for each oracle query is equal to the value S2 would commit to (instead of committing to zero). In case D receives always commitments to zero, the view of A when run by D is identical to the view in the first hybrid experiment; on the other hand, in case D receives always commitments to the values queries to the left-or-right oracle, the view of A when run by D is identical to the view in the second hybrid experiment. Thus, D retains the same advantage of D'. This concludes the proof.

The lemma below says that the view of the adversary in the last hybrid experiment is computationally indistinguishable from the view in the real experiment.

Lemma 2. For all PPT adversaries A, all $I \subseteq [N]$, and every $z \in \{0, 1\}^*$, it is $$HYBRID2_{A(z),S2,I} \approx_c REAL_{\Pi_{DFM},A(z),I}$$

Proof. Fix $I \subseteq [N]$, and $z \in \{0, 1\}^*$. Consider the following events, defined over the probability space of the last hybrid experiment.

Event Badinv: The event becomes true whenever A can modify the inventory of a corrupted trader $P_i$, by finding two distinct valid openings for a token $\tau[i]$. The computational binding property of Com implies that Pr[Badinv] is negligible.

Event Badspend: The event becomes true whenever A can double spend the inventory of a corrupted trader $P_i$, by finding two distinct valid openings for $[\![\tau[i]]\!]$. The computational binding property of Com implies that Pr[Badspend] is negligible.

Event Badforge: The event becomes true whenever A forges an inventory of a trader $P_i$, by finding two distinct valid authentication paths for a leaf $[\![\tau[i]]\!]$ of the Merkle Tree. The computational binding property of the Merkle Tree, which follows from the collision resistance of the underlying hash function, implies that Pr[Badforge] is negligible.

Event Badswap: The event becomes true whenever A claim a pending order of an honest trader $P_i$, by finding two valid openings for the commitment $[\![i']\!]$. The computational binding property of Com implies that Pr[Badswap] is negligible.

Define Bad:=Badinv $\lor$ Badspend $\lor$ Badforge $\lor$ Badswap. It is not hard to see that conditioning on Bad not happening, the view of A is identical in the two experiments. This is because the only difference between the last hybrid and the real experiment is that in the former experiment the values m[i], v[i], m̂[i], v̂[i], c[i], f[bad][i], f[del][i], f[out][i] are read from the internal storage of S2 (playing the role of FCFM), whereas in the latter experiment these values are specified by the attacker. Hence, by a standard argument, for all PPT distinguishers D:

$$|Pr[D(HYBRID2_{A(z),S2,I})=1] - Pr[D(REAL_{\Pi_{DFM},A(z),I})=1]| \leq Pr[Bad]$$

The proof of the lemma now follows by a union bound.

Combining the above two lemmas, we obtain that the real and ideal experiment are computationally close, as desired.

ESTIMATING THE COST OF COMPUTATION (§ 27)

To estimate the burden of computation, we observe that the summary of each data point from the THTR is described by a tuple (d, $n_p$, $n_c$, $n_m$, $n_t$) where:
  d is the trading date,
  $n_p$ is the number of post orders (# increases),
  $n_c$ is the number of cancelled orders (# decreases),
  $n_m$, is the number of matched orders (# actual trades),
  and $n_t$ is the number of traders.

As the plain implementation cannot go beyond 10 traders we have assumed that only 10 traders could actually participate (so we cap $n_t$ at 10). With this cap made, we estimate the required computation in a naive MPC implementation according to FIG. 15 as follows.
  For Post/Cancel Order, an order requires 3 sub-steps per trader which yields $3n_t$ sub-steps to process an order.
  Similarly, for Match Order, an order requires 2 sub-steps per trader hence $2n_t$ sub-steps to match a trade.
  In each sub-step, one phase must walk through $n_p/2$ orders in average (These operations contribute to most of the generic MPC overhead).

They are then multiplied by the time $\tau^{mpc}(n_t)$ required by the elementary MPC operation $F_{dtc}$.

Differently, while generic MPC requires all traders to compute for one trader, the hybrid protocol allows traders to produce and verify the proof by themselves at the same time so the cost is not affected by $n_t$. The proof generation time and the proof verification time $\tau_{i,gen}^{hyb}$, $\tau_{i,ver}^{hyb}$ are actually performed by different traders. This is not important to calculate the overall crypto-overhead of operating the market in a distributed fashion (before moving to the next order both operations must be done) but will be important for the calculation of the proportional burden.

Therefore the total time to process a trading day d reported in FIG. 19 in § 24 of the single trader follows the equations below:

$$T_d^{mpc} = \frac{n_p}{2}\left(\sum_{i=p,c} n_i 3n_t + n_m 2n_t\right)\tau^{mpc}(n_t)$$

$$T_d^{hyb} = \sum_{i=p,c,m} n_i\left(\tau_{i,gen}^{hyp} + \tau_{i,ver}^{hyb} + \tau_{i,mpc}^{hyb}(n_t)\right)$$

and similarly for the optimized version where the costs have estimated according to Table 11 in § 24.

To estimate the fraction of retail and institutional traders $\rho_t$ we use the data from [19] as well as the fraction of orders performed by retail traders $\rho_o$ ($\rho_t$=0.71, $\rho_o$=0.18). Albeit TSX and CME are different exchanges, the skewedness against retail traders might be even more pronounced the more active the market. For the MPC naive computation a party has to participate to the computation irrespectively to whether she actually made any order. So the overall burden of computation by retail traders for naive MPC (FIG. 20 in § 24) is as follows:

$$R_d^{mpc} = \rho_t n_t T_d^{mpc}$$

In the hybrid approach, a retail trader only needs to verify proofs when an institutional trader has to generate proof, hence the computation by retail traders (FIG. 20 in § 24) is determined by the following equation:

$$R_d^{hyb} = \rho_t n_t \sum_{i=p,c,m} n_i\left(\rho_0 \tau_{i,gen}^{hyp} + (1-\rho_0)\tau_{i,ver}^{hyb} + \tau_{i,mpc}^{hyb}\right)$$

CONCLUSION (§ 28)

The description above shows the first practical realization of distributed, secure, full financial intermediation without a trusted third party. Our chosen example has been one of the landmark institution of financial intermediation: a Futures Market Exchange. Besides the practical relevance of the application, such realization was interesting from a security perspective as it requires to provide a rich security functionality with varied and potentially conflicting requirements. One needs to support a public availability of information about all actions performed by traders in the market (such as post or cancel orders) as well as public verifiability of integrity of private information from the traders. Further we need to provide participants anonymity and public unlinkability together with global integrity guarantees and private linkability.

It provides an efficient solution to the technical problem of the burden of computation so that the major effort of computation is proportionate to the level of trading activity so that traders infrequently making bids must only participate to the protocol to control market risk with a significant saving to what would be done by state of the art technical solutions using MPC computation.

Our analysis of actual trading days using the Thomson-Reuters database, including a complete trading history at the level of milliseconds, have shown that the computation behind our protocol is within engineering reach: we simulated that on a low frequency market a secure protocol using a normal server (as opposed to traders' typical supercomputers) could still be executed within a day with a handful of exceptions.

REFERENCES

[1] E. Ben-Sasson, A. Chiesa, C. Garman, M. Green, I. Miers, E. Tromer, and M. Virza, "Zerocash: Decentralized anonymous payments from bitcoin," in Proc. of IEEE SSP, 2014, pp. 459-474.

[2] E. Ben-Sasson, A. Chiesa, M. Green, E. Tromer, and M. Virza, "Secure sampling of public parameters for succinct zero knowledge proofs," in Proc. of IEEE SSP, 2015, pp. 287-304.

[3] E. Ben-Sasson, A. Chiesa, E. Tromer, and M. Virza, "Succinct non-interactive zero knowledge for a von neumann architecture," in Proc. of USENIX Security, 2014, pp. 781-796.

[4] D. Bernhard and B. Warinschi, "Cryptographic voting—A gentle introduction," in FOSAD, 2013.

[5] F. Boudot, "Efficient proofs that a committed number lies in an interval," in Proc. of EUROCRYPT, 2000, pp. 431-444.

[6] J. Camenisch, R. Chaabouni, and A. Shelat, "Efficient protocols for set membership and range proofs," in Proc. of ASIACRYPT, 2008, pp. 234-252.

[7] R. Canetti, Y. Lindell, R. Ostrovsky, and A. Sahai, "Universally composable two-party and multi-party secure computation," in Proc. of ACM STOC, 2002, pp. 494-503.

[8] M. Castro and B. Liskov, "Practical byzantine fault tolerance and proactive recovery," ACM TOCS, vol. 14, no. 5, pp. 398-461, 2002.

[9] J. Clark, J. Bonneau, E. W. Felten, J. A. Kroll, A. Miller, and A. Narayanan, "On decentralizing prediction markets and order books," in Workshop on the Economics of Information Security, State College, Pa., 2014.

[10] CoinDesk, "Understanding the DAO attack," http://www.coindesk.com/understanding-dao-hack-journalists/, 2016.

[11] I. Damgard, V. Pastro, N. Smart, and S. Zakarias, "Multiparty computation from somewhat homomorphic encryption," in Proc. of CRYPTO, 2012, pp. 643-662.

[12] O. Goldreich, Foundations of Cryptography Volume 2: Basic Applications. Cambridge University Press, 2004.

[13] J. Hull, S. Treepongkaruna, R. Colwell, R. Heaney, and D. Pitt, Fundamentals of futures and options markets. Pearson H. Edu, 2013.

[14] Y. Ishai, J. Katz, E. Kushilevitz, Y. Lindell, and E. Petrank, "On achieving the "best of both worlds" in secure multiparty computation," SIAM J. on Comp., vol. 40, no. 1, pp. 122-141, 2011.

[15] A. Kiayias, T. Zacharias, and B. Zhang, "An efficient e2e verifiable e-voting system without setup assumptions," IEEE S&P Mag., 2016.

[16] A. Kosba, A. Miller, E. Shi, Z. Wen, and C. Papamanthou, "Hawk: The blockchain model of cryptography and privacy-preserving smart contracts," in Proc. of IEEE SSP, 2016, pp. 839-858.

[17] A. E. Kosba, Z. Zhao, A. Miller, Y. Qian, T. H. Chan, C. Papamanthou, R. Pass, A. Shelat, and E. Shi, "How to use snarks in universally composable protocols," IACR Crypto. ePrint Ar., vol. 2015, 2015.

[18] R. Kumaresan, T. Moran, and I. Bentov, "How to use bitcoin to play decentralized poker," in Proc. of ACM CCS, 2015, pp. 195-206.

[19] J. Labuszewski, J. Nyhoff, J. Boudreault et al., "Disseminating floor quotes from open outcry markets," Oct. 23, 2013, U.S. patent application Ser. No. 14/061,286.

[20] K. Malinova, A. Park, and R. Riordan, "Do retail traders suffer from high frequency traders," Available at SSRN, vol. 2183806, 2013.

[21] F. Massacci, C. N. Ngo, J. Nie, D. Venturi, and J. Williams, "The seconomics (securityeconomics) vulnerabilities of decentralized autonomous organizations," in Proc. of SPW, 2017, pp. 171-179.

[22] R. C. Merkle, "A digital signature based on a conventional encryption function," in Proc. Of CRYPTO, 1987, pp. 369-378.

[23] M. Morano, I. Wall, S. Gaer, and K. Neumann, "Distributed trading bus architecture," February 2011, U.S. Pat. No. 7,890,412.

[24] S. Nakamoto, "Bitcoin: A peer-to-peer electronic cash system," 2008.

[25] J. B. Nielsen, P. S. Nordholt, C. Orlandi, and S. S. Burra, "A new approach to practical active-secure two-party computation," in Proc. of CRYPTO, 2012, pp. 681-700.

[26] C. Pirrong, "The economics of clearing in derivatives markets: Netting, asymmetric information, and the sharing of default risks through a central counterparty," Asym. Info., & the Sharing of Default Risks Through a Central Counterparty, 2009.

[27] K. Sako, "An auction protocol which hides bids of losers," in Pub.-Key Crypto., 2000, pp. 422-432.

[28] T. Sander and A. Ta-Shma, "Auditable, anonymous electronic cash," in Proc. of IEEE ICC, 1999, pp. 555-572.

[29] D. F. Spulber, "Market microstructure and intermediation," J. of Econ. Persp., vol. 10, no. 3, pp. 135-152, 1996.

[30] E. Zhai, D. I. Wolinsky, R. Chen, E. Syta, C. Teng, and B. Ford, "Anonrep: Towards tracking-resistant anonymous reputation." 2016, pp. 583-596.

What is claimed is:

1. A computer implemented method for implementing a distributed exchange with a distributed, privacy-preserving and integrity-preserving order book among a plurality of trader computing devices wishing to engage in distributed double auctions and markets, wherein each trader computing device of the plurality of trader computing devices is associated with a trader, the method comprising:

generating and broadcasting, by a first trader computing device of a trader wishing to post or cancel an order, a valid initial inventory cryptographic commitment;

generating and broadcasting, by said first trader computing device, a Non Interactive Zero Knowledge (NZK) proof that said initial inventory is valid;

generating, by all the other trader computing devices of the plurality of trader computing devices, a verifier configured to verify the NZK proof that the said initial inventory is valid;

performing, by the plurality of trader computing devices, a Multi Party Computation (MPC) to check if there are trader computing devices without a sufficient instant net position, wherein the instant net position represent cash value the trader can get or needs to pay upon liquidating all their contracts;

determining, by the plurality of trader computing devices, that there are trader computing devices without a sufficient instant net position based on the MPC;

based on the determining that there are trader computing devices without a sufficient instant net position, net out each trader computing device without the sufficient instant net position;

based on the netting out each trader computing device without the sufficient instant net position, generating and broadcasting, by a second trader computing device of the plurality of trader computing devices, a cryptographic commitment to a valid marked-to-market inventory;

generating and broadcasting, by said second trader computing device, the NZK Proof that said inventory is correctly marked-to-market;

generating, by all the other trader computing devices of the plurality of trader computing devices, a Non Interactive Zero-Knowledge Verifier configured to verify said proof.

2. Method according to claim 1, wherein the order book comprises a Private Order Book, a Public Pending Transaction Book, and a Public Trader Commitment Book, the Public Trader Commitment Book being implemented by means of a Merkle Hash Tree.

3. Method according to claim 1, wherein information about the traders are stored into an Inventory Book comprising a Private Trader Status Book, a Private Inventory Book, for each trader $P_i$, a Trader Status Crypto Token linking the entries of the Private Trader Status Book and of the Private Inventory Book, a Public Trader Commitment Book and a Public Trader Commitment Book Backup.

4. Method according to claim 3, comprising a submission protocol, "Π-put", comprising:

generating, by said first trader computing device using a commitment module, a token commitment corresponding to the first trader computing device initial inventory;

broadcasting, by said first trader computing device using a network module, the generated token commitment;

generating, by said first trader computing device using a token proof generation module (F-token-gen), the NZK proof to prove that the token commitment is correctly constructed;

broadcasting, by said first trader computing device using the network module, the generated NZK proof;

verifying, by every other trader computing device of the plurality of trader computing devices using a token proof verification module (F-token-ver), the generated NZK proof;

upon the token proof verification module verifying the zero knowledge proof, receiving, by a third trader computing device, the token commitment and adding the token commitment as a leaf to a current Merkle Tree and computing a new Merkle Tree root.

5. Method according to claim 4, wherein the Public Trader Commitment Book is implemented by means of a Merkle Hash Tree, the method comprising a receiving protocol, "II-get", comprising:

broadcasting, by the first trader computing device, the token pre-image of a leaf in the current Merkle Tree;

checking, by every other trader computing device of the plurality of trader computing devices, that the pre-image has not appeared before;

using, by the first trader computing device, a Merkle proof generation module (F-merkle-gen) to generate and broadcast the NZK proof to prove that the said pre-image is of a leaf in the current Merkle Tree;

using, by every other trader computing device of the plurality of trader computing devices, a Merkle proof verification module (F-merkle-ver) to verify the NZK proof;

using, by the first trader computing device, a commitment module to generate and broadcast a commitment to a first token corresponding to the first trader computing device's inventory;

using, by the first trader computing device, an inventory proof generation module (F-inv-gen) to generate and broadcast the NZK proof to prove that the first token is correctly constructed from the said pre-image;

broadcasting, by the first trader computing device, the new order or the wish to cancel a pending order;

locally updating, by the first trader computing device, the first trader computing device's inventory with respect to the new order or the newly cancelled order;

using, by the first trader computing device, the commitment module to generate and broadcast a commitment to a second token corresponding to a new trader's computing device inventory;

using, by the first trader computing device, an inventory-update proof generation module (F invupdate-gen) to generate and broadcast the NZK proof to prove that the second token is correctly constructed from the new trader's computing device inventory;

using, by every other trader computing device of the plurality of trader computing devices, an inventory-update verification module (F invupdate-ver) to verify the zero knowledge proof;

adding, by every other trader computing device of the plurality of trader computing devices, the new token as a leaf to the current Merle Tree and compute the new Merkle Tree root.

6. Method according to claim 5, wherein the trader's computing device inventory comprises binary flags, including:

a device without the sufficient instant net position flag, "f-bad", representing the information on whether the trader owning the corresponding device is without the sufficient instant net position;

a pending orders flag, "f-cancel", representing the status of a trader's computing device pending orders;

a contracts flag, "f-out", representing the status of a trader's computing device holding contracts;

wherein all flags are 0 initially (f-bad=0, f-cancel=0 and f-out=0) to represent that a trader's computing device inventory is in good standing, and wherein if the trader's computing device is without the sufficient instant net position, "f-bad" is switched to 1, while "f-cancel" and "f-out" both stay at 0;

in margin settlement, "f-cancel" is switched to 1 if all pending orders of the trader's computing device without the sufficient instant net position have been cancelled and "f-out" is switched to 1 if all holding contracts of the trader's computing device without the sufficient instant net position have been bought or sold, the method comprising a validation protocol, "II-valid", comprising:

running, by the plurality of trader computing devices, the receiving protocol, "II-get" protocol;

broadcasting, by the first trader computing device, the pre-image of the first trader computing device's inventory flags;

checking, by every other trader computing device of the plurality of trader computing devices, the following:
in case of a posting/cancelling an order, if the device without the sufficient instant net position flag "f-bad"=0;
in case of cancelling all pending orders in margin settlement, if the device without the sufficient instant net position flag "f-bad"=1 and "f-cancel"=0;
in case of posting a new order to liquidate current trader's computing device holding contracts, if the flags "f-bad"=1, "f-cancel"=1 and "f-out"=0;

if the first trader computing device wishes to cancel a pending order:
broadcasting, by the first trader computing device, a commitment coupled with a to be-cancelled order;
using, by the first trader computing device, an ownership proof generation module (F-own-gen) to generate and broadcast the NZK proof to prove that it owns the pre-image of the said commitment;
using, by every other trader computing device of the plurality of trader computing devices, an ownership proof verification module (F-ownver) to verify the NZK proof;
locally computing, by the first trader computing device, a new net position of the first trader computing device's inventory with respect to the new order or newly cancelled order;
using, by the first trader computing device, the commitment module to generate and broadcast a commitment to the volume and price ranges used to compute the new net position corresponding to the new trader's computing device inventory;

using, by the first trader computing device, a range proof generation module (F-range-gen) to generate and broadcast the NZK proof to prove that the volume and price ranges used to compute the new net position is correctly computed from the new trader's computing device inventory;

using, by every other trader computing device of the plurality of trader computing devices, a range proof verification module (F-range-ver) to verify the zero knowledge proof;

using, by the first trader computing device, the commitment module to generate and broadcast a commitment to the new net position corresponding to the new trader's computing device inventory;

using, by the first trader computing device, a net position proof generation module (F-netpos-gen) to generate and broadcast the NZK proof to prove that the new net position is correctly computed from the new trader's computing device inventory;

using, by every other trader computing device of the plurality of trader computing devices, a net position verification module (F-netpos-ver) to verify the zero knowledge proof;

using, by the first trader computing device, the commitment module to generate and broadcast a commitment to new flags corresponding to the new trader's computing device inventory and new net position;

using, by the first trader computing device, a flag proof generation module (F-flags-gen) to generate and broadcast the NZK proof to prove that the new flags are correctly computed from the new trader's computing device inventory and new net position;

using, by every other trader computing device of the plurality of trader computing devices, a flag verification module (F-flags-ver) to verify the zero knowledge proof;

using, by the first trader computing device, a margin proof generation module (F-nonneg-gen) to generate and broadcast the NZK proof to prove that the new net position is above the margin requirement;

using, by every other trader computing device of the plurality of trader computing devices, a margin verification module (F-nonneg-ver) to verify the zero knowledge proof;

running, by every other trader computing device of the plurality of trader computing devices, the submission protocol, "Π-put".

7. Method according to claim 5, comprising a matching protocol, "Π-match", comprising:
running, by every other trader computing device of the plurality of trader computing devices, the receiving protocol, "Π-get" for the first trader computing device;
running, by every other trader computing device of the plurality of trader computing devices, the submission protocol, "Π-put", for the first trader computing device;
the steps above are repeated for the second trader's computing device.

8. Method according to claim 6, comprising an optimized comparing function, comprising:
using, by the plurality of trader computing devices, the MPC module to generate the input encoding of the private parameters including its own old inventory flags in the previous round, its own new inventory flags in the current round, and the private random numbers from the random generator module, where necessary;

broadcasting, by the plurality of trader computing devices, the input encoding to the other trader computing devices using the network module;

using, by every trader computing device that receives the generated input, the MPC module to compute an encoded output based on a public input and the received encoded inputs;

using, by every trader computing device that receives the generated input, the network module to send the encoded output to the network module of other trader computing devices;

using, by every trader computing device that receives the generated input, the MPC module to compute the sum across all trader's computing devices of all mentioned private new flags and the sum across all trader computing devices of all mentioned private old flags and return 1 if the two sums are equal;

if the sums are equal, using, by the plurality of trader computing devices, a status proof generation module (F-equal-gen) to prove in zero-knowledge that the status unchanged;

using, by every other trader computing device of the plurality of trader computing devices, a status verification module (F-equal-ver) to verify the zero knowledge proof;

otherwise return 0 and, using, by the plurality of trader computing devices, the MPC module to compute a random trader computing device that changes status;

using, by the random trader computing device, the proof generation module (F-nequal-gen) to prove in zero-knowledge the status changes;

using, by every other trader computing device of the plurality of trader computing devices, the verification module (F-nequal-ver) to verifythe zero knowledge proof.

9. Method according to claim 6, wherein:
the three binary flags (f-bad, f-cancel and f-out) are replaced by a single integer; and/or
the Merkle proof generation module and verification module and the inventory update proof generation module and verification module are combined into optimized proof generation module (F-minv-gen) and verification module (F-minv-ver), so that the receiving protocol, "Π get", is replaced by an optimized receiving protocol, "Π-get-opt", in which:
broadcasting, by the first trader computing device, the pre-image of a leaf in the current Merkle Tree;
checking, by every other trader computing device of the plurality of trader computing devices, that the pre-image has not appeared before;
broadcasting, by the first trader computing device, the new order or the wish to cancel a pending order;
using, by the first trader computing device, the commitment module to generate and broadcast a commitment to the token corresponding to the first trader computing device's inventory updated with respires to the new order or the newly cancelled order;
using, by the first trader computing device, the optimized proof generation module (F-minv-gen) to generate and broadcast the NZK proof to prove that the first token is correctly constructed from the said pre-image and updated with respect to the new order or the newly cancelled order;

using, by every other trader computing device of the plurality of trader computing devices, the optimized verification module (F-minv-ver) to verify the zero knowledge proof;

and/or the range proof generation and verification modules and the net position proof generation and verification modules are combined into optimized net position proof generation module (F rnetpos-gen) and optimized position verification modules (F-rnetpos-ver), so that:

using, by the first trader computing device, the commitment module to generate and broadcast a commitment to the new net position corresponding to the new trader device inventory;

using, by the first trader computing device, the proof generation module (F-rnetpos-gen) to generate and broadcast the NZK proof to prove that the new net position is correctly computed from the new trader's computing device inventory;

using, by every other trader computing device of the plurality of trader computing devices, the verification module (F-rnetpos-ver) to verify the zero knowledge proof;

and/or parallelization of the proof generation module, in which all the proof generation modules(F-merkle-gen, F-inv-gen, F-invupdate-gen, F-own-gen, F-range-gen, F-netpos-gen, F-flags-gen, F-nonneg-gen, F-equal-gen, F-nequal-gen, F-minv-gen, F-rnetpos-gen, F-neg-gen) are executed in parallel.

10. Method according to claim 4, comprising a check protocol, "F-check", comprising:

using, by the plurality of trader computing devices, the MPC module to generate the input encoding of private parameters, said private parameters including its own net position in the current round, and private random numbers from a random generator module;

broadcasting, by the plurality of trader computing devices, the generated input encoding to the other trader computing devices using the network module;

using, by every trader computing device that receives the generated input, the MPC module to compute an encoded output based on the public input and the received encoded inputs;

using, by every trader computing device that receives the generated input, the network module to send the encoded output to the network module of other trader computing devices;

using, by every trader computing device that receives the generated input, the MPC module to:

check whether all other trader computing devices' respective private input, i.e. net position in the current round, correspond to the public input commitments of net position in the current round, and return 0 if at least one check fails;

compare the net position of the plurality of trader computing devices with 0 and return 0 if any net position is less than 0;

return 1 if no value has been already returned.

11. Method according to claim 10, comprising a backup protocol, "II-backup", comprising:

repeating, by the plurality of trader computing devices:

running the receiving protocol, "II-get";

running the submission protocol, "II-put";

running the check function, "F-check";

if the check function, "F-check" is successful, running the submission protocol, "II-put".

12. Method according to claim 11, wherein the comparing function, "F-compare", comprises:

using, by the plurality of trader computing devices, the MPC module to generate the input encoding of private parameters including its own old inventory flags in the previous round, its own new inventory flags in the current round, and the private random numbers from the random generator module;

broadcasting, by the plurality of trader computing devices, the generated input encoding to the other trader computing devices using the network module;

using, by every trader computing device that receives the generated input, the MPC module to compute an encoded output based on the public input and the received encoded inputs;

using, by every trader computing device that receives the generated input, the network module to send the encoded output to the network module of other trader computing devices;

using, by every trader computing device that receives the generated input, the MPC module to:

check whether all other traders' computing devices' respective private old inventory flags in the previous round, new inventory flags in the current round, correspond the public input commitments of old inventory flags in the previous round and new inventory flags in the current round, and return 0 if at least one check fails;

compute the sum across the plurality of trader computing devices of all mentioned private new flags and the sum across all trader's computing devices of all mentioned private old flags and returning 0 if the two sums are different;

return 1 if no value has been already returned.

13. Method, according to claim 11, comprising an optimized check function comprising:

using, by the plurality of trader computing devices, the MPC module to generate the input encoding of private parameters including its own net position in the current round, and the private random numbers from a random generator module, where necessary;

broadcasting, by the plurality of trader computing devices, the input encoding so computed to the other trader computing devices using the network module;

using, by every trader computing device that receives the generated input, the MPC module to compute an encoded output based on the public input and the received encoded inputs;

using, by every trader computing device that receives the generated input, the network module to send the encoded output to the network module of other trader devices;

using, by every trader computing device that receives the generated input, the MPC module to compare the net position of all trader's computing devices with 0 and returns 1 if no net position is less than 0, and using, by the plurality of trader computing devices, the proof generation module F-nonneg-gen to prove in zero-knowledge the status unchanged;

using, by the plurality of trader computing devices, the verification module F-nonneg-ver to verify the zero knowledge proof;

returning, by the plurality of trader computing devices, a 1 if no value has been already returned;

otherwise using, by the plurality of trader computing devices, the MPC module to compute a random trader computing device that has negative net position;

using, by the random trader computing device, the proof generation module, "F-neg-gen", to prove in zero-knowledge the negative position;

using, by every other trader computing device of the plurality of trader computing devices, the verification module, "F-neg-ver", to verify the zero knowledge proof.

14. Method according to claim 1, wherein the cryptographic commitment includes an arithmetic/boolean formula for determining whether the trader outstanding position is still acceptable for the other traders, based on the memorized variable of previous positions and the value of current positions.

* * * * *